(12) United States Patent
Aizenberg et al.

(10) Patent No.: US 10,011,800 B2
(45) Date of Patent: Jul. 3, 2018

(54) SLIPS SURFACE BASED ON METAL-CONTAINING COMPOUND

(71) Applicant: Presidents and Fellows of Harvard College, Cambridge, MA (US)

(72) Inventors: Joanna Aizenberg, Boston, MA (US); Michael Aizenberg, Boston, MA (US); Philseok Kim, Arlington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 262 days.

(21) Appl. No.: 14/414,207

(22) PCT Filed: Jul. 12, 2013

(86) PCT No.: PCT/US2013/050364
§ 371 (c)(1),
(2) Date: Jan. 12, 2015

(87) PCT Pub. No.: WO2014/012052
PCT Pub. Date: Jan. 16, 2014

(65) Prior Publication Data
US 2015/0175814 A1    Jun. 25, 2015

Related U.S. Application Data

(60) Provisional application No. 61/673,705, filed on Jul. 19, 2012, provisional application No. 61/671,442, (Continued)

(51) Int. Cl.
*C09D 5/16* (2006.01)
*C10M 105/76* (2006.01)
(Continued)

(52) U.S. Cl.
CPC ............ *C10M 105/76* (2013.01); *B05D 3/104* (2013.01); *B05D 5/08* (2013.01); *B05D 5/086* (2013.01);
(Continued)

(58) Field of Classification Search
None
See application file for complete search history.

(56) References Cited

U.S. PATENT DOCUMENTS 3,068,187 A    12/1962  Bolstad et al.
3,274,007 A     9/1966  Jones
(Continued)

FOREIGN PATENT DOCUMENTS

CN    1360618 A    7/2002
CN    1884398 A   12/2006
(Continued)

OTHER PUBLICATIONS

Vogel et al., "Wafer-Scale Fabrication of Ordered Binary Colloidal Monolayers with Adjustable Stoichiometries," Advanced Functional Materials, vol. 21, pp. 3064-3073, (2011).
(Continued)

*Primary Examiner* — Nathan T Leong
(74) *Attorney, Agent, or Firm* — Wilmer Cutler Pickering Hale and Door LLP

(57) ABSTRACT

A method of preparing an article having a slippery surface includes providing a metal-containing surface, chemically modifying the metal-containing surface to roughen the metal-containing surface, and disposing a lubricating layer on the roughened metal-containing surface, wherein the lubricating layer is substantially stabilized on the roughened metal-containing surface.

30 Claims, 42 Drawing Sheets

Related U.S. Application Data filed on Jul. 13, 2012, provisional application No. 61/671,645, filed on Jul. 13, 2012.

(51) Int. Cl.

| | | |
|---|---|---|
| *B08B 17/06* | (2006.01) | |
| *C23C 18/04* | (2006.01) | |
| *C23C 18/12* | (2006.01) | |
| *C10M 177/00* | (2006.01) | |
| *B05D 3/10* | (2006.01) | |
| *B05D 5/08* | (2006.01) | |
| *B65D 25/14* | (2006.01) | |
| *C03C 17/00* | (2006.01) | |
| *C09D 7/61* | (2018.01) | |

(52) U.S. Cl.
CPC ............. *B08B 17/06* (2013.01); *B65D 25/14* (2013.01); *C03C 17/001* (2013.01); *C09D 5/1693* (2013.01); *C09D 7/61* (2018.01); *C10M 177/00* (2013.01); *C23C 18/04* (2013.01); *C23C 18/1216* (2013.01); *C23C 18/1254* (2013.01); *C23C 18/1295* (2013.01); *C03C 2217/76* (2013.01); *C03C 2218/31* (2013.01); *C10M 2213/0606* (2013.01); *C10N 2280/00* (2013.01); *Y10T 428/24997* (2015.04)

(56) References Cited

U.S. PATENT DOCUMENTS

| | | | |
|---|---|---|---|
| 4,386,170 A | 5/1983 | Monroe | |
| 4,633,004 A | 12/1986 | Boutevin et al. | |
| 4,787,991 A | 11/1988 | Morozumi et al. | |
| 4,937,596 A | 6/1990 | Schmid | |
| 5,358,719 A | 10/1994 | Mellul et al. | |
| 5,372,888 A | 12/1994 | Ogawa et al. | |
| 5,602,214 A | 2/1997 | Lin et al. | |
| 5,620,778 A | 4/1997 | Clatworthy | |
| 5,624,713 A | 4/1997 | Ramer | |
| 5,630,846 A | 5/1997 | Hara et al. | |
| 5,798,409 A | 8/1998 | Ho | |
| 5,804,318 A | 9/1998 | Pinchuk et al. | |
| 6,071,981 A | 6/2000 | Johnson et al. | |
| 6,232,379 B1 | 5/2001 | Takita | |
| 6,247,603 B1 | 6/2001 | Farrell et al. | |
| 6,511,753 B1 | 1/2003 | Teranishi et al. | |
| 7,189,934 B2 | 3/2007 | Youngner | |
| 7,192,993 B1 | 3/2007 | Sarangapani et al. | |
| 7,560,492 B1 | 7/2009 | Claude et al. | |
| 7,666,514 B2 | 2/2010 | Sakamoto et al. | |
| 7,723,405 B2 | 5/2010 | Braun et al. | |
| 7,811,666 B2 | 10/2010 | Dry | |
| 2001/0014711 A1 | 8/2001 | Levy | |
| 2003/0212232 A1 | 11/2003 | Majeti et al. | |
| 2004/0034941 A1 | 2/2004 | Iwato et al. | |
| 2004/0186211 A1 | 9/2004 | Howell et al. | |
| 2005/0164008 A1 | 7/2005 | Rukavina | |
| 2006/0024504 A1 | 2/2006 | Nelson et al. | |
| 2006/0153993 A1 | 7/2006 | Schmidt et al. | |
| 2006/0159645 A1 | 7/2006 | Miller et al. | |
| 2007/0039832 A1 | 2/2007 | Heikenfeld | |
| 2007/0141306 A1 | 6/2007 | Kasai et al. | |
| 2007/0166344 A1 | 7/2007 | Qu et al. | |
| 2007/0184733 A1 | 8/2007 | Manley | |
| 2007/0224391 A1 | 9/2007 | Krupenkin et al. | |
| 2007/0254000 A1 | 11/2007 | Guo et al. | |
| 2008/0195170 A1* | 8/2008 | Asgari | A61L 27/306 607/36 |
| 2009/0078153 A1 | 3/2009 | Shchukin et al. | |
| 2009/0098299 A1 | 4/2009 | Cheng | |
| 2009/0209922 A1 | 8/2009 | Boisjoly | |
| 2010/0009583 A1 | 1/2010 | Bringley et al. | |
| 2010/0021748 A1* | 1/2010 | Hu | C23C 18/1651 428/458 |
| 2010/0210745 A1 | 8/2010 | McDaniel et al. | |
| 2011/0165206 A1 | 7/2011 | Liu et al. | |
| 2011/0283778 A1 | 11/2011 | Angelescu et al. | |
| 2011/0287987 A1 | 11/2011 | Mordukhovich et al. | |
| 2012/0052241 A1 | 3/2012 | King et al. | |
| 2012/0141052 A1 | 6/2012 | Drew et al. | |
| 2013/0032316 A1 | 2/2013 | Dhiman et al. | |

FOREIGN PATENT DOCUMENTS

| | | |
|---|---|---|
| CN | 101052667 A | 10/2007 |
| CN | 101198542 A | 6/2008 |
| CN | 101374607 A | 2/2009 |
| CN | 101444777 A | 6/2009 |
| CN | 101538395 A | 9/2009 |
| CN | 101580753 A | 11/2009 |
| CN | 101675156 A | 3/2010 |
| CN | 101918621 A | 12/2010 |
| CN | 102388180 A | 3/2012 |
| DE | 19818956 A1 | 11/1998 |
| EP | 0166998 A2 | 1/1986 |
| EP | 0338418 A1 | 10/1989 |
| EP | 0497204 A2 | 8/1992 |
| EP | 0893164 A2 | 1/1999 |
| EP | 1002825 A2 | 5/2000 |
| EP | 1487590 B1 | 12/2004 |
| EP | 2228053 A1 | 9/2010 |
| EP | 2363438 A1 | 9/2011 |
| JP | S60-259269 A | 12/1985 |
| JP | 62-063219 A | 3/1987 |
| JP | S62-252477 A | 11/1987 |
| JP | 01-170932 A | 7/1989 |
| JP | 04-270649 A | 9/1992 |
| JP | 05-229402 A | 9/1993 |
| JP | 5240251 B2 | 9/1993 |
| JP | H06-48685 U | 7/1994 |
| JP | 07-242769 A | 9/1995 |
| JP | H08-12816 A | 1/1996 |
| JP | 2000-510353 A | 8/2000 |
| JP | 2003-170540 A | 6/2003 |
| JP | 2004-037764 A | 2/2004 |
| JP | 2005-082848 A | 3/2005 |
| JP | 2005082848 * | 3/2005 |
| JP | 2005-231084 A | 9/2005 |
| JP | 2006-280843 A | 10/2006 |
| JP | 2008-223003 A | 9/2008 |
| JP | 2009-523890 A | 6/2009 |
| JP | 2010-047890 A | 3/2010 |
| WO | WO-92/10532 A1 | 6/1992 |
| WO | WO-93/17077 A1 | 9/1993 |
| WO | WO-99/36490 A1 | 7/1999 |
| WO | WO-01/78800 A1 | 10/2001 |
| WO | WO-02/09647 A2 | 2/2002 |
| WO | WO-03013827 A1 | 2/2003 |
| WO | WO-2005091309 A1 | 9/2005 |
| WO | WO-2005/121288 A1 | 12/2005 |
| WO | WO-2006/091235 A1 | 8/2006 |
| WO | WO-2006/118460 A1 | 11/2006 |
| WO | WO-2007/130734 A2 | 11/2007 |
| WO | WO-2008/013825 A2 | 1/2008 |
| WO | WO-2010028752 A1 | 3/2010 |
| WO | WO-2010/042804 A2 | 4/2010 |
| WO | WO-2010/065960 A2 | 6/2010 |
| WO | WO-2010116045 A1 | 10/2010 |
| WO | WO-2011005200 A1 | 1/2011 |
| WO | WO-2011/049896 A2 | 4/2011 |
| WO | WO-2012/055821 A1 | 5/2012 |
| WO | WO-2012/055825 A1 | 5/2012 |
| WO | WO-2012/100099 A2 | 7/2012 |
| WO | WO-2012/100100 A2 | 7/2012 |
| WO | WO-2013/022467 A2 | 2/2013 |
| WO | WO-2013/106588 A1 | 7/2013 |
| WO | WO-2013/115868 A2 | 8/2013 |

OTHER PUBLICATIONS

Vogel et al., "A Convenient Method to Produce Close- and Non-close-Packed Monolayers using Direct Assembly at the Air-Water

(56) References Cited

OTHER PUBLICATIONS

Interface and Subsequent Plasma-Induced Size Reduction," Macromolecular Chemistry and Physics, vol. 212, pp. 1719-1734 (2011).
Vogel et al., "From soft to hard: the generation of functional and complex colloidal monolayers for nanolithography," Soft Matter, vol. 8, pp. 4044-4061 (2012).
Prakash and Gershenfeld, "Microfluidic Bubble Logic," Science, vol. 315, No. 5813, 176 pages (Sep. 2008).
Rothemund, Paul W.K., "Folding DNA to create nanoscale shapes and patterns," Nature, vol. 440, 82 pages (Mar. 16, 2006).
Shaffer, T.H. et al., "State of the art review: liquid ventilation," Pediatric Pulmonology, vol. 14, pp. 102-109 (Oct. 1992).
Keck et al., "Preparation of partially fluorinated aryl/alkyl vinylene ether polymers," Polymer International, vol. 62, Issue 10, pp. 1485-1491, Oct. 2013.
Abbott, et al., "Mass Production of Bio-Inspired Structured Surfaces", Proceedings of the Institution of Mechanical Engineers, Part C: Journal of Mechanical Engineering Science, 221(10):1181-1191, Oct. 1, 2007, 11 pages.
Afessa, B. et al., "Association Between a Silver-Coated Endotracheal Tube and Reduced Mortality in Patients With Ventilator-Associated Pneumonia," Chest, vol. 137, pp. 1015-1021 (May 2010).
Ahuja, A. et al., "Nanonails: A Simple Geometrical Approach to Electrically Tunable Superlyophobic Surfaces," Langmuir, vol. 24, pp. 9-14 (2008).
Badrossamay, Mohammad Reza, et al., "Nanofiber Assembly by Rotary Jet-Spinning," Nano Letters, vol. 10, No. 6, pp. 2257-2261, 11 pages (Jun. 9, 2010).
Bai, Joseph R. et al., "Core-Annular Flows," Annual Review Fluid Mechanics, vol. 29, pp. 65-90 (Jan. 1997).
Banerjee, I. et al., "Antifouling coatings: recent developments in the design of surfaces that prevent fouling by proteins, bacteria, and marine organisms," Advanced Materials, pp. 690-718 (2011).
Banerjee, S. et al., "Infection control during GI endoscopy," Gastrointest. Endosc., vol. 67, pp. 781-790 (May 2008).
Banhart, John, "Manufacture, characterisation and application of cellular metals and metal foams," Progress in Materials Science, vol. 46, pp. 559-632 (2001).
Barstad, R. M. et al., "Monocyte procoagulant activity induced by adherence to an artificial surface is reduced by end-point immobilized heparin-coating of the surface", Thrombosis and Haemostasis, vol. 79, pp. 302-305, Downloaded from www.thrombosis-online.com on (Mar. 17, 2014).
Barthlott, W. & Neinhuis, C., "Purity of the sacred lotus, or escape from contamination in biological surfaces," Planta, vol. 202, pp. 1-8 (Apr. 1997).
Bauer, et al., "The Insect-Trapping Rim of Nepenthes Pitchers", Plant Signaling & Behavior, 4(11):1019-1023, Nov. 1, 2009, 5 pages.
Beilenhoff, U. et al., "ESGE-ESGENA guideline: Cleaning and disinfection in gastrointestinal endoscopy Update 2008," Endoscopy, vol. 40, pp. 939-957 (Sep. 23, 2008).
Berger, R. G., "Flavours and Fragrances: Chemistry, Bioprocessing and Sustainability," Springer, 15 pages—Title Page, Copyright Page and Table of Contents Only (2007).
Bhardwaj, U. et al., "A review of the development of a vehicle for localized and controlled drug delivery for implantable biosensors," J. Diabetes Sci. Technol., vol. 2, pp. 1016-1029 (Nov. 2008).
Bico, J. et al., "Rough wetting," Europhysics Letters, vol. 55, No. 2, pp. 214-220 (Jul. 15, 2001).
Bico, J. et al., "Wetting of textured surfaces," Colloids and Surfaces, A: Physicochemical and Engineering Aspects, vol. 206, pp. 41-46 (No Month Listed 2002).
Bocquet, L. & Lauga, E., "A smooth future?," Nature Mater., vol. 10, pp. 334-337 (May 2011).
Bohn, et al., "Insect Aquaplaning: Nepenthes Pitcher Plants Capture Prey with the Peristome, a Fully Wettable Water-Lubricated Anisotropic Surface", PNAS, 101(39):14138-14143, Sep. 28, 2004, 6 pages.
Bos, R. et al., "Retention of bacteria on a substratum surface with micro-patterned hydrophobicity," FEMS Microbiology Letters, vol. 189, No. 2, pp. 311-315 (Aug. 15, 2000).
Cassie, A.B.D. & Baxter, S., "Large contact angles of plant and animal surfaces," Nature, vol. 155, pp. 21-22 (Jan. 6, 1945).
Cassie, et al., "Wettability of Porous Surfaces", Transactions of the Faraday Society, vol. 40, pp. 546-551, Jan. 1944, 6 pages.
Chaudhury, Manoj K. and Whitesides, George M., "Direct Measurement of Interfacial Interactions between Semispherical Lenses and Flat Sheets of Poly (dimethylsiloxane) and Their Chemical Derivatives," Langmuir, vol. 7, pp. 1013-1025 (1991).
Chen, S. et al., "Surface hydration: Principles and applications toward low-fouling/nonfouling biomaterials," Polymer, vol. 51, pp. 5283-5293 (Aug. 10, 2010).
Chinese Office Action issued by the State Intellectual Property Office of the People's Republic of China for Application No. 201280012205.0 dated May 13, 2015 (20 pages).
Chinese Office Action issued by the State Intellectual Property Office of the People's Republic of China for Application No. 201280012210.1 dated May 21, 2015 (30 pages).
Clark, Jr., Leland C. and Gollan, Frank, "Survival of Mammals Breathing Organic Liquid Equilibrated With Oxygen at Atmospheric Pressure", Science, vol. 152, pp. 1755-1756 (Jun. 24, 1966).
Costerton, J. et al., "Bacterial biofilms: a common cause of persistent infections," Science, vol. 284, No. 5418, pp. 1318-1322 (May 21, 1999).
Costerton, J.W. et al., "Bacterial biofilms in nature and disease," Ann. Rev. Microbiol., vol. 41, pp. 435-464 (1987).
Cribier, A. et al., "Percutaneous Transcatheter Implantation of an Aortic Valve Prosthesis for Calcific Aortic Stenosis," Circulation, vol. 106, pp. 3006-3008 (Nov. 25, 2002).
Crnich, C.J. & G. Maki, D.G., "The Promise of Novel Technology for the Prevention of Intravascular Device-Related Bloodstream Infection. I. Pathogenesis and Short-Term Devices," Clinical Infectious Diseases, vol. 34, pp. 1232-1242 (May 1, 2002).
De Beer, D. & Stoodley, P., "Microbial Biofilms," Prokaryotes, vol. 1, pp. 904-937 (2006).
De Gennes, P.G. et al., "Capillarity and Wetting Phenomena: drops, bubbles, pearls, waves," Springer, New York, 151 pages (2004).
Dieter, R.S., "Coronary artery stent infection," Clin. Cardiol., vol. 23, pp. 808-810 (Jan. 6, 2000).
Dismukes et al., "Prosthetic valve endocarditis: Analysis of 38 cases," Circulation, vol. 48, pp. 365-377 (Aug. 1973).
Drelich, et al., "Measurement of Interfacial Tension in Fluid-Fluid Systems", Encyclopedia of Surface and Colloid Science, pp. 3152-3166 (Jan. 2002).
Fadeev, A. Y. and McCarthy, T. J., "Surface Modification of Poly(ethylene terephthalate) to Prepare Surfaces with Silica-Like Reactivity," Langmuir, vol. 14, No. 19, pp. 5586-5593 (1998).
Fowkes, F.M., "Attractive forces at interfaces," Ind. Eng. Chem., vol. 56, pp. 40-52 (Dec. 1964).
Fuerstman, et al., "Coding/Decoding and Reversibility of droplet trains in Microfluidic networks," Science, vol. 315, No. 5813, pp. 828-832 (Feb. 9, 2007).
Gao, L. and McCarthy, T.J., "Teflon is Hydrophilic. Comments on Definitions of Hydrophobic, Shear versus Tensile Hydrophobicity, and Wettability Characterization," Langmuir, vol. 24, pp. 9183-9188 (Sep. 2, 2008).
Garg, N. et al., "Acute Coronary Syndrome Caused by Coronary Artery Mycotic Aneurysm Due to Late Stent Infection Localized With Radiolabeled Autologous Leukocyte Imaging," Clin. Nucl. Med., vol. 34, pp. 753-755 (Nov. 2009).
George, P.A. et al., "Self-assembling polystyrene-block poly(ethylene oxide) copolymer surface coatings: resistance to protein and cell adhesion," Biomaterials, vol. 30, pp. 2449-2456 (May 2009).
Gristina, A.G. Et al., "Biomaterial-centered sepsis and the total artifical heart. Microbial adhesion vs tissue integration," JAMA, vol. 259, pp. 870-874 (Feb. 1988).

(56) References Cited

OTHER PUBLICATIONS

Hall-Stoodley, L. et al., "Bacterial biofilms: from the natural environment to infectious diseases," Nature Reviews Microbiology, vol. 2, No. 2, pp. 95-108 (Feb. 2004).
Hatton, et al., "Assembly of large-area, highly ordered, crack-free inverse opal films," Proceedings of the National Academy of Science of the United States of America, vol. 107, No. 23, pp. 10354-10359 (Jun. 8, 2010).
Hearn, A.T. et al., "Endovascular stent infection with delayed bacterial challenge," American Journal of Surgery, vol. 174, pp. 157-159 (Aug. 1997).
Hejazi, et al., "Wetting Transitions in Two-, Three-, and Four-Phase Systems", Langmuir, vol. 28, pp. 2173-2180, (2012).
Inazaki, S. et al., "Surface modification of polytetrafluoroethylene with ArF excimer laser irradiation," J. Photopoly. Sci. Technol. vol. 7, No. 2, pp. 389-396 (1994).
International Search Report and Written Opinion issued by the European Patent Office as International Searching Authority for International Application No. PCT/US2013/050403 dated Dec. 4, 2013 (21 pages).
International Search Report and Written Opinion issued by the International Searching Authority for International Application No. PCT/US14/25935 dated Jan. 23, 2015 (11 pages).
International Search Report and Written Opinion issued by the International Searching Authority for International Application No. PCT/US2013/050406 dated Nov. 20, 2013 (20 pages).
International Search Report and Written Opinion Issued by the U.S. Patent and Trademark Office as International Searching Authority for International Application No. PCT/US09/48880 dated Nov. 17, 2009 (14 pgs.).
International Search Report and Written Opinion Issued by the European Patent Office as International Searching Authority for International Application No. PCT/US11/44553 dated Oct. 31, 2011 (10 pgs.).
International Search Report and Written Opinion issued in PCT/US2012/021929, dated Aug. 21, 2012. 23 pages.
International Search Report issued by the European Patent Office as International Searching Authority for International Application No. PCT/US2013/021056 dated Jun. 6, 2013 (21 pgs.).
International Search Report issued in PCT/US2012/021928, dated Aug. 10, 2012, 6 pages.
Ishino, et al., "Wicking Within Forests of Micropillars", EPL Journal, vol. 79, pp. 56005-p1-56005-p5, Sep. 2007, 5 pages.
Israelachvili, Jacob N., "Intermolecular and Surface Forces—Third Edition," Academic Press, 706 pages (2011).
Karchmer, A.W. et al., "*Staphylococcus epidermidis* causing prosthetic valve endocarditis: microbiologic and clinical observations as guides to therapy," Ann. Intern. Med., vol. 98, pp. 447-455, (Apr. 1, 1983).
Khoo, X. et al., "Directed assembly of PEGylated-peptide coatings for infection-resistant titanium metal," J. Am. Chem. Soc., vol. 131, pp. 10992-10997 (No month listed 2009).
Kim, et al., "Structural Transformation by Electrodeposition on Patterned Substrates (STEPS): A new Versatile Nanofabrication Method," Nano Letters, vol. 12, No. 2, pp. A-G (Mar. 2011).
Kobayashi, H. and Owen, M.J., "Surface tension of poly[(3,3,4,4,5,5,6,6,6-nonafluorohexyl)-methylsiloxane]," Macromolecules, vol. 23, No. 23, pp. 4929-4933 (1990).
Koschwanez, H.E. et al., "In vitro and in vivo characterization of porous poly-L-lactic acid coatings for subcutaneously implanted glucose sensors," Journal of Biomedical Materials Research Part A, pp. 792-807 (Dec. 2008).
Lee, Woo, et al., "Fast fabrication of long-range ordered porous alumina membranes by hard anodization," Nature Mater., vol. 5, pp. 741-747 (Sep. 2006).
Li, Yang, et al., "Bioinspired Self-Healing Superhydrophobic Coatings," Angewandte Chemie, vol. 49, No. 35, pp. 6129-6133 (Aug. 16, 2010).
Lillehoj, et al., "A self-pumping lab-on-a-chip for rapid detection of botulinum toxin," Lab Chip, vol. 10, pp. 2265-2270 (Jun. 11, 2010).

Lin, T-K, et al., "Surface modification of polytetrafluoroethylene films by plasma pretreatment and graft copolymerization to improve their adhesion to bismaleimide," Polym. Int., vol. 58, No. 1, pp. 46-53 (Jan. 2009).
Matsunaga, Mariko, et al., "Controlling the Stability and Reversibility of Micropillar Assembly by Surface Chemistry," J. Am. Chem. Soc., vol. 133, No. 14, pp. 5545-5553, 4 pages (Dec. 2, 2011).
Meuler, Adam J. et al., "Relationships between Water Wettability and Ice Adhesion," ACS Applied Materials and Interfaces, vol. 2, No. 11, 31 pages (Oct. 15, 2010).
MicroSurfaces, Inc., "Anti-Stiction Coatings in MEMS Devices," MicroSurfaces, Inc., retreived from website URL: http://memsurface.com/stiction.html, 2 pages (retrieved on Dec. 8, 2011).
Munro, W.A. et al., "Deterioration of pH electrode response due to biofilm formation on the glass membrane," Sensors and Actuators B—Chem, vol. 37, pp. 187-194 (Dec. 1996).
Nguyen, et al., "Quantitative Testing of Robustness on Superomniphobic Surfaces by Drop Impact", Langmuir, 26(23):18369-18373, Dec. 7, 2010, 5 pages.
Niimi, Y. et al., "The effects of heparin coating of oxygenator fibers on platelet adhesion and protein adsorption," Anesth. Analg., vol. 89, pp. 573-579 (May 12, 1999).
Database WPI Weekly 198933, Thomson Scientific, London, GB, AN 1989-237086, XP002694116 & JP1170932A (Nippon Sheet Glass Co. Ltd.) 1 page (Jul. 6, 1989) (abstract).
Noetzel, M.J. & Baker, R.P., "Shunt fluid examination: risks and benefits in the evaluation of shunt malfunction and infection," J. Neurosurg., vol. 61, pp. 328-332 (Aug. 1984).
Nosonovsky, "Multiscale Roughness and Stability of Superhydrophobic Biomimetic Interfaces", Langmuir, 23(6):3157-3161, Feb. 13, 2007, 5 pages.
Nosonovsky, et al., "Biomimetic Superhydrophobic Surfaces: Multiscale Approach", Nano Letters, vol. 7, No. 9, pp. 2633-2637, Aug. 17, 2007.
O'Toole, G., et al., "Biofilm Formation as Microbial Development," Annu. Rev. Microbiol., vol. 54, pp. 49-79, 35 pages (2000).
Park, K.D. et al., "Bacterial adhesion on PEG modified polyurethane surfaces," Biomaterials, vol. 19, No. 7-9, pp. 851-859 (Apr.-May 1998).
Poetes, et al., "Metastable Underwater Superhydrophobicity," Physical Review Letters, vol. 105, Issue 16, pp. 166104.1-166104.4 Published (Oct. 14, 2010).
Pokroy, B. et al., "Fabrication of BioInspired Actuated Nanostructures with Arbitrary Geometry and Stiffness," Adv. Mater., vol. 21, pp. 463-469 (Jan. 26, 2009).
Prakash and Gershenfeld, "Microfluidic Bubble Logic," Science, vol. 315, No. 5813, 5 pages (Feb. 9, 2007).
Prime, K.L. & Whitesides, G.M., "Self-assembled organic monolayers: model systems for studying adsorption of proteins at surfaces," Science, vol. 252, No. 5009, p. 1164-1167 (May 24, 1991).
Quere, D., "Wetting and roughness," Annu. Rev. Mater. Res., vol. 38, pp. 71-99 (Apr. 7, 2008).
Raza, et al., "Superhydrophobic Surfaces by Anomalous Fluoroalkylsilane Self-Assembly on Silica Nanosphere Arrays", Langmuir, 26(15):12962-12972, Aug. 3, 2010, 11 pages.
Rothemund, Paul W.K., "Folding DNA to create nanoscale shapes and patterns," Nature, vol. 440, pp. 297-302, Mar. 16, 2006.
Rowe, David J., "Chemistry and Technology of Flavors and Fragrances," Blackwell Publishing Ltd, 12 pages—Title Page, Copyright Page and Table of Contents Only (2005).
Shaffer, T.H. et al., "Liquid Ventilation," Pediatric Pulmonology, vol. 14, pp. 102-109 (Oct. 1992).
Shafrin, E.G. & Zisman, W.A., "Constitutive relations in the wetting of low energy surfaces and the theory of the retraction method of preparing monolayers," J. Phys. Chem., vol. 64, pp. 519-524 (May 1960).
Skattum, L. et al., "Complement deficiency states and associated infections," Mol. Immunol., vol. 48, No. 14, pp. 1643-1655 (Aug. 2011).
Sohail, M.R. et al., "Risk factor analysis of permanent pacemaker infection," Clin. Infect. Dis., vol. 45, pp. 166-173 (Jul. 15, 2007).

(56) References Cited

OTHER PUBLICATIONS

Stober, W. and Fink, A., "Controlled growth of monodisperse silica spheres in the micron size range," Journal of Colloid and Interface Science, vol. 26, No. 1, pp. 62-69 (Jan. 1968).
Trevors, J.T., "Silver resistance and accumulation in bacteria," Enzyme Microb. Technol., vol. 9, No. 6, pp. 331-333 (Jun. 1987).
Tuli, S. et al., "Risk factors for repeated cerebrospinal shunt failures in pediatric patients with hydrocephalus," J. Neurosurg., vol. 92, pp. 31-38 (Jan. 2000).
Tuteja, Anish, et al., "Designing Superoleophobic Surfaces," Science, vol. 318, No. 5856, pp. 1618-1622 (Dec. 7, 2007) www.sciencemag.org.
Tuteja, Anish, et al., "Robust omniphobic surfaces," PNAS, vol. 105, No. 47, pp. 18200-18205 (Nov. 25, 2008).
Varanasi, Kripa K. et al., "Frost formation and ice adhesion on superhydrophobic surfaces," Applied Physics Letters, vol. 97, pp. 234102-1-234102-3 (2010).
Voskerician, G. et al., "Biocompatibility and biofouling of MEMS drug delivery devices," Biomaterials, vol. 24, pp. 1959-1967 (2003).
Wasserscheid, P. and Welton, T., "Ionic Liquids in Synthesis," Wiley-VCH Verlag GmbH & Co., 380 pages (2002).
Wenzel, "Resistance of Solid Surfaces to Wetting by Water", Industrial and Engineering Chemistry, 28(8):988-994, Aug. 1936, 7 pages.
Williams, Kirt R., et al., "Etch Rates for Micromachining Processing—Part II," Journal of Microelectromechanical Systems, vol. 12, No. 6, pp. 761-778 (Dec. 2003).
Wilson, G.S. & Gifford, R., "Biosensors for real-time in vivo measurements," Biosens. Bioelectron, vol. 20, pp. 2388-2403 (Jan. 15, 2005).
Wong, P.K. et al., "Deformation of DNA Molecules by Hydrodynamic Focusing," Journal of Fluid Mechanics, vol. 497, pp. 55-65 (2003).
Wong, Pak Kin, et al., "Closed-loop control of cellular functions using combinatory drugs guided by a stochastic search algorithm," Proceedings of National Academy of Science for the United States of America, vol. 105, No. 13, pp. 5105-5110 (Apr. 1, 2008).
Wong, T. S. et al., "Bioinspired self-repairing slippery surfaces with pressure-stable omniphobicity," Nature, vol. 477, No. 7365, pp. 443-447 (Sep. 22, 2011).
Wool, "Self-Healing Materials: A Review", Soft Matter, 4:400-418, Advance Article published online, Jan. 10, 2008, 19 pages.
Xu, Q. et al., "Approaching Zero: Using Fractured Crystals in Metrology for Replica Molding," J. Am. Chem. Soc., vol. 127, No. 3, pp. 854-855 (2005).
Zhao, L. et al., "Antibacterial coatings on titanium implants," Journal of Biomedical Materials Research Part B: Applied Biomaterials, vol. 91, No. 1, pp. 470-480 (2009).
Liu et al., "Organogel-based Thin Films for Self-Cleaning on Various Surfaces," Advanced Materials, 5 pages, (2013).
Miller-Chou et al., "A review of polymer dissolution," Progress in Polymer Science, vol. 28, pp. 1223-1270, (2003).
Zhu et al., "Ice-phobic Coatings Based on Silicon-Oil-Infused Polydimethylsiloxane," American Chemical Society Applied Materials & Interfaces, vol. 5, pp. 4053-4062, (2013).
Saido et al., "A Growth of Aspergillus niger on Surface of Polymer Films was Observed by FT-IR and Scanning Electron Microscope", Materials Life, Oct. 8, 1991, vol. 3 No. 4, pp. 218-224. English translation. (31 pages).
Hozumi et al., "Hydrophobization of Metal/Metal Oxide Surfaces Using Monolayer Films", Journal of the Surface Finishing Society of Japan, Oct. 9, 2009, vol. 60, No. 1, pp. 16-20. English translation. (9 pages).
Japanese Decision of Rejection dated Nov. 28, 2017, in Japanese Application No. 2014-552304, translation and original. (10 pages).

\* cited by examiner

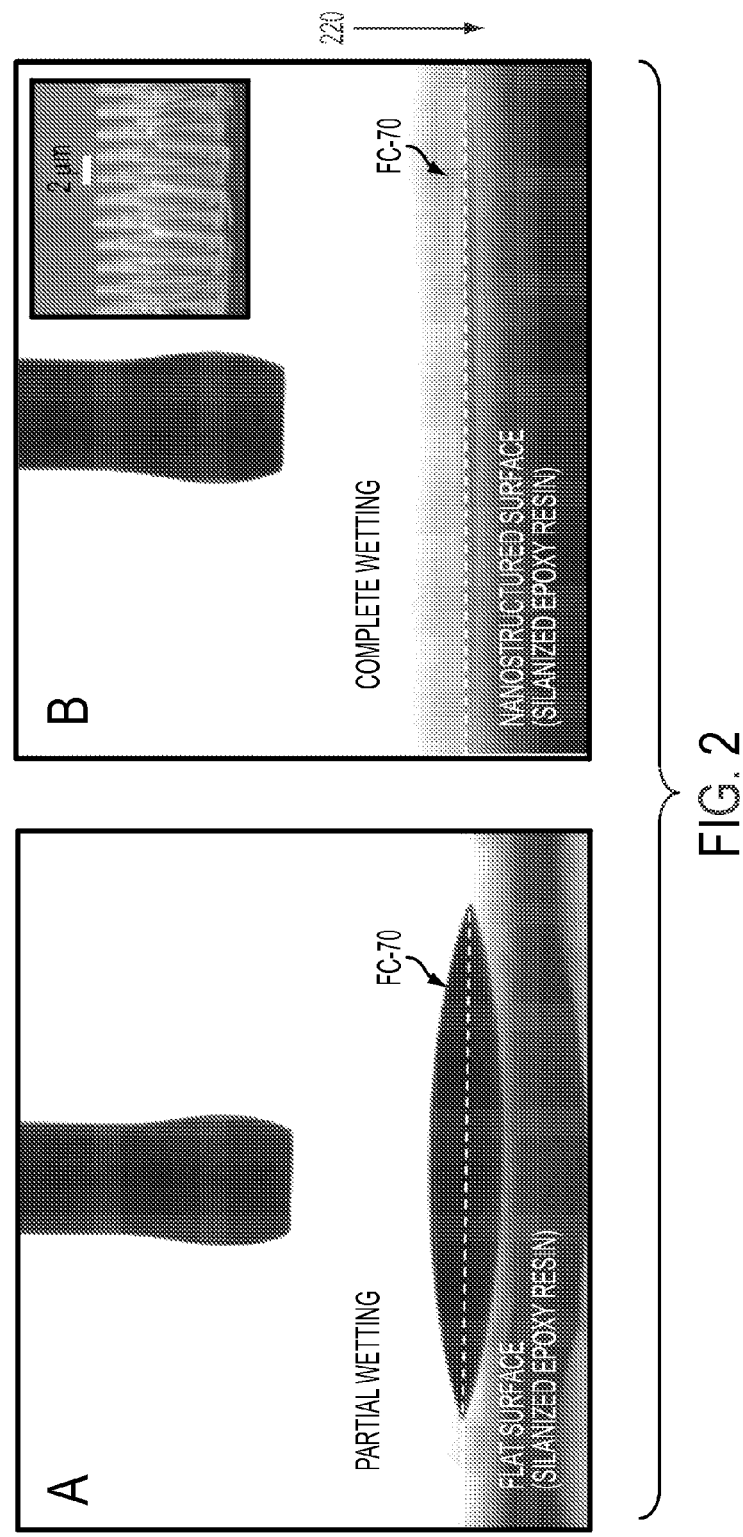

FIG. 3A — STRUCTURES OF LUBRICANTS

- DUPONT KRYTOX 100: $F-(CF(CF_3)-CF_2-O)_n-CF_2CF_3$ or $F-(CF(CF_3)-CF_2-O)_n-CF_2(CF_3)_2$
- MINERAL OIL: LONG CHAIN ALKANES BETWEEN C15 AND C40
- SIGMA ALDRICH SILICONE OIL & MOMENTIVE ELEMENT 14 5A: polydimethylsiloxane $[-Si(CH_3)_2-O-]_n$
- PECOSIL FSL-150 & PECOSIL FSH-150: fluorinated siloxane copolymer with $(CH_2)_y$ and $(CF_2)_x CF_3$ side chains
- SILTECH F-50: methyltris(trimethylsiloxy)silane
- METHYLTRIS(TRIMETHYLSILOXY)SILANE
- PHENYL-T-BRANCHED POLYSILSESQUIOXANE
- POLYDIETHYL SILOXANE: $[-Si(C_2H_5)_2-O-]_n$

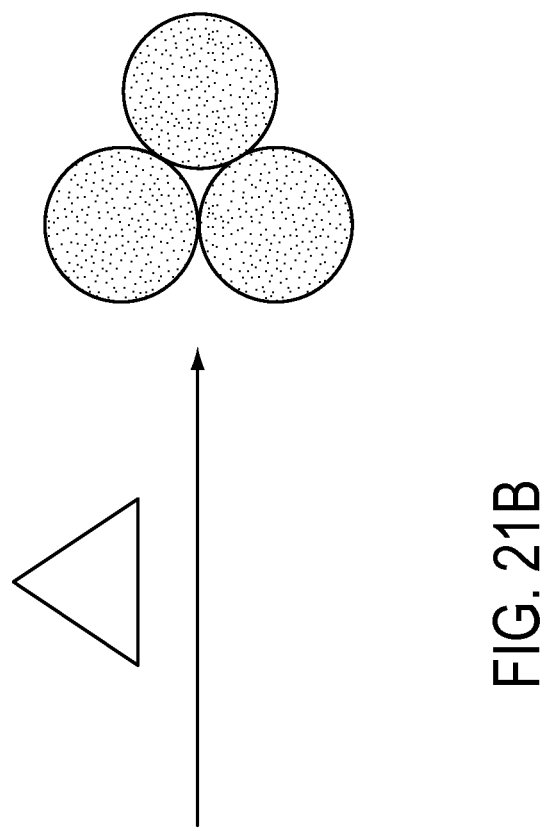
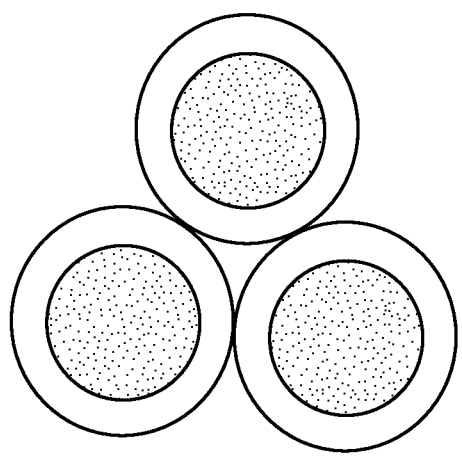
FIG. 21B

SLIPS SURFACE BASED ON METAL-CONTAINING COMPOUND

RELATED APPLICATION

This application is a National Stage Entry of PCT International Application No. PCT/US2013/050364 filed on Jul. 12, 2013 which claims priority to U.S. Provisional Patent Application Nos. 61/671,645 and 61/671,442 filed on Jul. 13, 2012 and 61/673,705 filed on Jul. 19, 2012, the contents of which are incorporated herein by reference in their entireties.

This application is also related to the following co-pending applications filed on even date herewith: International Application entitled SELECTIVE WETTING AND TRANSPORT SURFACES and International Application entitled MULTIFUNCTION REPELLENT MATERIALS, the contents of which are incorporated herein by reference in their entireties.

STATEMENT OF GOVERNMENT RIGHTS

This invention was made with government support under N66001-11-1-4180 awarded by the U.S. Department of Defense, under N00014-11-1-0641 awarded by the U.S. Department of Navy, and under DE-AR0000326 awarded by the U.S. Department of Energy. The government has certain rights in the invention.

TECHNICAL FIELD

The field of this application generally relates to slippery surfaces, methods for forming them, and their uses.

BACKGROUND

Current development of liquid-repellent surfaces is inspired by the self-cleaning abilities of many natural surfaces on animals, insects, and plants. Water droplets on these natural surfaces roll off or slide off easily, carrying the dirt or insects away with them. The presence of the micro/nanostructures on many of these natural surfaces has been attributed to the water-repellency function. These observations have led to enormous interests in manufacturing biomimetic water-repellent surfaces owing to their broad spectrum of potential applications, ranging from water-repellent fabrics to friction-reduction surfaces. It is sometimes advantageous to create omniphobic surfaces that repel variety of objects and be able to create such surfaces on arbitrary materials.

SUMMARY

Liquid repellant surfaces having selective wetting and transport properties and their applications in a variety of fields are described.

Disclosed subject matter includes, in one aspect, a method of preparing an article having a slippery surface, which includes providing a metal-containing surface, chemically modifying the metal-containing surface to roughen the metal-containing surface, and disposing a lubricating layer on the roughened metal-containing surface, wherein the lubricating layer is substantially stabilized on the roughened metal-containing surface.

In some embodiments, the method further includes functionalizing the roughened metal-containing surface to enhance affinity of the roughened metal-containing surface to the lubricating layer.

In some embodiments, the metal is selected from the group of Li, Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Ru, Rh, Pd, Ag, Cd, In, Sn, Sb, Cs, Ba, Hf, Ta, W, Re, Os, Ir, Pt, Au, Tl, Pb, Bi, La, Ce, Pr, Nd, Sm, Eu, Gd, Tb, Dy, Ho, Er, Tm, Yb, Lu, or a combination thereof.

In some embodiments, the metal-containing surface contains aluminum and the roughened metal-containing surface contains boehmite.

In some embodiments, the providing step comprises providing a substantially pure metal or metal alloy substrate.

In some embodiments, the providing step comprises depositing, a metal-containing thin film on an arbitrary substrate to form in the metal-containing surface.

In some embodiments, the providing step comprises depositing a metal-containing sol-gel precursor on a substrate to form the metal-containing surface.

In some embodiments, the chemically modifying step comprises reacting the metal-containing surface with an environment to form a porous metal-containing compound layer.

In some embodiments, the porous metal-containing compound layer has a thickness in the range of 10 nm-1000 μm.

In some embodiments, the porous-metal-containing compound layer is optically transparent.

In some embodiments, the porous metal-containing compound layer is optically transparent in 200 nm-400 nm wavelength.

In some embodiments, the porous metal-containing compound layer is optically transparent in 400 nm-700 nm wavelength.

In some embodiments, the porous metal-containing compound layer is optically transparent in 700 nm-1000 nm wavelength.

In some embodiments, the porous metal-containing compound layer contains compound selected from the group of metal oxides, metal hydroxides, metal oxy-hydroxides, metal salts, organic and inorganic acids, metal sulfides, metal selenides, metal tellurides, metal nitrides, metal phosphides, metal antimonides, metal arsenides, organometallic or coordination compounds, and a mixture thereof.

In some embodiments, the porous metal-containing compound layer contains metal oxide nanorods, nanotubes, nanofibers, or nanowires.

In some embodiments, the porous metal-containing compound layer contains pure or mixed metal fatty acid salts, metal-carboxylates, or metal-organophosphonates.

In some embodiments, the porous metal-containing compound layer contains tungsten oxide.

In some embodiments, the chemically modifying step comprises at least one of solvolysis and heat treatment to generate the roughened metal-containing surface.

In some embodiments, the solvolysis includes hydrolysis, alcoholysis, acid-based reaction, alkaline-based reaction, oxidation reaction, hydrothermal reaction, or solvothermal reaction.

In some embodiments, the acid-based reaction uses at least one of an organic acid or a inorganic acid.

In some embodiments, the metal-containing sol-gel precursor contains a porogen.

In some embodiments, the method further includes removing the porogen from the metal-containing surface after the metal-containing sol-gel precursor is deposited on the substrate.

In some embodiments, the method further includes pretreating the substrate to improve adhesion of the substrate to the metal-containing sol-gel layer.

In some embodiments, the pre-treating step comprises plasma treating the substrate.

In some embodiments, the pre-treating step comprises treating the substrate with strong oxidizer.

In some embodiments, the pre-treating step comprises applying an adhesion promoter to the substrate.

In some embodiments, the adhesion promoter comprises dopamine or polydopamine.

In some embodiments, the adhesion promoter comprises Ti or Cr.

In some embodiments, the metal-containing sol-gel precursor is photo-curable.

In some embodiments, the metal-containing sol-gel precursor is a sol-gel alumina precursor and the roughened metal-containing surface comprises boehmite.

In some embodiments, the functionalizing step comprises exposing the roughened metal-containing surface to at least one organic derivative in the form of $(T)_n\text{-}A\text{-}(R)_a(OR)_b(O)_c(H)_d(OH)_e$, where T is a terminal functional group to be exposed on the surface; A is a center atom selected from B, C, N, Si, P, S; R is an alkyl group; OR is an alkoxy group; O is an oxygen or sulfur double bonded to the center atom A; H is a hydrogen; OH is a hydroxyl group or thiol group or a secondary amine group that is double bonded to the center atom; the subscripts n, a, b, c, d, e are integers equal to or greater than zero; and the sum of the subscripts n, a, b, c, d, e matches with the oxidation number of the center atom.

In some embodiments, the at least one organic derivative is thiols, silanes, sulfonic acids, carboxylic acids, phosphonic acids, phosphinic acids, phosphoric acids, or esters thereof.

Disclosed subject matter includes, in another aspect, a method of preparing an article having a slippery surface, which includes providing a surface containing metal, subjecting the surface to hydrolysis to form a metal hydroxide layer thereon, converting the metal hydroxide layer by heat treatment into a metal oxide or metal oxyhydroxide layer with a high surface area, functionalizing the metal oxide or oxyhydroxide layer to enhance its affinity to a lubricating layer, and disposing the lubricating layer on the metal oxide or oxyhydroxide layer, wherein the lubricating layer is substantially stabilized on the metal oxide or oxyhydroxide layer to form a repellant surface.

In some embodiments, the metal contains aluminum and the metal oxide layer contains boehmite.

Disclosed subject matter includes, in yet another aspect, a method of preparing a slippery surface, which includes treating a surface by flowing an adhesion promoter over the surface, coating a metal-containing sol-gel precursor onto the surface by flowing the metal-containing sol-gel precursor over the surface, chemically modifying the surface to form a porous metal-containing layer on the surface, functionalizing the porous metal-containing layer to enhance affinity of the porous metal-containing layer to a lubricating layer by flowing a functionalizing agent over the surface, and applying the lubricating layer onto the porous metal-containing layer by flowing a lubricant over the surface, wherein the lubricating layer is substantially stabilized in and on the porous metal-containing layer to form a repellant surface.

In some embodiments, the chemically modifying step comprises subjecting the surface to hydrolysis to form a metal hydroxide layer thereon and converting the metal hydroxide layer by heat treatment into a porous metal-containing layer.

In some embodiments, the adhesion promoter comprises dopamine or polydopamine, the metal-containing sol-gel precursor is a sol-gel alumina precursor and the porous metal-containing layer contains boehmite.

In some embodiments, the surface is an inner surface of a fluidic channel.

In some embodiments, the surface is a surface of a complex curvature.

In some, embodiments, the surface is an internal or shadowed surface of an article.

In some embodiments, the surface is an inner surface of a medical device, medical tube, medical implant, or medical optical window.

In some embodiments, the porous metal-containing layer is optically transparent.

Disclosed subject matter includes, in yet another aspect, an article having a repellant surface, which includes a substrate, a porous layer on the substrate comprising metal oxide, an adhesion-promoting layer between the substrate and the porous layer, and a lubricant layer wetting and adhering to the porous layer, wherein the lubricant layer is substantially stabilized on the porous layer to form a repellant surface.

In some embodiments, the porous layer comprises dopamine.

BRIEF DESCRIPTION OF THE DRAWINGS

The following figures are provided for the purpose of illustration only and are not intended to be limiting.

FIG. 2 A-B illustrates the wetting behaviors of an exemplary lubricating Liquid B on a flat surface and a roughened surface;

FIG. 3A illustrates structures of some exemplary lubricants (Liquid B).

FIG. 21B illustrates a representation of hypothesized mechanism that leads to micelle formation;

DETAILED DESCRIPTION

The patent and scientific literature referred to herein establishes knowledge that is available to those of skill in the art. The issued U.S. patents, allowed applications, published foreign applications, and references, that are cited herein are hereby incorporated by reference to the same extent as if each was specifically and individually indicated to be incorporated by reference.

For convenience, certain terms employed in the specification, examples and claims are collected here. Unless defined otherwise, technical and scientific terms used in this disclosure have the same meanings as commonly understood by one of ordinary skill in the art to which this disclosure belongs. The initial definition provided for a group or term provided in this disclosure applies to that group or term throughout the present disclosure individually or as part of another group, unless otherwise indicated.

The present disclosure describes slippery surfaces referred to herein as Slippery Liquid-Infused Porous Surfaces (SLIPS). In certain embodiments, the slippery surfaces of the present disclosure can exhibit omniphobic, anti-adhesive, and anti-fouling properties. The slippery surfaces of the present disclosure can prevent adhesion of a wide range of materials. Exemplary materials that do not stick onto the surface can include liquids, solids, and gases (or vapors). For example, liquids such as water, oil-based paints, hydrocarbons and their mixtures, organic solvents, complex fluids such as crude oil, fluids containing complex biological molecules (such as proteins, sugars, lipids, etc.), and biological cells and the like can be repelled. The liquids can be both pure liquids and complex fluids. In certain embodiments, SLIPS can be designed to be omniphobic, where SLIPS exhibit both hydrophobic and oleophobic properties. As an example, solids such as bacteria, insects, fungi, and the like can be repelled. As another example, solids such as ice, paper, sticky notes, inorganic particle-containing paints, dust particles, and the like can be repelled or cleaned. More information about SLIPS surfaces can be found in International Patent Application Nos. PCT/US2012/21928 and PCT/US2012/21929, both filed Jan. 19, 2012, the contents of which are hereby incorporated by reference in their entireties.

SLIPS Fundamentals

Figure 1:
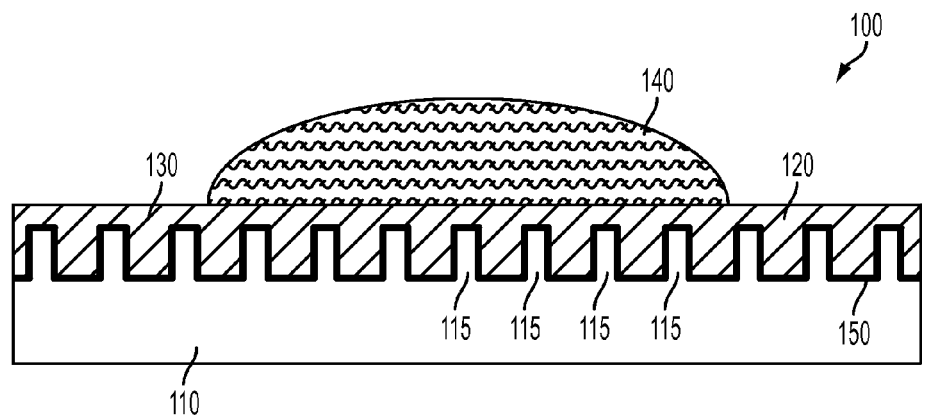
FIG. 1 contains a schematic diagram of an exemplary overall design of slippery liquid-infused porous surfaces (SLIPS)

A schematic diagram of an exemplary overall design of SLIPS is illustrated in FIG. 1. The materials that can be prevented from sticking to the slippery surfaces disclosed herein are referred to as "Object A." Object A that is in fluid form is referred to as "Object A in fluid form," "liquefied Object A," or "Liquid A." Object A that is in solid form is referred to as "Object A in solidified form," "solidified Object A," or "Solid A." In certain embodiments, Object A can contain a mixture of both solids and fluids. While reference is made to either "fluid A" or "liquid A" in various locations in this description, it is understood that the Object A in fluid form can be either a liquid or a gas wherever reference to a fluid or a liquid is made.

A wide range of materials (Object A) can be repelled by the slippery surfaces of the present disclosure. For example, Object A can include polar and non-polar Liquids A and their solidified forms, such as hydrocarbons and their mixtures (e.g., from pentane up to hexadecane and mineral oil, paraffinic extra light crude oil; paraffinic light crude oil; paraffinic light-medium crude oil; paraffinic-naphthenic medium crude oil; naphthenic medium-heavy crude oil; aromatic-intermediate medium-heavy crude oil; aromatic-naphthenic heavy crude oil, aromatic-asphaltic crude oil, etc.), ketones (e.g., acetone, etc.), alcohols (e.g., methanol, ethanol, isopropanol, dipropylene glycol, ethylene glycol, and glycerol, etc.), water (with a broad range of salinity, e.g., sodium chloride from 0 to 6.1 M; potassium chloride from 0 to 4.6 M, etc.), acids (e.g., concentrated hydrofluoric acid, hydrochloric acid, nitric acid, etc.) and bases (e.g., potassium hydroxide, sodium hydroxide, etc.), and ice, etc. Object A can include biological molecules such as proteins, polysaccharides, etc., biological fluids such as urine, blood, saliva, secretions, and biological cells, tissues and entire organisms such as bacteria, protozoa, spores, algae, insects, small animals, viruses, fungi, and the like. Object A can include solid particles suspended in liquid. Object A can include non-biological objects, such as dust, colloidal suspensions, spray paints, food items, common household contaminants, and the like. Object A can include gases, such as natural gas, air, or water vapors. The list is intended to be exemplary and the slippery surfaces of the present disclosure can successfully repel numerous other types of materials.

The lubricant providing slippery surfaces disclosed herein is referred to as "Liquid B." Liquid B can be selected from a number of different materials, and can be chemically inert and unreactive with respect to the solid surface and Object A. Liquid B can be either a pure liquid, a mixture of liquids, or a complex fluid a liquid+solid components). Liquid B can flow readily into the surface recesses of the roughened surface and can generally form an ultra-smooth surface when provided over the roughened surface. In certain embodiments, Liquid B can form a substantially molecularly or even atomically flat surface when provided over a roughened surface. In certain embodiments, the average roughness of the exposed surface of Liquid B can be less than 1 nm, where the roughness represents an upper bound for the actual roughness of Liquid B as this reaches the physical roughness limits for flat PDMS and UVO 114 epoxy resin. In such embodiments, Liquid B can overcoat the surface topographies of the porous solid, forming a nearly molecularly smooth surface. In other embodiments, the lubricant layer follows the topography of the structured surface and forms a conformal smooth coating (e.g., instead of forming a smooth layer that overcoats all the textures). For example, the lubricant may follow the topography of the structured surface if the equilibrium thickness of the lubricant layer is less than the height of the textures. While a smooth layer that overcoats all the textures provides the best performance, conformal smooth lubricant coating, which follows the topography of the structured surface and can arise from the diminished lubricant layer, still shows significantly better performance than the underlying substrate that was not infused with the lubricant.

Liquid B can be selected from a number of different liquids. For example, perfluorinated or partially fluorinated hydrocarbons or organosilicone compound (e g, silicone elastomer) or long chain hydrocarbons and their derivatives (e.g., mineral oil, vegetable oils) and the like can be utilized. In particular, the tertiary perfluoroalkylamines (such as perfluorotri-n-pentylamine, FC-70 by 3M, perfluorotri-n-butylamine FC-40, etc.), perfluoroalkylsulfides and perfluoroalkylsulfoxides, perfluoroalkylethers, perfluorocycloethers (such as FC-77) and perfluoropolyethers (such as Krytox family of lubricants by DuPont, Fomblin family of lubricants by Solvay), perftuoroalkylphosphines and perfluoroalkylphosphineoxides as well as their mixtures can be used for these applications, as well as their mixtures with perfluorocarbons and any and all members of the classes mentioned. In addition, long-chain perfluorinated carboxylic acids (e.g., perfluorooctadecanoic acid and other homologues), fluorinated phosphoric; and sulfonic acids, fluorinated silanes, and combinations thereof can be used as Liquid B. The perfluoroalkyl group in these compounds could be linear or branched and some or all linear and branched groups can be only partially fluorinated. In addition, organosilicone compounds such as linear or branched polydimethylsiloxane (PDMS) (e.g. Momentive Element family silicone lubricants, Siltech silicone lubricants), polydiethylsiloxane (PDES), methyltris(trimethoxysiloxy)silane, phenyl-T-branched polysilsexyquioxane, and copolymers of side-group functionalized polysiloxanes (e.g. Pecosil silicone lubricants) and combinations thereof can be used as Liquid B. In addition, various low molecular weight (up to C14) hydrocarbons (e.g. smokeless paraffin, Isopar™) long-chain (C15 or higher) alkyl petroleum oils or "white oils" (e.g. paraffin oils, linear or branched paraffins, cyclic paraffins, aromatic hydrocarbons to petroleum jelly and wax), and raw or modified vegetable oils and glycerides and combinations thereof can be used as Liquid B.

As illustrated in FIG. 1, an arrangement 100 can include a solid surface 110 having surface features 115 that can provide a certain roughness (e.g., a roughened surface) with a lubricating liquid (Liquid B) 120 applied thereon. Liquid B can wet the roughened surface, filling the hills, valleys, and/or pores of the roughened surface, and forming an ultra-smooth surface 130 over the roughened surface. Due to the ultra-smooth surface resulting from wetting the roughened surface with Liquid B and forming an immobilized flat slippery liquid overlayer, Object A 140 does not adhere to the surface 130 and to the underlying solid 110. In certain embodiments, the surface features 115 can be functionalized with one or more functional moieties 150 that further promote adhesion of the lubricating liquid 120 to the surface features 115. In certain embodiments, the functional moieties 150 can resemble the chemical nature of the lubricating liquid 120. In certain embodiments, the surface features 115 can be functionalized with one or more functional moieties 150 that are hydrophobic.

A contact angle is a reflection of how strongly the liquid and solid molecules interact with each other, relative to how strongly each interacts with its own kind. A contact angle is generally the angle, measured through the liquid, at which a liquid/vapor interface meets a solid surface. It can quantify the wettability of a solid surface by a liquid: if the contact angle is small, a drop of the liquid tends to spread on the solid; if the contact angle is large, the drop of liquid tends to bead up. Any given system of solid, liquid, and vapor at a given temperature and pressure can have a unique value for its equilibrium contact angle. In practice a spectrum of contact angles is usually observed, ranging from the socalled advancing (maximal) contact angle to the receding (minimal) contact angle. The equilibrium contact angle is between these two values.

One common method of measuring this range of contact angles is referred to as the tilting base method. Once a drop is dispensed on the surface with the surface level, the surface is then tilted from 0° to 90°. As the drop is tilted, the downhill side (leading edge) will be in a state of imminent wetting while the uphill side (receding tail) will be in a state of imminent de-wetting. As the tilt increases the downhill contact angle increases and represents the advancing contact angle while the uphill contact angle decreases and represents the receding contact angle. The values for these angles just prior to the drop releasing (i.e. sliding) can typically represent the advancing and receding contact angles. The difference between the advancing contact angle and the receding contact angle is defined as the contact angle hysteresis (CAH). A lower value of contact angle hysteresis is generally considered an indicator of a better repellent performance. In other words, the slipperiness of a surface, and hence the mobility of a liquid droplet (or an object A) and its removal from the surface, increases on a lower contact angle hysteresis surface.

SLIPS can be designed based on the surface energy matching between a lubricating fluid (e.g., 120 in FIG. 1) and a solid (e.g., 110 in FIG. 1), i.e., formation of a stable lubricating film not readily displaced by other immiscible fluids. In some embodiments, SLIPS can be designed based on one or more of the following three factors:

1) The lubricating liquid (Liquid B) can infuse into, wet, and stably adhere within the roughened surface;
2) The roughened surface can be preferentially wetted by the lubricating liquid (Liquid B) rather than by the fluid, complex fluids or undesirable solids to be repelled (Object A), and therefore the lubricating layer cannot be displaced by the liquid or solid to be repelled; and
3) The lubricating fluid (Liquid B) and the object or liquid to be repelled (Object A) can be immiscible and may not chemically interact with each other.

These factors can be designed to be permanent or lasting for time periods sufficient for a desired life or service time of the SLIPS surface or for the time till a re-application of the partially depleted infusing liquid is performed.

The first factor (i.e., a lubricating liquid (Liquid B) can infuse into, wet, and stably adhere within the roughened surface) can be satisfied by using micro- or nano-textured, rough substrates whose large surface areas, combined with chemical affinity for Liquid B, can facilitate complete wetting by, and adhesion of, the lubricating fluid, and its retention in the porous network due to strong capillary forces. The roughened surface material can be selected to be chemically inert to Liquid B and to have good wetting properties with respect to Liquid B. In certain embodiments, Liquid B (and similarly Object A) may be non-reactive with the roughened surface. For example, the roughened surface and Liquid B (or Object A) can be chosen so that the roughened surface does not dissolve upon contact with Liquid B (or Object A).

Roughness, R, is defined as the ratio between the actual and projected areas of the surface 110. R can be any value greater than or equal to 1, such as 1 (flat, smooth surface), 2, 5, or even higher. For complete wetting of Liquid B to occur, R can be selected such that $R \geq 1/\cos \theta_{Bx}$, where $\theta_{Bx}$ is the equilibrium contact angle of Liquid B on a flat solid substrate immersed under medium X (e.g., a water/air/other immiscible fluid medium). For example, if Liquid B has a contact angle of 50° on a flat surface of a specific material, it is desirable for the corresponding roughened surface to have a roughness factor greater than ~1.5. This is illustrated in FIG. 2 for the FC-70 (as Liquid B, 200) spreading on a silanized surfaces of flat 210 (FIG. 2A) and nanostructured (FIG. 2B) epoxy substrates. While on a flat surface the lubricant forms a finite contact angle and does not entirely wet the surface, the structured surface promotes wetting and spreading of Liquid B over the roughened surface to form a film 220 with an apparent contact angle of 0°. The inset image shows an electron micrograph of the nanostructures. The micro- or nano-structures of the roughened surface can promote the spreading out and filling in of the droplet into the valleys of the roughened surface, creating a uniformly-coated slippery functional layer over the topographies. In certain embodiments, a roughened surface can include the surface of a three-dimensionally porous material (e.g., a fibrous net) as well as a solid surface having certain topographies, whether they have regular, quasi-regular, or random patterns, or largely smooth surfaces with very small surface features. The stable adhesion of the liquid 13 to the underlying substrate can also be enhanced through chemical functionalization or applications of a coating (e.g., 150 in FIG. 1) that has a very high affinity to both Liquid B and the substrate, thus producing a stable chemical or physical bonding between the liquid B and the substrate.

To satisfy the second factor (e.g., the roughened surface can be preferentially wetted by the lubricating liquid (Liquid B) rather than by the liquid, complex fluids or undesirable solids to be repelled (Object A)), a determination of the chemical and physical properties required for working combinations of substrates and lubricants can be made. This relationship can be qualitatively described in terms of affinity; to ensure that the Object A to be repelled (fluid or solid) remains on top of a stable lubricating film of Liquid B, Liquid B must have a higher affinity for the substrate than Object A. This relationship can be described as a "stable" region. As stated above, the relationships for a "stable" region can be designed to be satisfied permanently or for a desired period of time, such as lifetime, service time, or for the time till the replenishment/reapplication of the partially depleted infusing liquid is performed. Conversely, where Object A has a higher affinity for the substrate (for example, and un-functionalized region of the substrate) than Liquid B, Object A can displace Liquid B in that region. This relationship can be described as an "unstable" region.

To satisfy the third factor (e.g., the lubricating fluid (Liquid B) and the object or liquid to be repelled (Object A) can be immiscible and may not chemically interact with each other), the enthalpy of mixing between Object A and Liquid B should be sufficiently high (e.g., water/oil; insect/oil; ice/oil, etc.) that they phase separate from each other when mixed together, and/or do not undergo substantial chemical reactions between each other. In certain embodiments, Object A and Liquid B are substantially chemically inert with each other so that they physically remain distinct phases/materials without substantial mixing between the two. For excellent immiscibility between Liquid A and Liquid B, the solubility in either phase should be <500 parts per million by weight (ppmw). For example, the solubility of water (Liquid A) in perfluorinated fluid (Liquid B, e.g., 3M Fluorinert™) is on the order of 10 ppmw; the solubility of water (Liquid A) in polydimethylsiloxane (Liquid B, MW=1200) is on the order of 1 ppmw. In some cases, SLIPS performance could be maintained transiently with sparingly immiscible Liquid A and Liquid B. In this case, the solubility of the liquids in either phase is <500 parts per thousand by weight (ppthw). For solubility of >500 ppthw, the liquids can be said to be miscible. For certain embodiments, an advantage can be taken of sufficiently slow miscibility or mutual reactivity between the infusing liquid and the liquids or solids or objects to be repelled, leading to a satisfactory performance of the resulting SLIPS over a desired period of time.

In certain embodiments, the slippery surface disclosed herein can have a coefficient of friction that is lower than that of polytetrafluoroethylene (PTFE or Teflon™) surface. In certain embodiments, the coefficient of friction may be less than 0.1, less than 0.05, or even less than 0.04. In certain embodiments, the coefficient of friction can be measured by sliding two different surfaces against each other. The value of the coefficient can depend on the load applied onto the surfaces, the sliding velocity, and the materials of the surfaces. For example, a reference surface, such as a polished steel, could be used to slide against the target surfaces, such as Teflon, or the SLIPS of the present disclosure could be used to slide against itself (e.g., SLIPS/SLIPS) to obtain the coefficients of friction (both static and dynamic).

In certain embodiments, Object A may slide off from SLIPS by gravity when the surface is tilted at an angle with respect to the horizontal, given that the size of Object A, either in liquid form or in solidified form, is larger than a characteristic size. Specifically, the effect of gravity on Object A may be more dominant when its size is much larger than the capillary length of Liquid A. Specifically, capillary length is a characteristic length scale that that quantifies the dominance of body force over surface force on an object, which can be quantitatively expressed as $(\gamma/\rho g)^{1/2}$, where $\gamma$, $\rho$, and g are surface tension and density of the liquid, and gravity, respectively. For example, size of Solid A or of Liquid A may be at least 3 times larger than the capillary length of Liquid A. In certain embodiments, more than one different Object A can be repelled. In certain embodiments, the combination of two or more Object A may together be more readily repelled as compared to just one Object A.

In certain embodiments, Liquid B can have a high density. For example, Liquid B can have a density greater than 1.0 g/cm$^3$, 1.6 g/cm$^3$, or even 1.9 g/cm$^3$. In certain embodiments, the density of Liquid B can be greater than that of Object A to enhance liquid repellency and lubricant retention in the porous network. High density fluids can reduce the tendency of any impacting liquid to 'sink' below the surface of Liquid B and become entrained therein. For Object A whose size is smaller than its capillary length (assuming Object A is in liquid form), it is possible that the Liquid B has a density lower than that of the Object A, where the SLIPS formed by Liquid B can remain functional.

In certain embodiments, Liquid B can have a low freezing temperature, such as lower than −5° C., −25° C., or even −80° C. Having a low freezing temperature can help allow Liquid B to maintain its slippery behavior at low temperatures and to repel a variety of liquids or solidified fluids, such as ice, frost, supercooled water, and the like, for applications such as anti-icing surfaces.

In certain embodiments, Liquid B can have a low evaporation rate, such that the rate of decrease in the thickness of Liquid B can be less than 1 nm/s, less than 0.1 nm/s, or even less than 0.01 nm/s. In one example, when the thickness of Liquid B is about 10 μm and an evaporation rate is about 0.01 nm/s, the SLIPS surface can remain highly liquid-repellant for a long period of time without any refilling mechanisms.

In certain embodiments, Liquid A can become highly mobile on the surface of Liquid B when the kinematic viscosity of Liquid B is less than 1 cm$^2$/s. Since liquid viscosity is generally a function of temperature (i.e., liquid viscosity reduces with increasing temperature), choosing the appropriate lubricant that operates at the aforementioned viscosity (i.e. <1 cm$^2$/s) at specific temperature range is desirable. Particularly, various different commercially available Liquid B can be found at the specified viscosity, such as perfluorinated oils (e.g., 3M™ Fluorinert™ and DuPont™ Krytox® oils), at temperatures ranging from lower than −80 to greater than 260° C.

In some embodiments, thickness of Liquid B on the order of the surface roughness peak-to-valley distance of the porous substrate can provide good liquid-solid interaction between the substrate and Liquid B. When the solid substrate is tilted at a position normal to the horizontal plane, liquid layer below a characteristic length scale can maintain good adherence to the roughened surface, whereas liquid layer above the characteristic length can flow, creating flow lines (e.g., surface defects) and disrupting the flatness of the fluid surface. In one example, the thicknesses for the fluid layer (as measured from the valleys of the roughened surface are on the order of 5-20 μm when the peak to valley height is ~5 μm.

In certain embodiments, Liquid B can be selected such that Object A has a small or substantially no contact angle hysteresis. Liquid B of low viscosity (i.e., <1 cm$^2$/s) tends to produce surfaces with low contact angle hysteresis. For example, contact angle hysteresis less than about 10°, 5°, 2.5°, 2°, or even less than 1° can be obtained. Low contact angle hysteresis can help test Object A slide at low tilt angles (e.g., <5°), further enhancing liquid repellant properties of the surface.

Figure 3B:
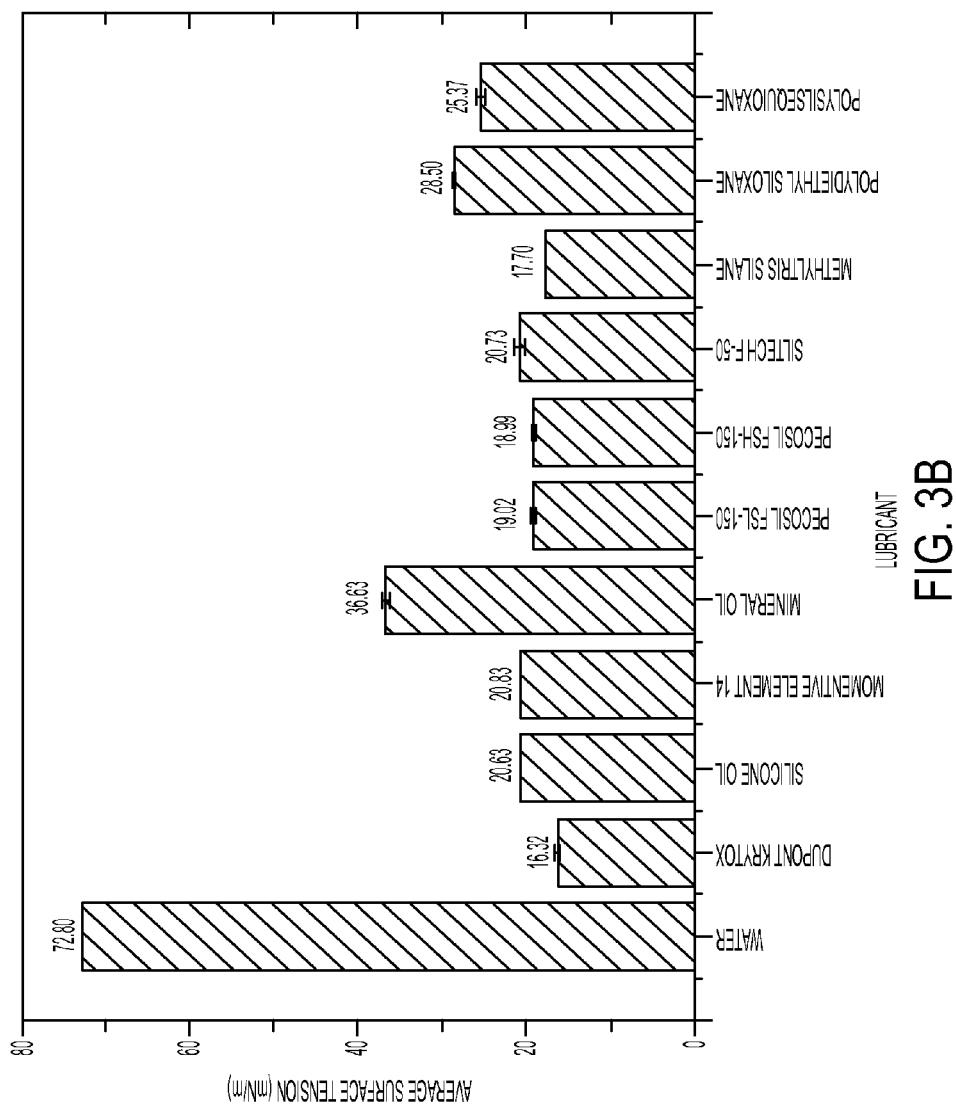
FIG. 3B illustrates surface tensions of some exemplary lubricants (Liquid B).
Figure 3C:
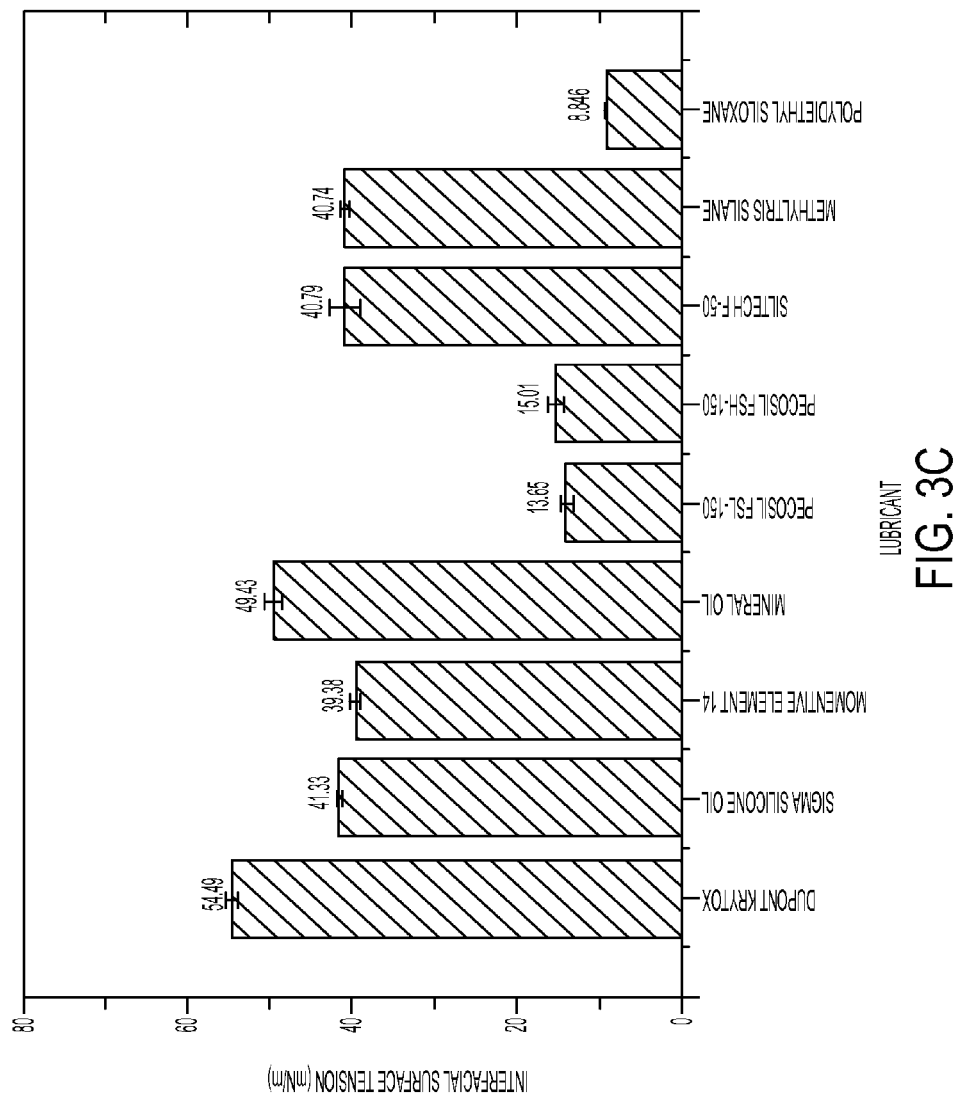
FIG. 3C illustrates interfacial tensions of sortie exemplary lubricants (Liquid B).
Figure 3D:
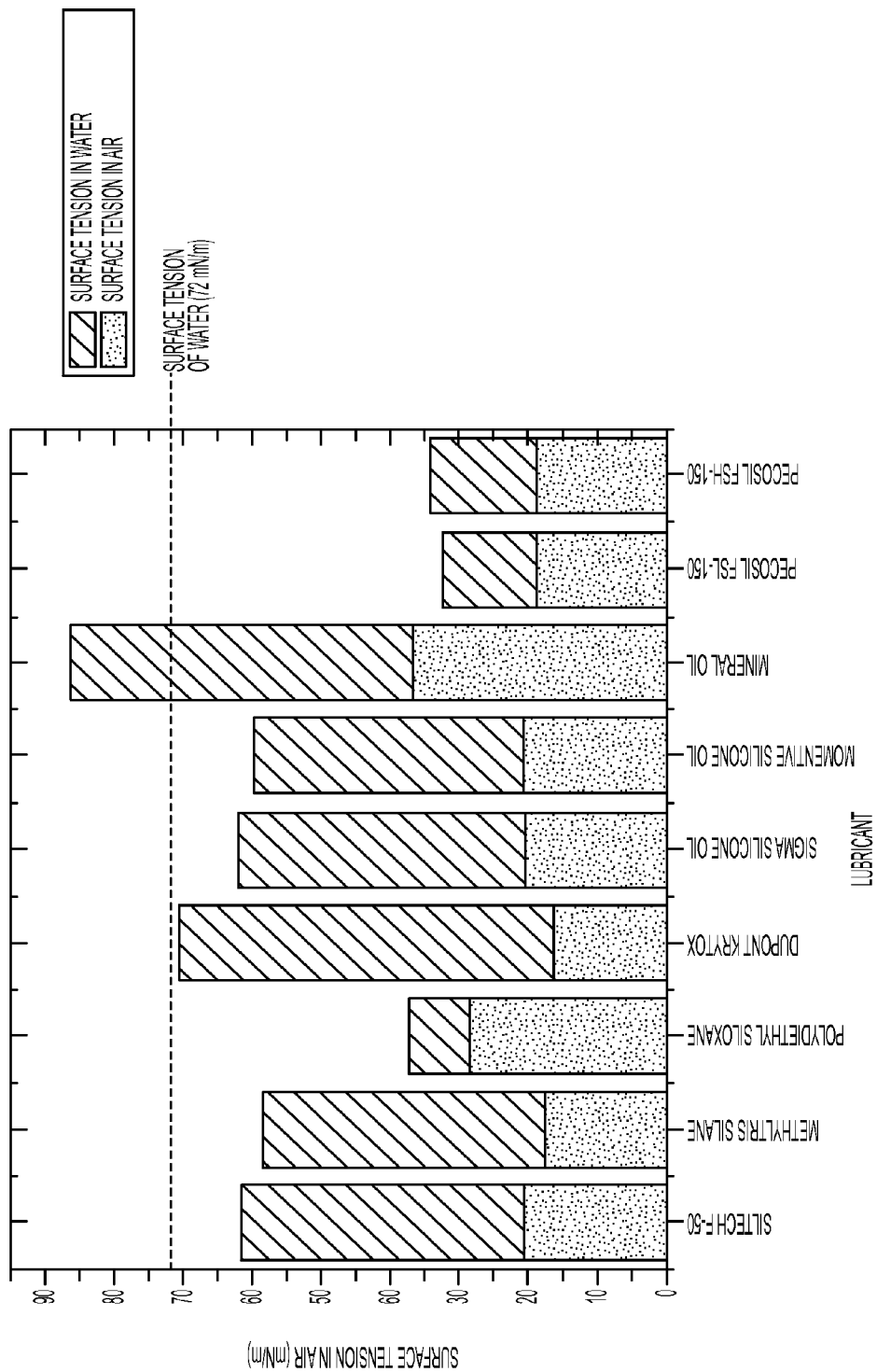
FIG. 3D illustrates the sums of surface tensions for some exemplary lubricants (Liquid B).

FIG. 3A illustrates structures of some exemplary lubricants (Liquid B). FIG. 3B illustrates surface tensions of some exemplary lubricants (Liquid B). FIG. 3C illustrates interfacial tensions of some exemplary lubricants (Liquid B). FIG. 3D illustrates the sums of surface tensions for some exemplary lubricants (Liquid B).

As mentioned above, a roughened surface can help stabilize a lubricant (Liquid B) on a substrate. In certain embodiments, a roughened surface can be manufactured from many suitable materials. For example, the roughened surface can be manufactured from polymers (e.g., epoxy, polysulfone, polycarbonate, polyester, nylon, Teflon, polyolefin, acryls, EPDM, silicones, etc.), metals (e.g., steel, tungsten, aluminum, copper, zinc, titanium, nickel), metal alloys (e.g. stainless steel, carbon steel), sapphire, glass, quartz, carbon in different forms (such as diamond, graphite, black carbon, grapheme, carbon nanotubes, etc.), metal oxides and ceramics (e.g., alumina, silica, titanic), and the like. For example, fluoropolymers such as polytetrafluoroethylene (PTFE), polyvinylfluoride, polyvinylidene fluoride, fluorinated ethylene propylene, and the like can be utilized. In addition, roughened surface can be made from materials that have functional properties such as conductive/non-conductive, magnetic/non-magnetic, elastic/non-elastic, light-sensitive/non-light-sensitive materials, optically clear/opaque, etc. A broad range of functional materials can be utilized to make SLIPS.

In certain embodiments, the roughened surface may be a porous surface layer of a substrate with arbitrary shapes and thickness. The porous surface can be any suitable porous network having a sufficient thickness and pore sizes to stabilize Liquid B through capillarity, or the effective range of intermolecular force felt by the liquid from the solid material, such that Liquid B forms either a smooth overlayer that coats all the textures or forms a conformal lubricant coating that follows the topography of the underlying structured substrate. The substrates can be considerably thicker, however, such as metal sheets and pipes. The porous surface can have any suitable pore sizes to stabilize the Liquid B, such as from about 10 nm to about 2 mm. These sizes should be below the capillary length of the Object A. Such a roughened surface can also be generated by creating surface patterns on a solid support of indefinite thickness.

Roughened Surface Based on Metal-Containing Surface

Some metal-containing surfaces can have native porous morphology and/or high roughness factor or can be transformed into porous surfaces with high roughness factor by chemical or physical treatment, and can provide suitable roughened surface for SLIPS.

These metal containing surfaces can include metal oxides, metal hydroxides, metal oxy-hydroxides, or salts. The salts include ionic and covalent salts of metals with organic and inorganic acids, including simple binary salts and complex oxy-salts. The metal component in these metal oxides, metal hydroxides, metal oxy-hydroxides, or salts can include Li, Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Ru, Rh, Pd, Ag, Cd, In, Sn, Sb, Cs, Ba, Hf, Ta, W, Re, Os, Ir, Pt, Au, Tl, Pb, Bi, La, Ce, Pr, Nd, Sm, Eu, Gd, Tb, Dy, Ho, Er, Tm, Yb, Lu, or a combination/mixture/alloys thereof.

In addition, a variety of other chemical compositions of the micro/nanostructured layer are possible, including, but not limited to metal sulfides, metal selenides, metal tellurides, metal nitrides, metal phosphides, metal antimonides, metal arsenides, elemental metals and metalloids, metal organic and coordination compounds, metal oxy-salts, inorganic and organic metal salts, and multi-component mixtures of any of these. The metal-containing surface provides a roughened surface that is functionalizable and capable of stably supporting a lubricant layer, thereby providing desired slippery and repellant properties.

In some embodiments, the metal-containing substrate can have an initial roughened surface. The metal-containing substrate can be preliminarily roughened through chemical, physical, and hybrid means. Some examples include wet chemical reaction, such as hydrolysis, alcoholysis, solvolysis, acid-base reaction; hydrothermal or solvothermal reactions; electrochemical deposition or etching; oxidation; self-assembly; layer-by-layer deposition; plasma etching; chemical vapor deposition or atomic layer deposition; sol-gel reaction in a variety of solvents including supercritical fluids; polymerization reaction; organometallic chemistry; solid-state synthesis; thermal evaporation synthesis, etc, and various macroscopic roughening techniques such as, for example, sandblasting. Of these, a number of methodologies can be suitable to produce a micro/nanostructured surface comprised of or including as a significant component metal oxides, hydroxides, oxide-hydroxides, mixed oxides, oxy-salts, inorganic and organic metal salts and the like. More details about various ways to create roughness can be found in the following references: Zhiguang Guo, Weimin Liu, Bao-Lion Su, "Superhydrophobic surfaces: From natural to biomimetic to functional", Journal of Colloid and Interface Science 353 (2011) 335-355; "Metal Oxide Nanostructures and Their Applications" (5-Volume Set), edited by Ahmad Umar, Yoon-Bong Hahn, March 2010, 3500 pp, Copyright © 2010 by American Scientific Publishers; Boris I. Kharisov, "A Review for Synthesis of Nanoflowers" Recent Patents on Nanotechnology 2008, 2, 190-200; Ruohong Sui, Paul Charpentier. "Synthesis of Metal Oxide Nanostructures by Direct Sol-Gel Chemistry in Supercritical Fluids" Chem. Rev. 2012, 112, 3057-3082.

The type and level of surface roughness can depend on the nature of the process, experimental conditions, type of physical and chemical treatments applied, and morphologies of the particles, structures of the resulting networks, and such. The micro/nanostructured roughened surface can be chemically and/or physically modified to provide for a desired affinity/attraction between the chosen surface and the chosen lubricant. A non-exhaustive list of surface modifications can be found in the following references: M. A. Neouze, U., Schubert, "Surface Modification and Functionalization of Metal and Metal Oxide Nanoparticles by Organic Ligands," Monatsh. Chem. 139, 183-195 (2008); R. Hofer, M. Textor, N. D. Spencer, "Alkyl Phosphate Monolayers, Self-Assembled from Aqueous Solution onto Metal Oxide Surfaces," Langmuir, 2001, 17, 4014-4020 and references therein.

In some embodiments, a roughened surface based on a metal-containing compound can be fabricated directly on a pure metal substrate (e.g., a bare aluminum plate). In some embodiments, a roughened surface based on a metal-containing compound can be fabricated on a thin metal film created on a metal or nonmetal substrate. The thin metal film can be deposited on the substrate using conventional methods such as vapor deposition (chemical vapor deposition (CVD), atomic layer deposition (ALD), physical vapor deposition (PVD), etc. sputter deposition, electron beam evaporation, electro- or electroless plating, and the like. In some embodiments, a roughened surface based on a metal-containing compound can be fabricated on a metal-containing solution-based mixture (e.g., sol-gel coating) deposited on a metal or nonmetal substrate. The solution-based mixture can be applied by various application methods including spraying, dip coating, painting, spin coating, flow coating, printing, drop casting, etc. Such mixtures can include sol-gel precursors to metal oxides, metal hydroxides, metal oxy hydroxides, or dispersions containing metal oxides, metal hydroxides, or metal oxy hydroxides. The solution-based mixture can also have porogen to enhance the porous structure. All the methods mentioned above can provide a metal-containing surface on a substrate. As discussed above, the metal-containing surface can be an integral part of the substrate or a distinct component formed or deposited on the substrate. Various other implementations are possible.

Once a metal-containing surface is formed, the metal-containing surface can be chemically modified to form a surface structure with proper feature sizes, volume, density, and morphology, suitable as a porous surface for SLIPS. Chemical modification of metal-containing surface can include reacting the surface with the environment, such as the air, water, alcohol, or acid, to form a metal-containing compound with desired micro- or nano-structure, such as oxide, hydroxide, oxi-hydroxide, or salt. One exemplary process is hydrolysis, where the metal-containing surface is reacted with water in a certain temperature range to form nanostructured oxide or oxy hydroxide. Another exemplary process is oxidation with organic acid to form structured metal salt. Another exemplary process is growth of metal oxide nanorods on metallic supports. Yet another exemplary process is formation of nanoporous coatings using sol-gel deposition of metal oxides mixed with sacrificial porogen.

Once the desired surface Micro- or nano-structure is formed, it can be further chemically functionalized to provide the desired chemical affinity for the lubricating liquid (Liquid B).

In one or more embodiments, the metal is aluminum and the metal-containing surface is nanostructured aluminum oxy hydroxide-boehmite (AlO(OH)). In some embodiments, a boehmite surface layer can be directly formed on an aluminum article. In some embodiments, the aluminum substrate can be a metalized thin film that is deposited on an article for which a slippery surface is desired or other support. Metalized layer can be prepared using conventional methods such as vapor deposition (chemical vapor deposition, atomic layer deposition (ALD), physical vapor deposition), sputter deposition, electron beam evaporation, and the like. One exemplary process of creating boehmite on aluminum includes hydrolysis of aluminum or surface alumina layer to form aluminum hydroxide, followed by heat treatment to convert the hydroxyl layer into boehmite (a.k.a. boehmitization). Once the roughened boehmite surface is formed, it can be chemically functionalized to provide the desired chemical affinity for the lubricating liquid.

In some embodiments, metal-containing substrates (pure metals and alloys, carbides, nitrides, oxides, chalcogenides, etc.) can be rendered micro/nanoporous by additive chemical processes (e.g., cluster formation with organic acids, inorganic nanocrystal growth, electrodeposition, etc.) or subtractive chemical processes (e.g., etching, etc.). The resulting structured surfaces can be further functionalized for the appropriate compatibility with the lubricating liquid (e.g., using silane, thiol, carboxylate, phosphonate, phosphate, etc. as a reactant) to serve as a porous substrate to directly form SLIPS on these substrates.

In one or more embodiments, the methods described herein are used to prepare a surface having a hierarchical surface roughness. In other embodiments, the methods described herein are used to prepare a surface having a uniform surface roughness. Such uniform surface roughness structures can be suitable for use where it is desirable to maintain a slippery surface under high shear, such as in high water- and air-flow conditions. In one or more embodiments, the metal-containing substrate can have an initial roughened surface and a nanostructure is formed on the underlying microstructure to provide a hierarchical metal-containing structure. (See, Example 4.)

SLIPS formed on roughened surface based on a metal-containing compound are described in more details in the following exemplary implementations.

EXAMPLE 1

SLIPS Fabricated Directly on Aluminum Substrates

A porous surface layer can comprise boehmite. Boehmite (a.k.a. Aluminum Oxide Hydroxide or AlO(OH)) is a crystalline form of aluminum oxide that can provide a high porosity, high surface roughness morphology. The boehmite coating can be formed on a wide range of substrates to provide uniform nanostructure as the roughened substrate for SLIPS. Boehmite coating can be prepared through various processes.

In some embodiments, a boehmite surface layer can be directly formed on an aluminum article. Thus, it is possible to machine, mold or otherwise form an arbitrarily shaped aluminum article using well-known metal processing techniques and to thereafter render it repellant by forming a boehmite-based SLIPS surface.

One exemplary process of creating boehmite on aluminum includes hydrolysis of aluminum or a surface alumina layer to form aluminum hydroxide, followed by heat treatment to convert the hydroxyl layer into boehmite (a.k.a. boehmitization). The hydrolysis process can be conducted in a variety of ways, including boiling in water, e.g., at a temperature of 40-100° C. and steam exposure, e.g., at temperatures of 100-140° C. Exposure times can vary from a few minutes to a few hours, e.g., from 1 minute to 24 hours. The aluminum substrate can be smooth and unstructured, but the boehmite process can provide the desired texture. Additives such as glycerol, ethylene glycol, and other low molecular weight alcohols can be added to water to facilitate boehmitization process.

Once the boehmite roughened surface is formed, it can be chemically functionalized to provide the desired chemical affinity for the lubricating liquid (Liquid B). Functionalized silanes are common reactants with which to modify the chemical nature of the boehmite surface. Surface functionalization also can be achieved using appropriately functionalized phosphonic acids, e.g., 1H,1H,2H,2H-tridecafluorooctylphosphonic acid, phosphates, carboxylic acids, sulfonic acids, and similar organic/inorganic, acids and their respective mono- or di-esters with appropriate linkers and end functional groups, e.g. oligo-silicone or alkyl terminated with a phosphate group. Examples of other surface modifiers include, but are not limited to, long-chain alkyl carboxylic acids, perfluorinated carboxylic acids (e.g., perfluorooctadecanoic acid and other homologues), alkyl or fluorinated phosphonic, phosphinic, phosphoric, and sulfonic acids, alkyl or fluorinated silanes, end-functionalized alkyl or fluorinated polymers, such as DuPont Krytox series of surfactants (like Krytox 157 FSL, FSM, FSH), silicone oligomers with modified end groups including carboxylic, phosphonic, phosphinic, phosphoric, sulfonic acids and silanes, and combinations thereof. The chains of the surface modifier molecules can be linear or branched and they can be partially fluorinated. The solution or vapor phase chemical treatment can be done at a desired temperature depending on the reactivities and other properties of the modifying molecules and surfaces to be modified. A variety of solvents of different solubilizing properties, volatilities and boiling points can be used for the surface modifications. In addition to simple immersing, the solution modification can be done by exposing the surface to refluxing the solution of the modifier, or by continuously spraying it onto the surface, or pumping/recirculating the solution through the pipe whose surface needs to be modified, or any other appropriate way of bringing the surface and the modifier solution in contact.

One exemplary process of creating a boehmite surface is described below.

1. Sandblast (~120 grit) the aluminum surface at 30 psi; (optionally and only applicable if a hierarchical roughness is desired.)
2. Ultrasonically clean the aluminum surface in acetone for 15 minutes;
3. "Boehmitize" the aluminum surface in boiling water for 10 minutes; and
4. Chemically modify the "boehmitized" surface
    Option I: 1% wt F13PA (1H,1H,2H,2H-tridecafluorooctylphosphonic acid) or FS100 (fluoroalkylphosphate surfactant, Mason Chemical Co.) in 95:5 EtOH:H$_2$O @70-80° C. for 1 hour (or at room temperature for more than 6 hours)
    Option II: A silicone phosphate such as Silphos, 10% wt. in 95:5 EtO:H$_2$O @70-80° C. for 1 hour (or at room temperature for More than 6 hours)
    Option III: A long-chain alkyl phosphate such as octadecyl phosphate, 10% wt. in 95:5 EtOH:H$_2$O @70-80° C. for 1 hour (or at room temperature for more than 6 hours)

One exemplary process of synthesizing F13PA (1H,1H, 2H,2H-tridecafluorooctylphosphonic acid) is through the following two-step reaction.

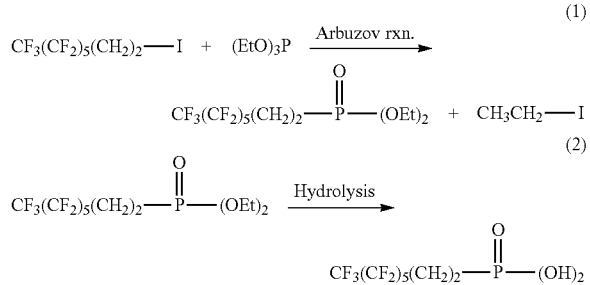

Step 1 can be done at 150° C. for ~48 hours in a reflux under nitrogen with excess triethylphosphite (TEP). Step 2 can be done after vacuum distillation by refluxing under nitrogen in the presence of HCl or by reacting with bromotrimethoxysilane and subsequent hydrolysis. Surface functionalization by F13PA can increase the affinity between the boehmitized surface and a fluorinated lubricant. Alternatively, surface functionalization by silicone phosphate such as Silphos can increase the affinity between the boehmitized surface and a silicone or hydrocarbon lubricant.

EXAMPLE 2

SLIPS Fabricated on Metal Thin Films

In some embodiments, the metal-containing substrate can be a metalized thin film that is deposited on an article for which a slippery surface is desired. Metalized layer can be prepared using conventional methods such as vapor deposition (chemical vapor deposition, atomic layer deposition (ALD), physical vapor deposition), sputter deposition, electron beam evaporation, and the like. For example, a 50 nm thick aluminum layer can be deposited on a glass substrate with a 5 nm can thick adhesion layer (Ti, Cr, or Ni) using sputter coater, thermal or electron beam evaporator. In another example, a 100 nm thick aluminum doped with <5% of silicon can be deposited on a plastic substrate with a 10 nm thick adhesion layer (Ti or Cr) using sputter coater, thermal or electron beam evaporator. In another example, commercially available aluminized PET or aluminized BOPP (hi-axially oriented polypropylene) may be directly used as a starting material to create SLIPS. Metalized layers can be subjected to hydrolysis and boehmitization, as described herein for aluminum substrates. The thickness of aluminum layer can be from 10 nm to 100 nm such that the entirety of the aluminum layer can be boehmitized to form an optically clear SLIPS. In some embodiments, the thickness of aluminum layer can be from 100 nm to 10 micrometer such that only a partial portion of the surface aluminum can be boehmitized to form a mirror-like SLIPS.

EXAMPLE 3

SLIPS Fabricated Directly on Other Metal Substrates (a) SLIPS from Fluorinated ZnO Nanorods on Zn-Primed Substrates A metal-containing roughened surface was obtained by growing zinc oxide nanorods on a thin layer of zinc metal, an additive process. An aqueous solution containing 37.5 mM of zinc nitrate hexahydrate, (Zn(NO3)2.6H2O and the same mole of hexamethylenetetramine were heated to 85° C. heated bath. A Zn-primed substrate (40 nm sputtered Zn) or a Zn metal plate was dipped into the above solution and kept at 85° C. for 2 h to grow ZnO nanorods on the substrate. The substrate was removed and rinsed with deionized water. The substrate was then dipped in a 95:5 (v/v) ethanol:water bath containing 1 wt. % of perfluoroalkyl phosphate surfactant (FS100, Mason Chemical Co.) at 70° C. for 1 h to functionalize the ZnO nanorods with perfluorinated alkyl groups. The substrate was removed and rinsed with ethanol then dried by blowing air. This substrate was superhydrophobic. The superhydrophobic substrate was lubricated with Krytox 100 and excess lubricant was removed by tilting before characterizing water contact angle hysteresis.

(b) SLIPS from Clusters Formed on the Surface of Copper by Reaction with Long-Chain Alkyl Acids A metal-containing roughened surface was obtained by growing copper fatty acrd clusters on a copper metal substrate, an additive process. A copper substrate was placed in 0.01 M aqueous solution of myristic acid for 3 days at room temperature. This process induced formation of $Cu(CH_3(CH_2)_{12}COO)_2$ clusters and rendered the surface superhydrophobic. In another procedure, the Cu substrate was placed in a 95:5 (v/v) ethanol:water bath containing 1 wt. % of perfluoroalkyl phosphate surfactant (FS100, Mason Chemical Co.) for 3-5 d to form clusters of copper-perfluoroalky phosphates, which also rendered the surface superhydrophobic. The resultant substrates were lubricated with Krytox 100 and excess lubricant was removed by tilting before characterizing water contact angle hysteresis.

(c) SLIPS from Fluorinated Acid-Etched Steel and Nickel Surfaces.

A structured oxide surface is formed on a metal surface using oxidative etching. A steel and a Ni plate were polished and ultrasonically cleaned in alcohol and washed with water. Then they were etched by immersion in a 1:1 (v/v) mixture of $HNO_3$ (65 wt. %) and $H_2O_2$ (30 wt. %) at room temperature. The etching time is 6 mm for steel and 3 mm for Ni. Same procedure can be used for a Cu or Ni alloy. For Ti alloys, the etching can be done in a 1:1 (v/v) mixture of HF (40 wt. %) and $H_2O_2$ (30 wt. %) at room temperature for 5 min. After etching, the substrates were immediately rinsed ultrasonically with water and washed with deionized water, followed by drying in a stream of nitrogen and then in an oven at 80° C. for 30 min. All the substrates were then dipped in a 95:5 (v/v) ethanol:water bath containing 1 wt. % of perfluoroalkyl phosphate surfactant (FS100, Mason Chemical Co.) at 70° C. for 1 h to functionalize the etched surfaces with perfluorinated alkyl groups. The substrates were removed and rinsed with ethanol then dried by blowing air. These substrates were superhydrophobic, thereby confirming the presence of a roughened microstructure. The superhydrophobic substrates were lubricated with Krytox 100 and excess lubricant was removed by tilting before characterizing water contact angle hysteresis.

(d) SLIPS from Ni or Steel Surface Reacted with Long-Chain Alkyl Phosphonic Acids A structured nickel or steel surface is obtained by treatment with phosphonic acid for a prolonged period of time. A nickel or steel plate was firstly immersed in dilute NaOH and then in $H_2SO_4$ solutions to get rid of surface contaminants and oxides. The substrates were steeped in a 0.01 M ethanol solution of monoalkyl phosphonic acid (e.g. n-octylphosphonic acid, n-decylphosphonic acid) at 40° C. for 3~5 days. This treatment can achieve both surface roughening and functionalization/chemical modification in one step. Then the modified substrate was taken out, rinsed with deionized water and ethanol thoroughly, and dried in air.

These substrates were superhydrophobic. The superhydrophobic substrates were lubricated with Krytox 100 and excess lubricant was removed by tilting before characterizing water contact angle hysteresis.

Figure 4A:
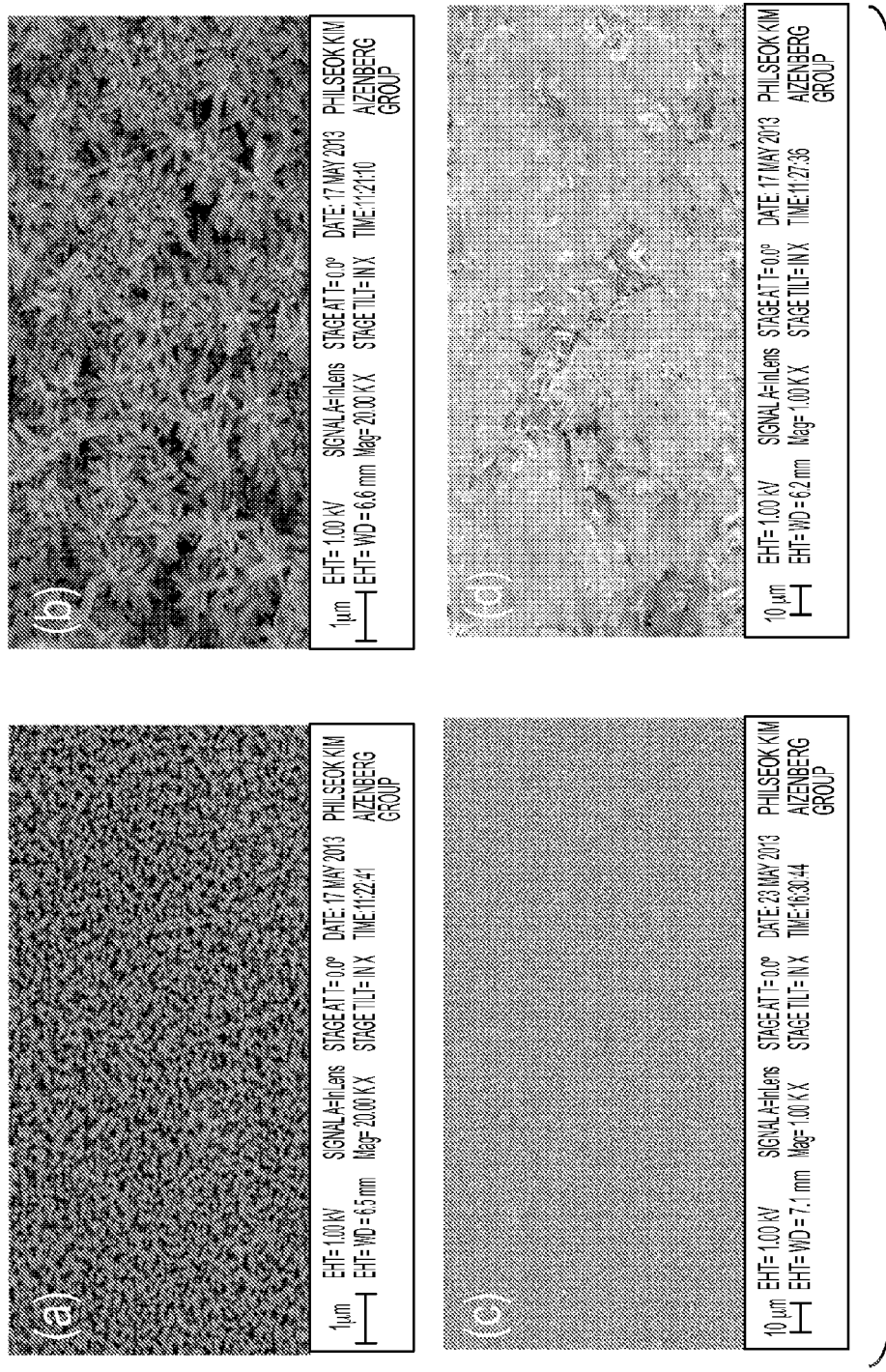
FIG. 4A contains scanning electron microcopy (SEM) images of exemplary micro/nano textured metal-containing substrates.
Figure 4B:
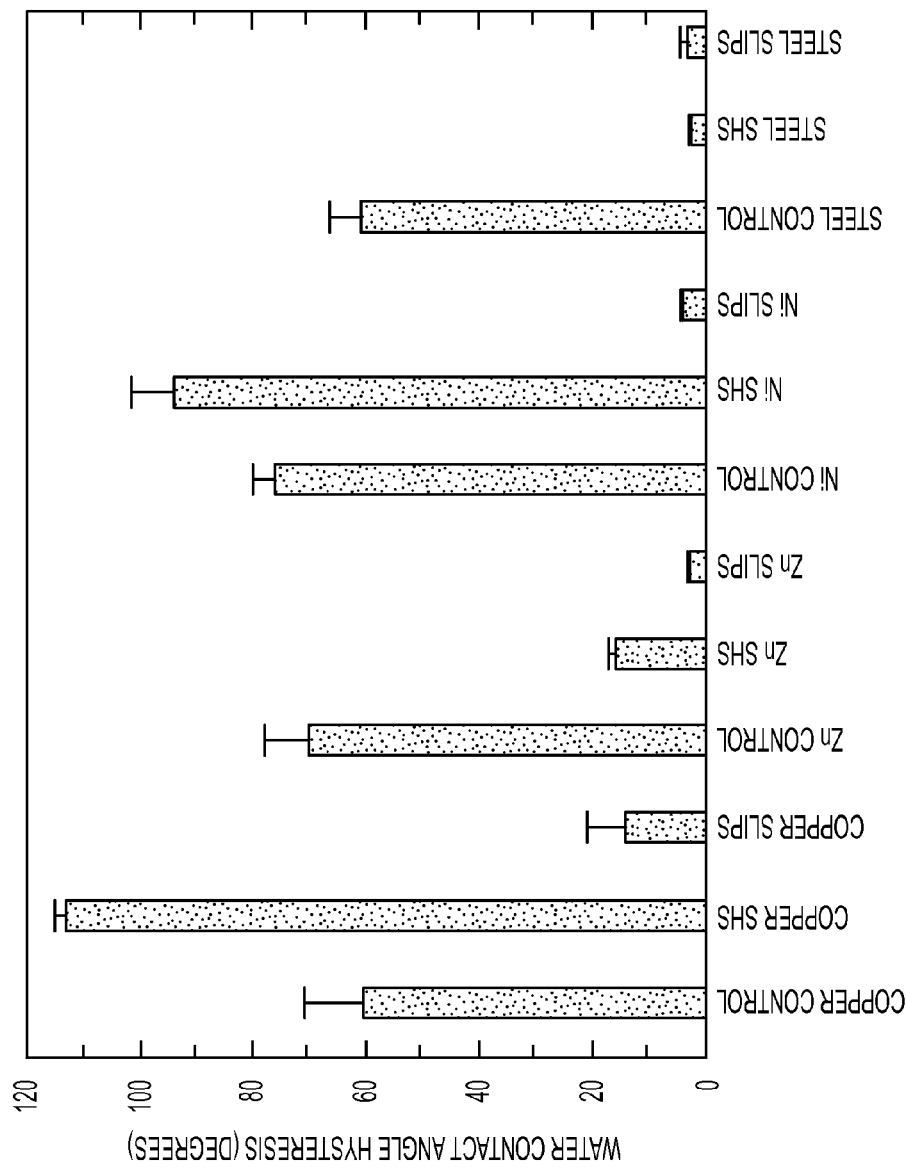
FIG. 4B illustrates water contact angle hysteresis of unmodified, superhydrophobic, and SLIPS formed on exemplary metal-containing substrates.

FIG. 4A illustrates SEM images of micro/nano textured metal substrates: (a) vertically aligned ZnO nanorods on Zn-primed substrates, (b) flower-like clusters of ZnO nanorods on Zn-primed substrates, (c) microstructured texture from long-chain alkyl acid-copper clusters, and (d) random pores and pits formed on etched steel. All of these surfaces can become superhydrophobic after treating with fluoroalkyl phosphate surfactant and then form a stable SLIPS after lubrication (e.g., with Krytox). FIG. 4B illustrates water contact angle hysteresis of unmodified, superhydrophobic, and SLIPS formed on exemplary metal-containing substrates. As illustrated in FIG. 4B. SLIPS created on copper-, zinc-, nickel- and steel-based superhydrophobic surfaces all demonstrate good SLIPS features, indicated by very small water contact angle hysteresis and therefore the ability to repel Objects A, while the unmodified surfaces have high CAH values that would result in pinning and sticking of the Objects A to such surfaces

EXAMPLE 4

SLIPS Formed on Surfaces with a Hierarchical Structure

In some embodiments, experiments have shown that SLIPS surfaces with uniform nanofeatures can provide the most shear-tolerant liquid-repellent behavior, unlike lotus leaf-inspired superhydrophobic surfaces, which generally favor multiple-tiered hierarchical structures for improved pressure stability. Experiments have shown that the SLIPS on a hierarchical roughness structure can show preferential wetting of lubricant to the substrate surface at a high spin rate. For example, the lubricant tends to wet the lower level of roughness with nanometer scale features (e.g., created by boehmitization) while exposing the higher level of roughness with micrometer scale features (e.g., created by sandblasting). The losing/thinning of lubricant layer and exposure of the higher level of nanostructure roughness can weaken the SLIPS performance since these exposed solid surfaces can act as defects, pinning points for liquids, and nucleation points for ice or other crystals growing on these surfaces. In contrast, although losing/thinning the lubricant layer, the SLIPS on a nanostructure-only roughness structure can largely maintain its SLIPS performance since a thin lubricant layer always remains in the nanopores and still covers the roughness on the substrate surface, provide extremely smooth, defect-free and chemically homogeneous liquid layer.

Figure 5:
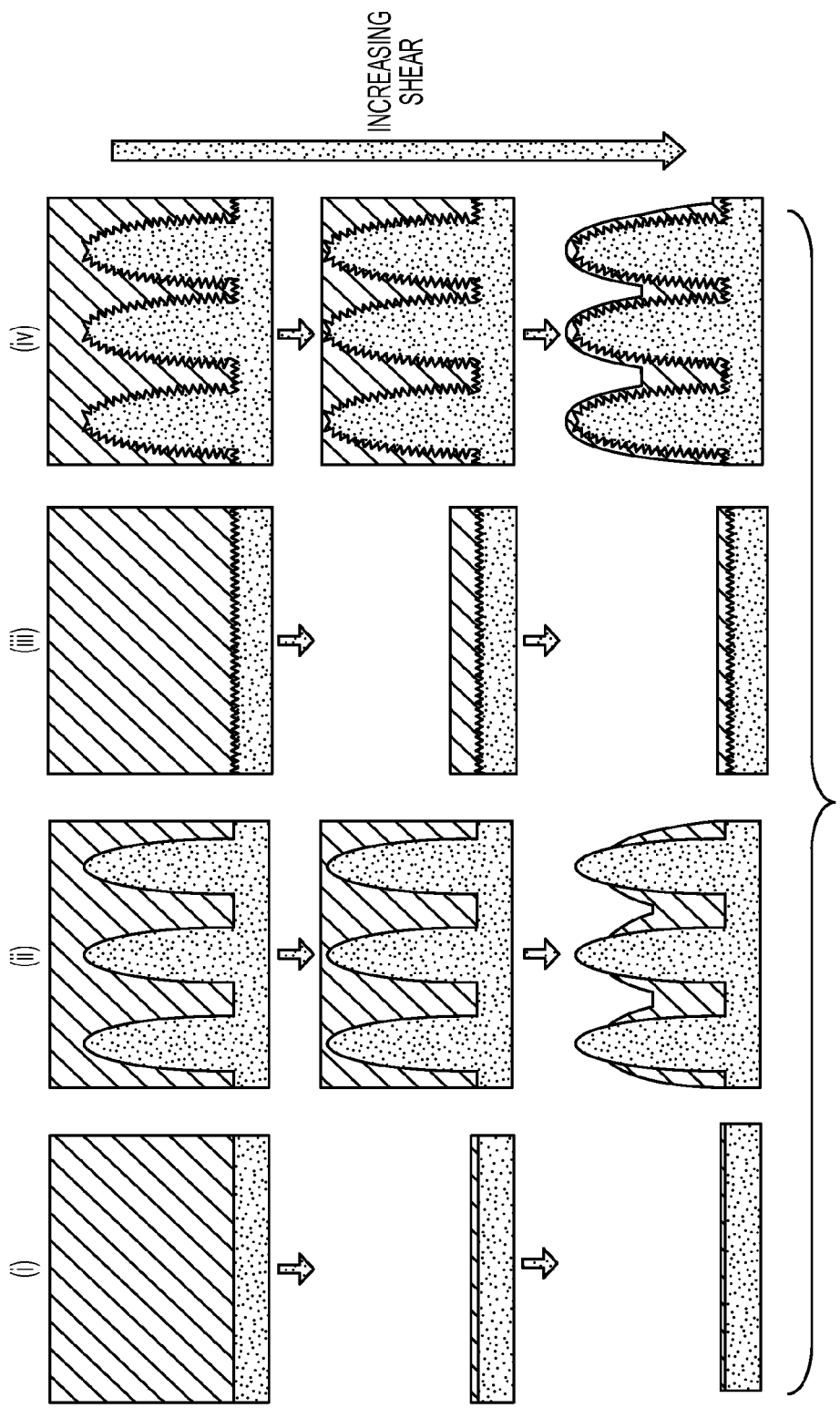
FIG. 5 illustrates schematic representations of the evolution of the lubricant thickness and profile with increasing shear on four types of lubricated substrates.

FIG. 5 illustrates schematic representations of the evolution of the lubricant thickness and profile with increasing shear on four types of lubricated substrates: (i) flat substrate, (ii) microtextured substrate, (iii) nanostructured substrate, and (iv) hierarchically structured substrate. On flat surfaces, thinning of the lubricant layer can lead to exposure of the underlying solid, as there is no capillary force to hold the lubricant (e.g., FIG. 5(i)). The length scales of both micro-textures and nanotextures can be much smaller than the capillary length of the lubricant (~1 mm under Earth's gravity, g). These surfaces can therefore support a stable overcoating of the lubricant (e.g., FIG. 5(ii-iv), top). Under high spinning rates, the acceleration at 2.54 cm from the center of spinning can become 710 g and 2840 g at 5,000 and 10,000 rpm, respectively, and the capillary length of the lubricant can become 38.2 µm and 19.1 µm, respectively. Since some microscale features created by the sandblasting method can be larger than these lengths, the lubricant can be easily lost from the valleys between the larger microscale features under these high acceleration conditions and the underlying solids can be exposed (e.g., FIG. 5(ii), bottom). For the case of SLIPS with only relatively uniform nanoscale texture, the lubricant can create a stable smooth overcooling until the thickness of the lubricant layer becomes comparable to the height of the nanoscale features themselves (e.g., FIG. 5(iii). In one example, no sign of deterioration of performance is observed up to the spin speed of 10,000 rpm, which generally corresponds to a ~400 nm-thick lubricant layer on a surface with only nanoscale features that are about 170 nm tall.

Still referring to FIG. 5, hierarchically textured substrates can therefore show properties between those presented by the micro- and nanostructured surfaces. On one hand, the nanoscale features on top of the microscale features can still provide a large capillary force to hold lubricant and provide a low-surface-energy liquid interface along the microscale topography to prevent contact line pinning (FIG. 5(iv)). On the other hand, the shape of the liquid interface after exposure to a strong shear condition can conform to the microscale topography and may no longer be an ideally flat interface required for best performing SLIPS (FIG. 5(iv), bottom). While the droplets do not exhibit irreversible pinning up to the spin rate of 5,000 rpm, the movement of the droplets is observed to slow down, often resulting in a 'stick-slip' behavior with temporary pinning on the substrate during droplet sliding experiments. This behavior can be attributed to the kinetic de-pinning of the droplets owing to the dynamic nature of the liquid interface preserved within the nanotextures, where the triple line lends to find thermodynamically favorable conditions by redistribution of the lubricant and re-wetting of the solid substrate. This behavior is typically not observed on traditional superhydrophobic surfaces as the pinning of the liquid droplet on dry, solid surface tends to be permanent and can only overcome the energy barrier when the tilt exceeds the Gibbs inequality. With further increasing spin rate above 5,000 rpm, irreversible pinning of droplets can be readily observed on SLIPS made on hierarchically textured substrates. This can be attributed to the insufficient amount of lubricant remaining on the surface and the lack of associated rearrangement of the lubricant to overcome droplet pinning over a larger microscale feature. Therefore, unlike superhydrophobic surfaces, robust, stable SLIPS aimed for practical applications—often involving high shear conditions—can be designed to preferentially utilize textured surfaces with only uniform, nanoscale roughness rather than hierarchical features.

Figure 6:
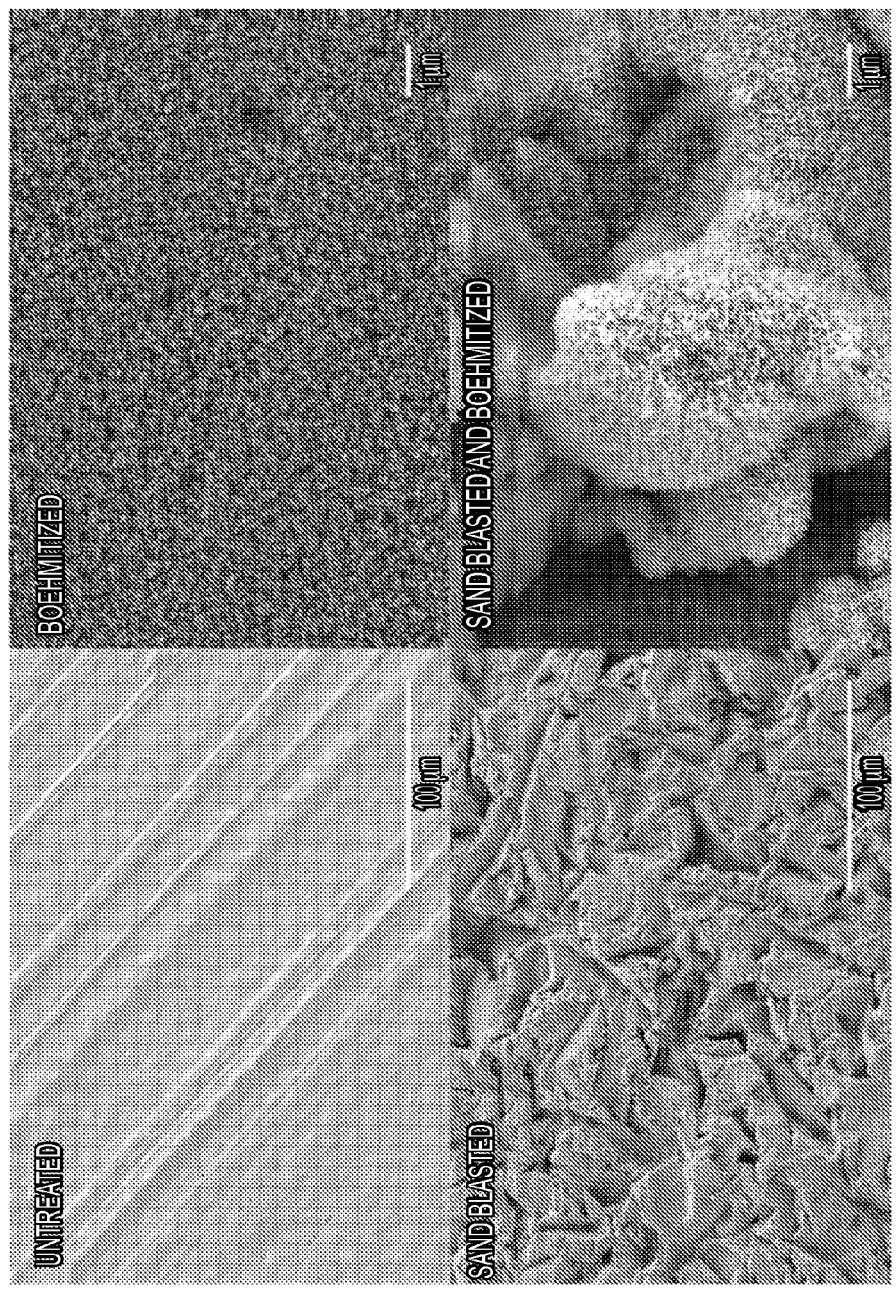
FIG. 6 illustrates SEM images showing the morphology of aluminum surfaces after various surface texturing treatments.

To investigate the effect of the length scale of surface roughness on the performance of SLIPS, aluminum is chosen as a model substrate; sandblasting and boehmite nanostructure formation are used to directly create microscale and nanoscale textures, respectively, on an underlying Al substrate. FIG. 6 shows typical morphologies of the surface features of the native and treated aluminum surfaces. Sandblasting with 120 grit size alumina (avg. particle diameter=125 µm) can form exclusively microscale roughness on the aluminum surface (hereafter labeled "S") with average roughness of 3.2 µm (bottom left). Boehmite (hereafter labeled "B"), a reaction product of aluminum and water that has rhombohedral bipyramid crystal structure, can be formed by simply boiling the substrate in water. The boehmitized surfaces can exhibit uniform nanoscale morphology of 10-30 nm-thick crossed leaflets of 50-100 nm in length (top right). Sandblasted aluminum can also be reacted with water to form boehmite and produce hierarchically structured surface with the combination of nanometer and micrometer features (hereafter labeled "SB") (bottom right). The scale bars are 50 μM for top left and bottom left and 1 μm for top right and bottom right. All of these surfaces can be readily fluorofunctionalized (hereafter labeled "F" as a suffix) to provide affinity to a fluorinated liquid lubricant that will be infiltrated to form SLIPS. Functionalization can be performed by immersing the aluminum substrate in an ethanol or aqueous bath of a food-grade surfactant (FS100, phosphate ester with mixed length of fluorinated alkyl chains) or 1H, 1H, 2H, 2H-perfluorodecyl phosphonic acid (F13PA) that showed strong and stable covalent attachment to the native aluminum oxide and boehmite surface.

The performance of these surfaces can be characterized by measuring the contact angle hysteresis (CAH) or the sliding angle of liquid droplets with different surface tensions the properties that characterize the ability to repel various fluids. The CAH values for water and sliding angle for 20 μL ethanol droplet before and after application of a perfluoropolyether (PFPE) lubricant ("K100")—DuPont Krytox GPL 100 (density=1.835 g/mL, kinematic viscosity=12.4 cSt, surface tension=19 mN/m) are shown in Table 1.

TABLE 1

| Sample Name/ Surface Type | Contact Angle Hysteresis (Degrees) | | Ethanol Sliding Angle (Degrees) | |
| --- | --- | --- | --- | --- |
|  | Dry | Lubricated | Dry | Lubricated |
| F/flat | 60.6 ± 7.1 | 9.5 ± 0.9 | 22.0 ± 0.9 | 14.2 ± 2.5 |
| SF/microtextured | 50.1 ± 4.0 | 2.3 ± 1.0 | 52.2 ± 6.9 | 4.7 ± 0.4 |
| BF/nanotextured | 7.9 ± 1.4 | 2.9 ± 1.6 | 38.2 ± 3.6 | 1.6 ± 0.4 |
| SBF/hierarchical | 7.5 ± 3.1 | 3.6 ± 1.0 | 49.7 ± 3.9 | 2.5 ± 0.5 |

Values reported are a statistical average of five independent measurements. In this example, a hierarchically structured and fluorinated aluminum surface without lubricant ("SBF") demonstrates better superhydrophobicity than the surfaces with only microscale roughness ("SF") or nanoscale roughness ("BF"). When these surfaces are infiltrated with a fluorinated lubricant, K100, to form SLIPS (by spreading several drops of lubricant followed by gravity-induced removal of excess lubricant), only the textured surfaces exhibited low CAH (<4°) against both water and ethanol. As indicated by the increase in CAH, a lubricated flat surface loses its liquid-repellent performance, suggesting that in addition to the chemical affinity, at least some level of roughness, especially below the capillary length of the lubricant, can be a feature to achieve a stable slippery behavior even under mild forces associated with gravity.

Figure 7:
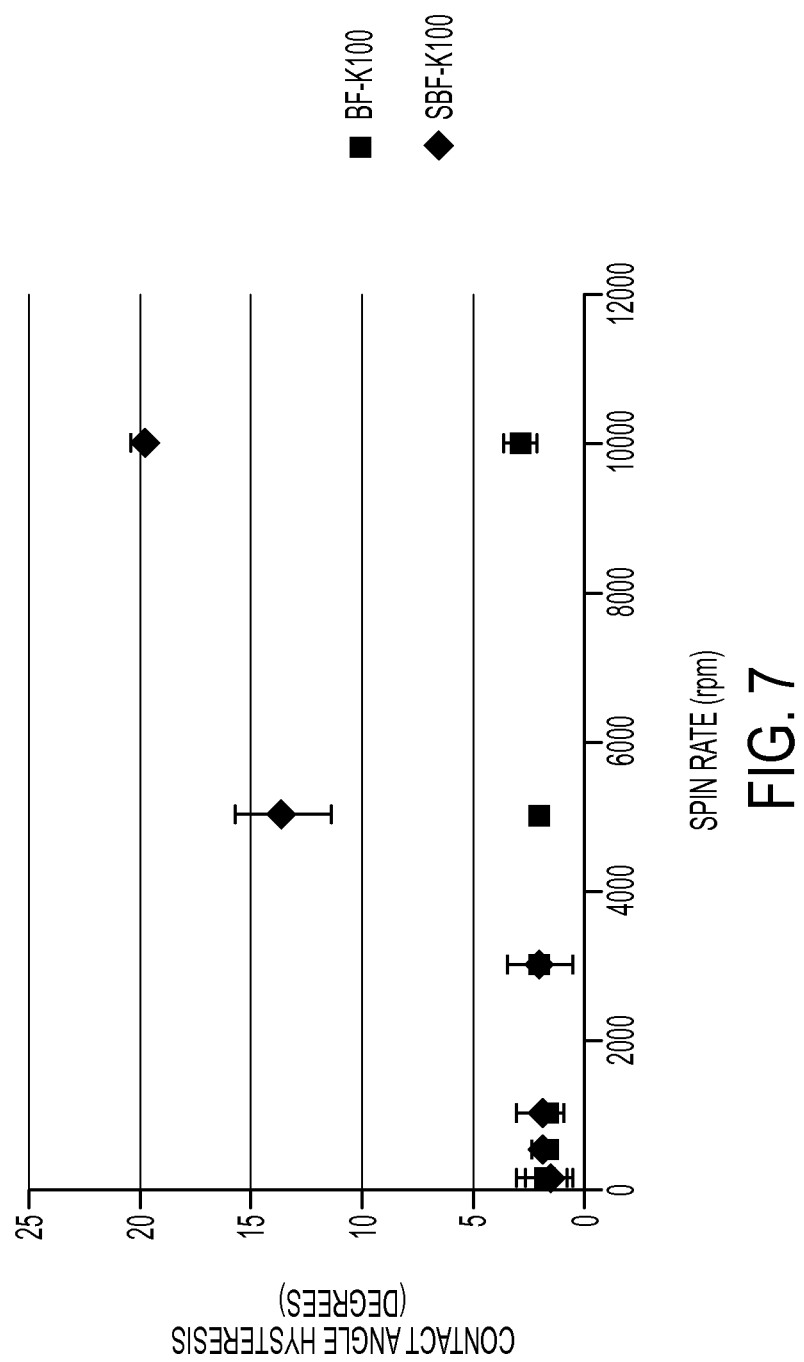
FIG. 7 illustrates the assessment of SLIPS performance after high shear force is applied.

Strong lubricant retention can help provide a long-lasting, robust SLIPS surface. The lubricant retention can be tested by applying high shear force (e.g. spinning) on the SLIPS substrate and measuring the SLIPS performance (e.g., CAH). FIG. 7 illustrates the assessment of SLIPS performance after high shear force is applied. The contact angle hysteresis is measure for two samples tested as a function of spinning rate. BF-K100 (boehmitization+fluorination on aluminum, then Ktytox-100 lubricant) represents a SLIPS surface with only nanostructure roughness. SBF-K100 (sandblasting+boehmitization+fluorination on aluminum, then Krytox-100 lubricant) represents a SLIPS surface with a hierarchical roughness structure. As illustrated in FIG. 7, the surface with a hierarchical roughness structure tends to have increased contact angle hysteresis and lose its SLIPS features at higher spin rates, while the surface with only nanostructure roughness tends to maintain its contact angle hysteresis and keep its SLIPS features at higher spin rates.

Figure 8:
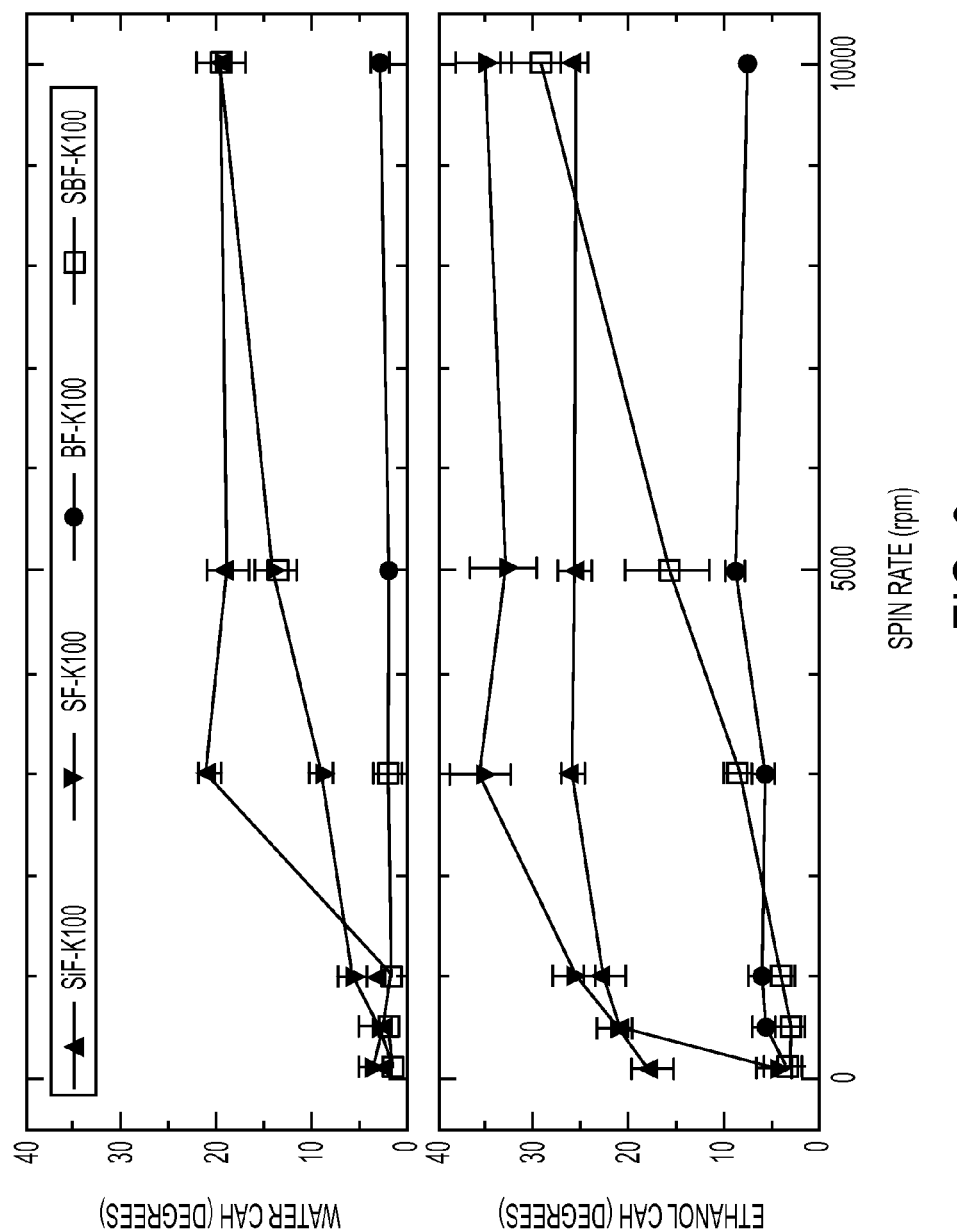
FIG. 8 illustrates contact angle hysteresis of water and ethanol measured on four types of lubricated substrates after shear exposure of the samples by spinning at each spin rate for 1 min.

In addition, shear conditions can be expected to change the effective capillary length of the lubricant. A centrifugal force can be employed to simulate high shear conditions for four types of lubricated surfaces (flat, microtextured, nanotextured, hierarchical) and compared CAH of water (surface tension=72.7 mN/in at 298.15 K) and ethanol (surface tension=22.1 mN/m at 298.15 K) after subjecting the surfaces to different spinning speeds for 60 s in air using a spin coater. FIG. 8 contains contact angle hysteresis of water (top) and ethanol (bottom) measured on four types of lubricated substrates after spinning for 1 min at each spin rate starting from 100 rpm to 10,000 rpm: SiF (silicon wafer, fluorinated, an ideally flat surface), SF (sandblasted Al, fluorinated, a microscale textured surface), SBF (sandblasted then Boehmitized Al, fluorinated, a hierarchically textured surface), and BF (Boehmitized fluorinated, a uniformly nanotextured surface). All samples were initially lubricated with excess amount of perfluoropolyether lubricant, K100, to cover the surface. As illustrated in FIG. 8: at low spinning rates (up to ~1,000 rpm), all samples show CAH of <6° for water droplets. As the spinning speed increases, unstructured lubricated surfaces exhibit a fast increase in CAH reaching >20° at 3,000 rpm indicating a rapid deterioration of slipperiness. CAH for SLIPS on microtextured surface shows slow, nearly linear increase reaching ~20° at 10,000 rpm. In contrast, the surface with only uniform nanoscale roughness preserved excellent water-repellent behavior (i.e. CAH<3°) up to 10,000 rpm. In this example, the hierarchically structured surface does not provide advantages over the nanostructured surface and in fact begins to show significant deterioration of performance after 3,000 rpm. The same, but much more pronounced, trend can be observed for the mobility of low-surface-tension ethanol droplets (note that the flat lubricated surface shows high CAH even at 100 rpm).

Figure 9:
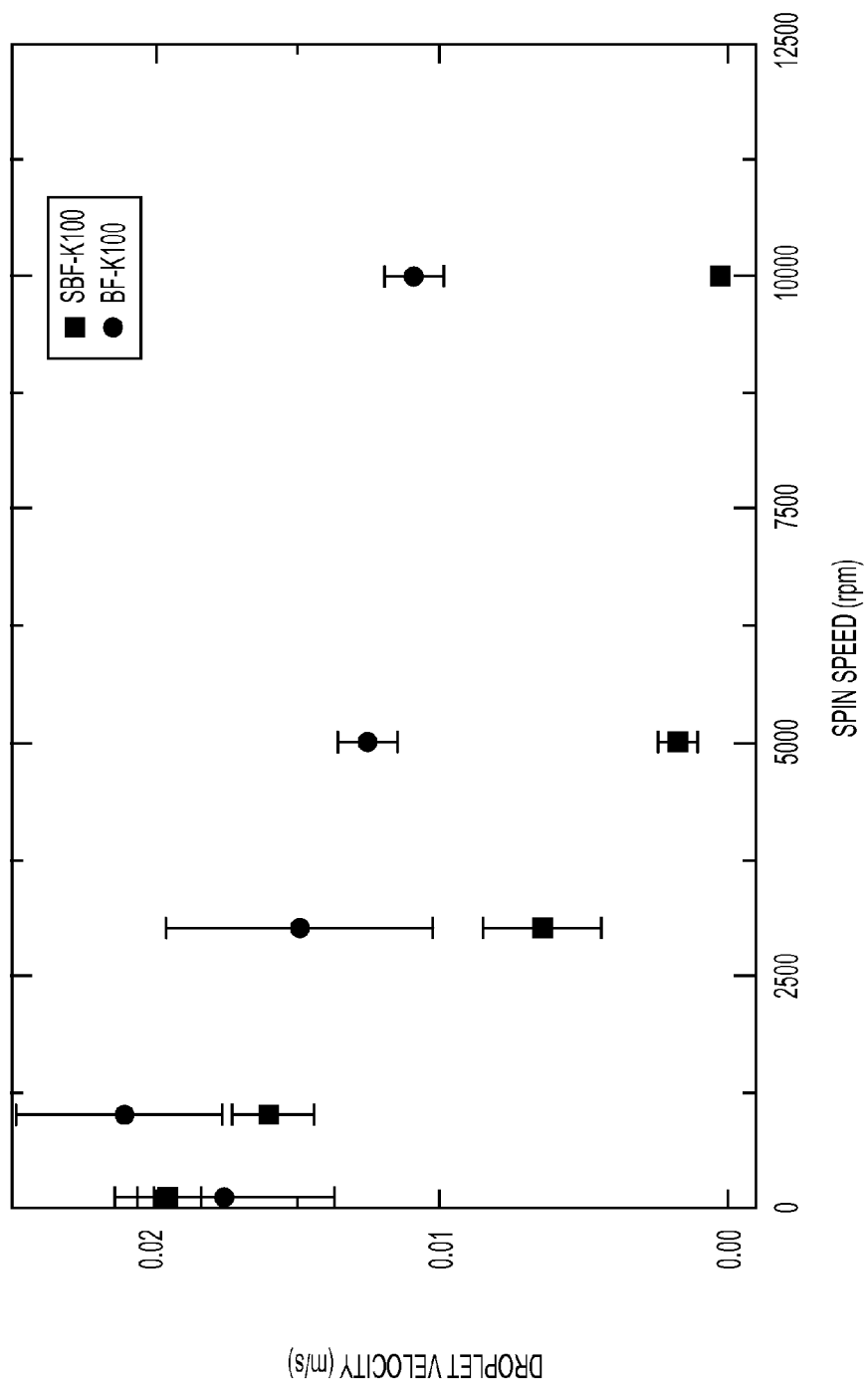
FIG. 9 illustrates average velocity of a 10 µL water droplet moving on 15° tilted lubricant-infused nanostructured surface (BF-K100) and on a hierarchical surface (SBF-K100) after shear exposure of the samples by spinning at each spin rate for 1 min.

This trend can also be confirmed by comparing the average speed of a liquid droplet moving on each type of surfaces. For example, FIG. 9 illustrates average velocity of a 10 μL water droplet moving on 15° tilted lubricant-infused nanostructured surface (BF-K100) and on a hierarchical surface (SBF-K100) after shear exposure of the samples by spinning at each spin rate for 1 min. The average droplet shedding velocity is similar (at low shear) or greater (at high shear) for BF-K100 than SBF-K100. The average conformal thickness of lubricant after spinning at a sufficiently high spin rate is generally similar on both nanotextured and hierarchically textured surfaces. Therefore, the effect of shear stress arising from the relative thickness of the lubricant is generally same on both surfaces. However, the morphology of the thin lubricant layer would be extremely flat on nanotextured surface while it conforms to the microscale texture on hierarchically textured surface. One reason for the different average droplet shedding velocities on SLIPS made on nanotextured and hierarchically textured surfaces can be the effect of this non-flat lubricant layer combined with the 'stick-slip' behavior observed on SLIPS made on hierarchically textured surfaces.

Figure 10:
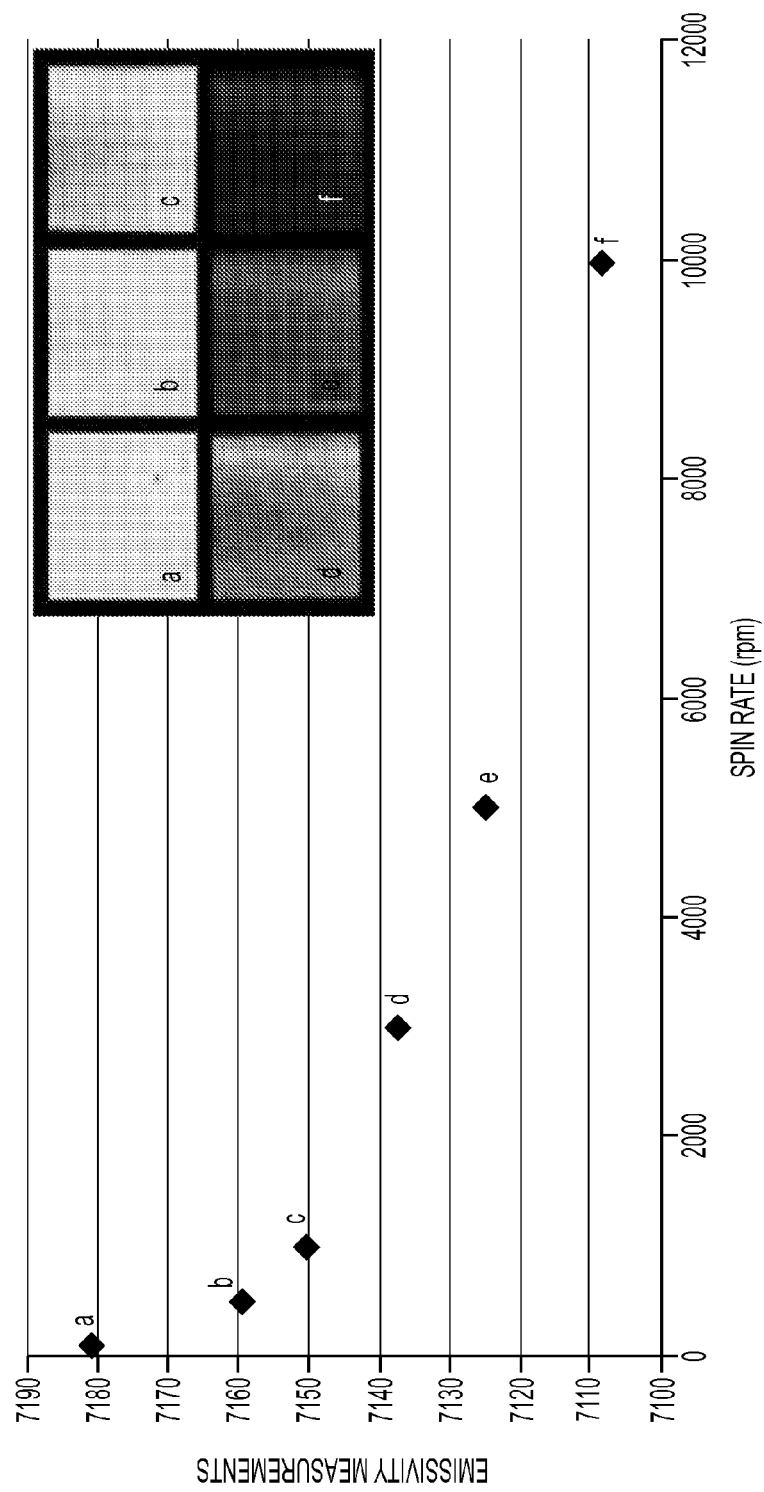
FIG. 10 illustrates an infrared (IR) emissivity measurement on an SBF-K100 sample.

FT-IR infrared camera can also be used to monitor the changes of the thickness of the lubricant after different spinning rates. The emissivity of the surface decreases with the lubricant thickness. FIG. 10 illustrates an infrared (IR) emissivity measurement on an SBF-K100 sample. As illustrated in FIG. 10, the lubricant layer on the SBF-K100 becomes thinner when the spin rate gets higher.

In addition, the weight changes before and after each spinning experiment can also be measured to calculate the mass of retained lubricant and observed gradual loss of lubricant on all types of surfaces. In one example, Table 2 demonstrates estimated thickness (μm) of remaining lubricant (Krytox GPL 100) on each type of the solid substrates after exposure to shear.

TABLE 2

| Shear condition (RPM, 1 min) | SiF-K100 (flat) | SF-K100 (microscale roughness) | BF-K100 (nanoscale roughness) | SBF-K100 (hierarchical roughness) |
|---|---|---|---|---|
| 100 | 81.9 | 47.8 | 47.1 | 62.0 |
| 500 | 9.4 | 12.6 | 7.6 | 11.2 |
| 1,000 | 4.7 | 7.4 | 3.5 | 6.6 |
| 3,000 | 1.7 | 3.8 | 1.3 | 4.0 |
| 5,000 | 1.1 | 3.3 | 0.7 | 2.5 |
| 10,000 | 0.6 | 2.8 | 0.4 | 1.6 |

The volume of the remaining lubricant after each shear experiment can be calculated by measuring the mass of the remaining lubricant and the density of the lubricant (1.835 g/cc at room temperature). The thickness of the lubricant can then be estimated by assuming a uniform lubricant thickness over the area of the sample. Although microtextured substrates can retain more lubricant than nanotextured substrates after subjecting to a high spinning rate, their performance as SUPS can be worse than that on nanotextured surface, indicating that the robustness of SLIPS may not be directly correlated to the retention of the lubricant alone.

As discussed above, SLIPS coatings based on uniformly nanostructured surfaces can provide superior performance in simulated high shear conditions compared to hierarchically structured surfaces that are conventionally known to better perform as a Cassie-Baxter type non-wetting surface.

Preparation of Metal-Containing Surface Using Sol-Gel Processes

Robust SLIPS coatings can be formed on a variety of materials and shapes with optical transparency. The generalized methods of creating SLIPS can offer a high level of applicability, low cost, simplicity, scalability, and compatibility with current manufacturing infrastructures and can allow for converting virtually any materials into omniphobic surfaces for many applications requiring robust anti-fouling, easy-to-clean, anti-ice, and anti-corrosion functions.

A solution-based mixture can be used to fabricate SLIPS on arbitrary metal or nonmetal substrates. The mixture can be applied by various application methods including spraying, dip coating, painting, spin coating, printing, drop casting, etc. Such mixtures can include sol-gel precursors to metal oxides, metal hydroxides, metal oxy hydroxides, or dispersions containing metal oxides, metal hydroxides, metal oxy hydroxides, where the metal component can include Mg, Al, Si, Ca, Ti, V, Cr, Mn, Fe, Co, Ni, Cu, Zn, Sr, Y, Zr, Nb, Mo, Ru, In, Sn, Ba, Hf, Ta, V Os, Pb, Bi, La, Ce, Pr, Nd, Sm, Eu, Gd, Tb, Dy, Ho, Er, Tm, Yb, Lu, or the mixtures thereof. The sol-gel precursor can be deposited on arbitrary shapes, and then converted into a corresponding metal oxide, metal hydroxide, or metal oxy hydroxide, or salts. In some embodiments, a solution-processed thin coating material can be further reacted to induce nanostructures. In some embodiments, the entire coating layer is chemically modified to contain nanostructures. In some embodiments, only an upper portion of the coating layer is chemically modified to contain nanostructure. In some embodiments, the solution-based mixtures can include porogens to introduce or enhance porosity.

In some embodiments, an adhesion promoter can be used to enhance the adhesion between the metal-containing layer and the underlying substrate. For example, dopamine or polydopamine can be used as a adhesion promoter and applied onto a substrate before or when a sol-gel precursor is applied.

In some embodiments, the underlying substrate is chemically or plasma-activated (or preconditioned) to enhance the adhesion between the metal-containing layer and the underlying substrate.

In some embodiments, SLIPS can be formed on boehmite surface based on alumina sol-gel. For example, alumina sol-gel film can be further treated with hot water or steam to create aluminum oxy hydroxide (boehmite) nanostructure. These procedures can help create nanoporous structures. All of these nanostructured or nanoporous materials can be subsequently functionalized (e.g. fluorination, alkylation) and lubricated to fabricate SLIPS on arbitrary materials.

In some embodiments, SLIPS can be formed using a flow coating method. This SLIPS coating method can involve flowing a series of different solutions (e.g. simple flow coating of a set of solutions, layer-by-layer deposition, orthogonal solution-based deposition) thus can be automated in a continuous process for a large volume of articles without requiring expensive vacuum equipment. The flow coating method can be used to create SLIPS on the inner surface of a fluidic channel (e.g., a tube) which is otherwise difficult to be treated using conventional methods. In one example, an adhesion promoter first flows through a fluidic channel to enhance the adhesion of its inner surface; a metal-containing sol-gel solution then flows through the fluidic channel to create a sol-gel layer on the inner surface; mechanisms such as hydrolysis and/or heat treatment are used next to create roughened and/or porous inner surface; a functionalizing agent then flows through the fluidic channel to functionalize the inner surface; at last, a lubricant flows through the fluidic channel to form in SLIPS on its inner surface.

SLIPS formed on metal-containing surface using sol-gel processes are described in more details in the following exemplary implementations.

EXAMPLE 5

SLIPS Formed on Boehmite Surface Created from Alumina Sol-Gel Layer

In some embodiments, boehmite coating can be formed via a sol-gel process on non-aluminum substrates. A transparent thin film of sol-gel derived alumina can be applied to various substrate surfaces—for example, glass, stainless steel, polymers (Polystyrene (PS), Poly(methyl methacrylate) (PMMA), poly carbonate, polysulfone, polyurethane, epoxy, polyolefins, Polyethylene terephthalate (PET), polyvinyl chloride (PVC), etc.—using solution-based deposition (spin coating, dip coating, flow coating, spray coating, painting, etc.) and vapor phase deposition (CVD, ALD, PVD) at temperature ranges from room temperature to 400° C. The substrate being coated by sol-gel method can be smooth and unstructured because the boehmite process can provide the desired roughened texture on any arbitrarily shaped surfaces. In other embodiments, the substrate being coated by sol-gel method can have an initially existing roughened surface, in which case the boehmite process provides an additional hierarchy of surface features. In some embodiments, substrates are first preconditioned before applying the sol-gel coating to provide high adhesion. An exemplary pre-treatment includes plasma-treatment, corona treatment, solvent conditioning and cleaning, application of a thin adhesion promotion layer (e.g. polydopamine-forming solution, cyanoacrylate solution), and deposition of adhesion layer (e.g. Ti, Cr). etc. In other embodiments, the substrate being coated by sol-gel method can have a sacrificial material, e.g., a porogen, in which case the porous surface itself created front the removal of porogen alone can serve as a porous substrate or the subsequently boehmitized surface can provide an additional roughness. The coatings can then be functionalized with appropriate surface modifiers to render the surface to exhibit superhydrophobic, superhydrophilic and SLIPS wetting properties. In some embodiments, a sacrificial pore-generating agent (porogen) can be added to the sol-gel mixture, which can be removed afterwards typically by selective dissolution, heat treatment, selective degradation (e.g. UV irradiation) of such components to increase surface porosity. In some other embodiments, a structure-inducing agent such as surfactant molecules or template molecules can be added to this mixture, which can either slay in the finished SLIPS coating or can be removed afterwards typically by heating, selective dissolution, selective degradation (e.g. UV irradiation) of such components.

Figure 11:
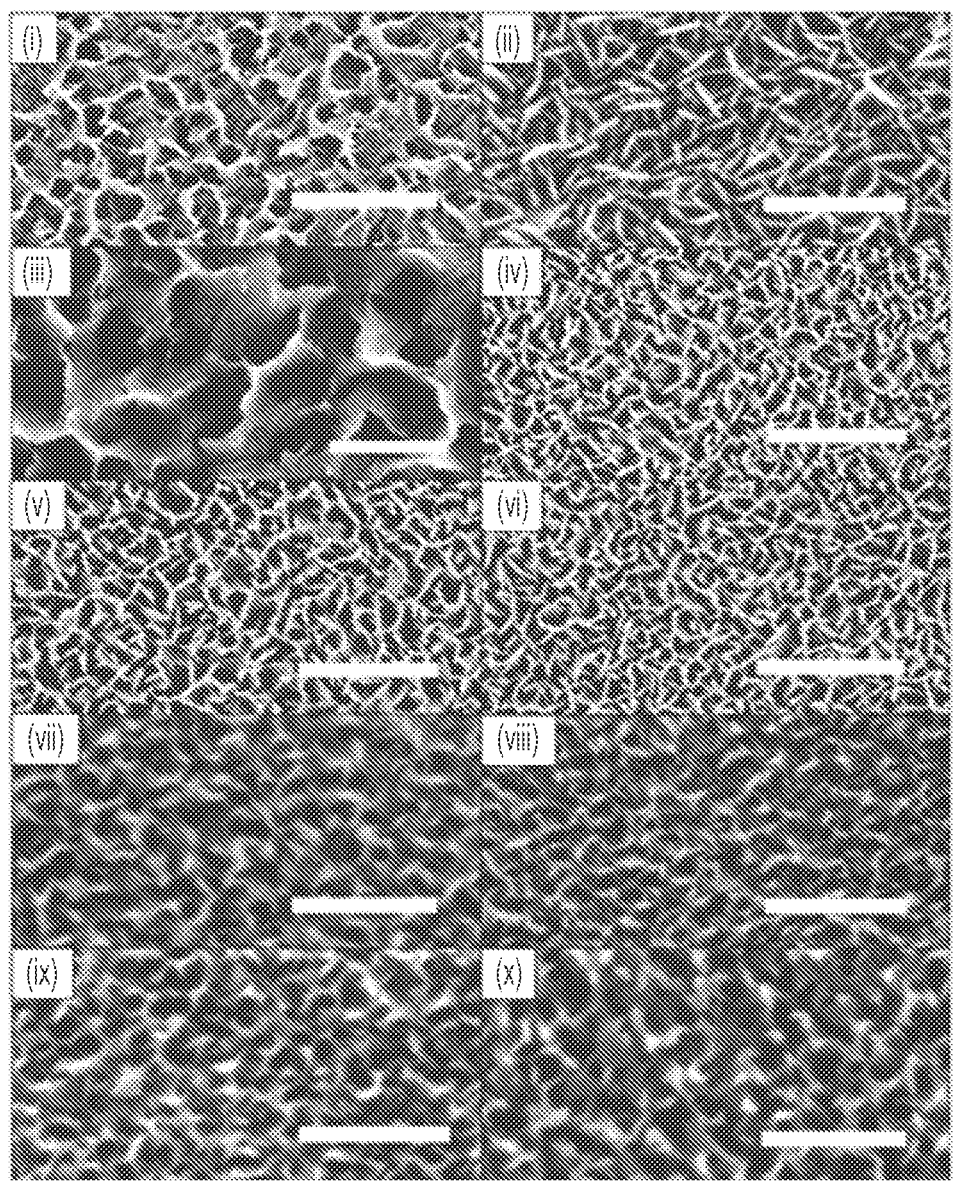
FIG. 11 contains SEM images of boehmite (AlO(OH)) nanostructures on various substrates glass, (ii) Al 5052, (iii) polystyrene, (iv) polycarbonate, (v) polysulfone, (vi) stainless steel, (vii) acrylic, (viii) nylon, (ix) PVC, (x) PDMS (scale bars are 500 nm)

In some embodiments, a sol-gel method involving acetoacetate-stabilized aluminum tri-sec-butoxide solution in a mixture of isopropyl alcohol and water can be adopted to prepare a thin coating of alumina on various materials. The sol-gel method can be particularly useful, as the precursor solution can be applied over a large area and on arbitrary shapes by spray coating, spin coating, dip coating, flow coating, printing, pen writing, etc. To improve the adhesion of the sol-gel layer, the underlying substrate can be activated by plasma etching or by applying an adhesion promotion layer. Using this method, many types of solid substrates including glass, quartz, metals (stainless steel, copper, titanium, carbon steel), ceramics, stone, plastics (HDPE, LDPE, PP, PS, PMMA, PC, PVC, PET, polysulfone), elastomers (polyurethane, silicone), thy hydrogel, and fabrics can be converted into robust anti-fouling materials. FIG. 11 contains SEM images of boehmite nanostructures on exemplary substrates: (i) glass, (ii) Al 5052, (iii) polystyrene, (iv) polycarbonate, (v) polysulfone, (vi) stainless steel, (vii) acrylic, (viii) nylon, (ix) PVC, and (x) PDMS (scale bars are 500 nm). While each material shows highly uniform surface structuring, the nanoscale morphology and feature sizes of boehmite layer produced directly on aluminum metal and those derived from the sol-gel alumina coating can vary depending on the nature of the substrate, boehmitization temperature and time, and the use of steam instead of hot water. This may allow for fine-tuning of underlying nanoscale structures to further optimize the SLIPS properties.

Once the boehmite roughened surface is formed, it can be further chemically functionalized as described earlier in this document.

One exemplary sol-gel process includes:
1. Preparation of an alumina sol-gel precursor (aluminum-tri-tert-butoxide+ ethylacetoacetate+2-propanol+water) (1 hour);
2. Preconditioning of a surface to improve adhesion (e.g., via plasma treatment), if necessary;
3. Spin coating or spraying coat the precursor on a substrate (0.5 hour);
4. Drying in temperature as low as 60° C. (optional high temperature annealing at 400 C, 1 hour) (3 hours);
5. Boehmite formation in water (10 min, T=60-100° C. or >1 hour, T<60° C.) (0.3 hour);
6. Fluorination (fluoroalkyl phosphate or phosphoric acid, 70-80° C. for 1 hour or at room temperature for >6 hour) (1 hour);
7. SLIPS formation (optional).

Figure 12:
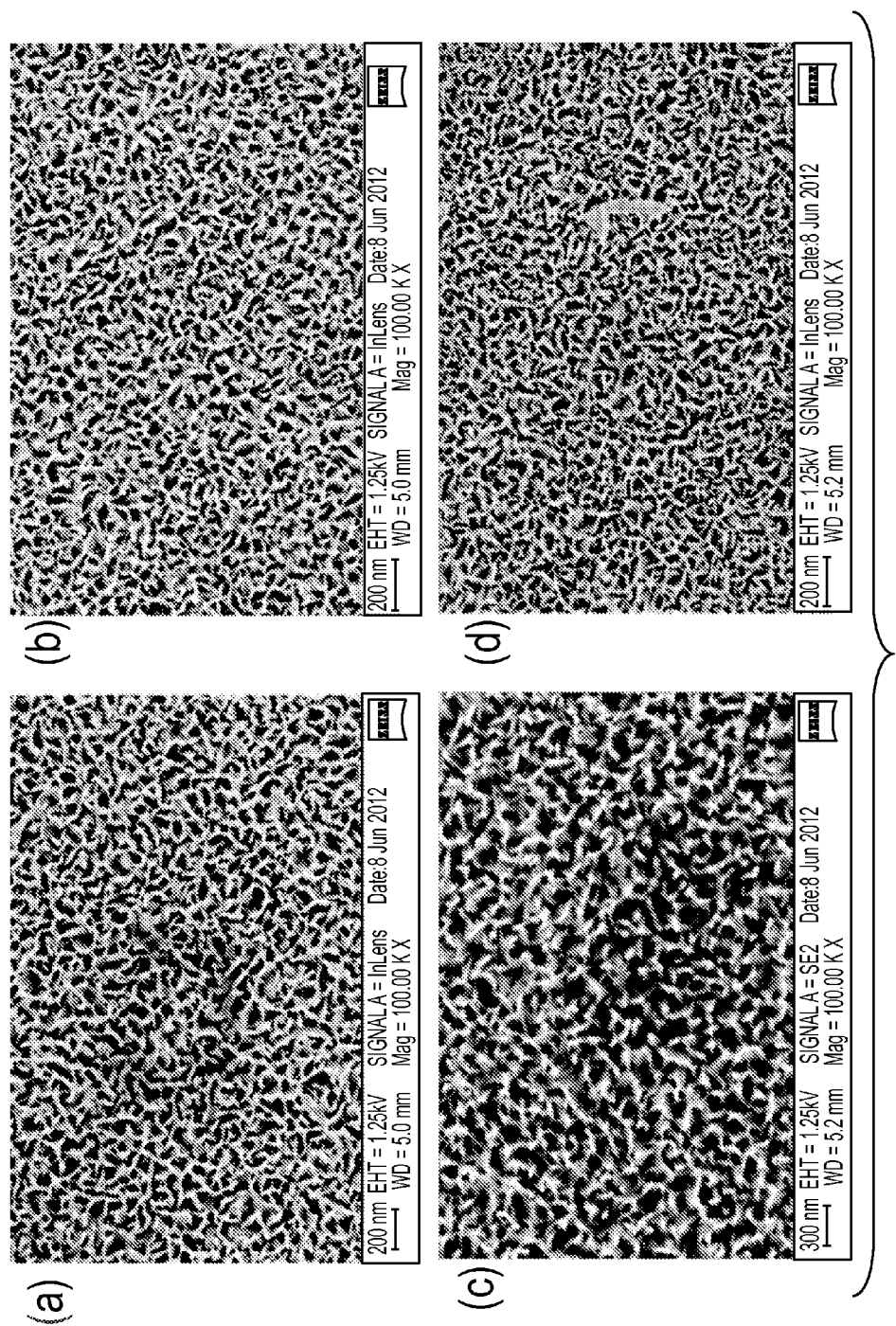
FIG. 12 contains SEM images showing the morphology of sol-gel alumina-derived boehmite (sgB) coating on (a) polysulfone, (b) polycarbonate, (c) glass (photo-curable sgB), and (d) stainless steel 316L.

The alumina sol-gel film thickness obtained from spin coating can be about 150 nm (1,000 rpm, 30 sec) and in its entirety can become boehmite FIG. 12 contains an SEM images showing the typical morphology of sol-gel alumina-derived Boehmite (sgB) coating on (a) polysulfone, (b) polycarbonate, (c) glass (photo-curable sgB), and (d) stainless steel 316L. All samples were boehmitized in 100° C. deionized water (DIW) for 10 minutes.

As discussed above, functionalization and lubrication of boehmitized Al surfaces, which can result in consistent, regular nanoscale texture, can provide a simple, low-cost, scalable, and environmentally friendly method to convert aluminum—the most abundant metal used for outdoor structural materials, vehicles, marine vessels, aircrafts, refrigerators, and many household products—to a high-quality non-fouling material. The boehmitized Al layer can also be formed on a wide range of alternative materials after applying a thin film of either vapor-deposited aluminum or sol-gel-derived alumina, thus providing a universal route for creating the same quality slippery coatings on arbitrary materials and shapes.

Figure 13:
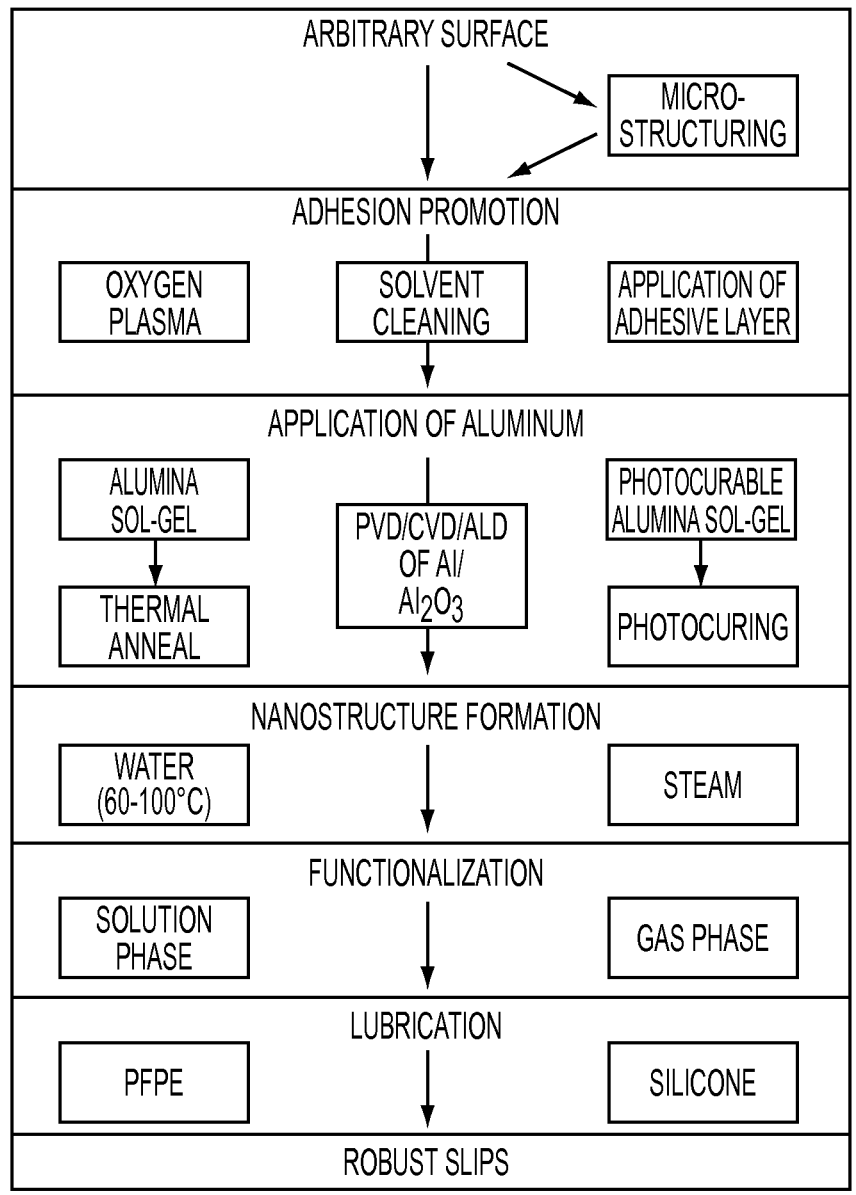
FIG. 13 contains a schematic flowchart of generalized process for creating boehmite-based SLIPS on arbitrary surfaces.

FIG. 13 contains a schematic flowchart of a generalized process for creating boehmite-based SLIPS on arbitrary surfaces. For example, starting from commercially available aluminized plastic films (e.g. PET or PP) or glass slides coated with 100 nm aluminum with a thin Ti adhesion layer, the thin aluminum layer can be directly converted into optically transparent SLIPS by forming boehmite and subsequent chemical functionalization and lubrication.

Figure 14:
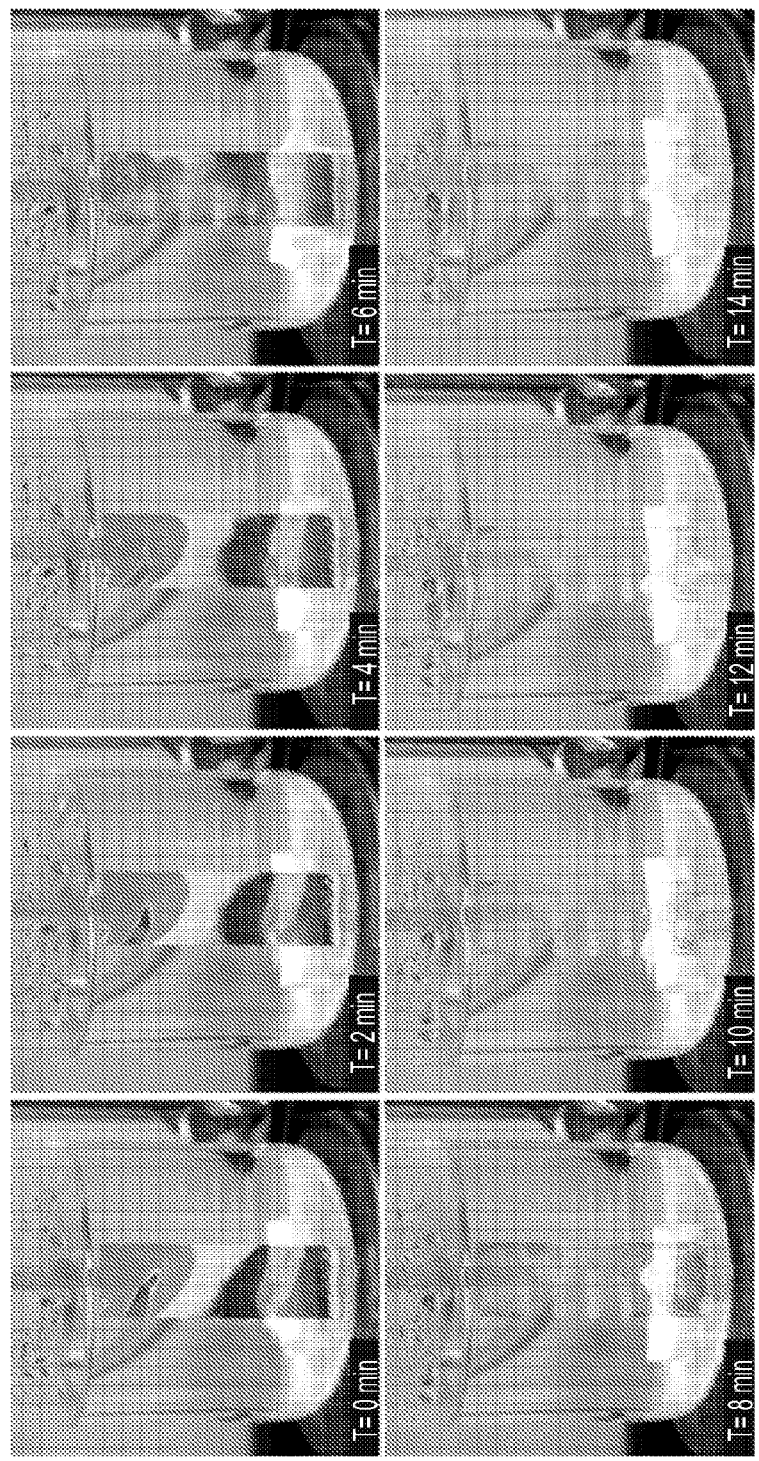
FIG. 14 contains time-lapsed images of a ~50 nm thick aluminum-coated PET film during the exposure to hot water.
Figure 15:
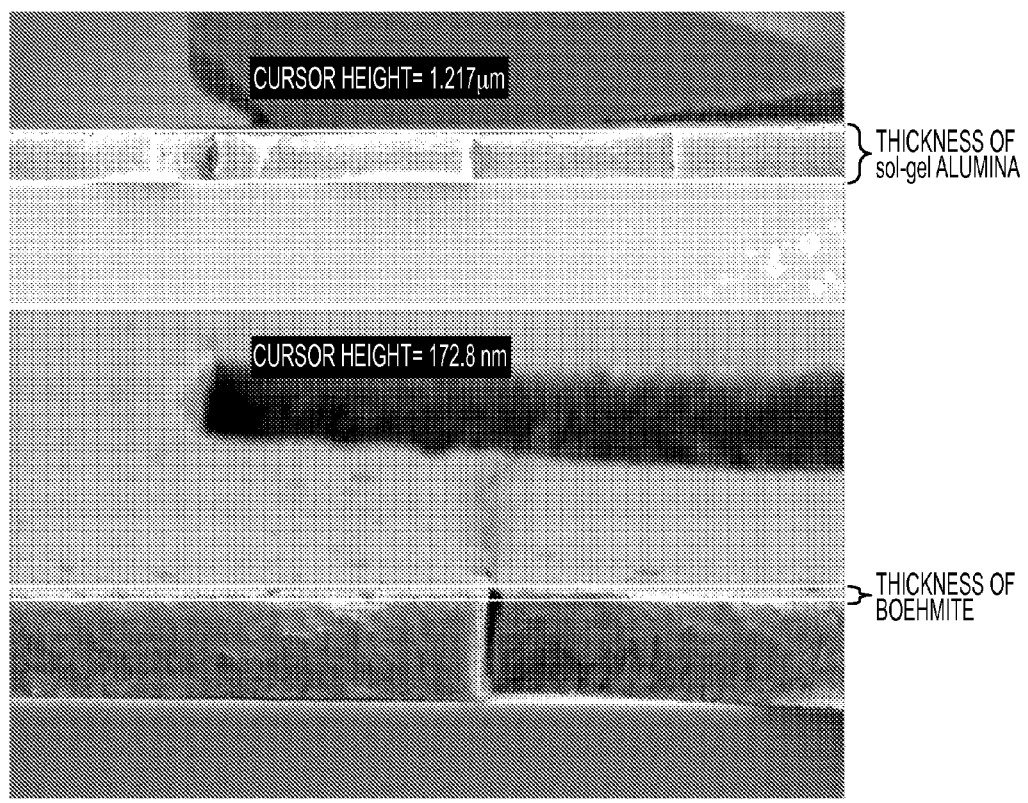
FIG. 15 contains SEM images of a freeze-fractured cross-section of boehmitized sol-gel alumina spin-coated on an oxygen plasma-treated glass slide.

FIG. 14 contains time-lapsed images of a ~50 nm thick aluminum-coated PET film during the exposure to hot water. As illustrated in FIG. 14, the initially reflective aluminum surface can gradually become optically transparent as the layer is convened into boehmite. FIG. 15 contains SEM images of a freeze-fractured cross-section of boehmitized sol-gel alumina spin-coated on an oxygen plasma-treated glass slide. The thickness of the sol-gel alumina layer is about 1.2 μm, of which about 170 nm is boehmitized by reacting with boiling water for 10 minutes.

Figure 16:
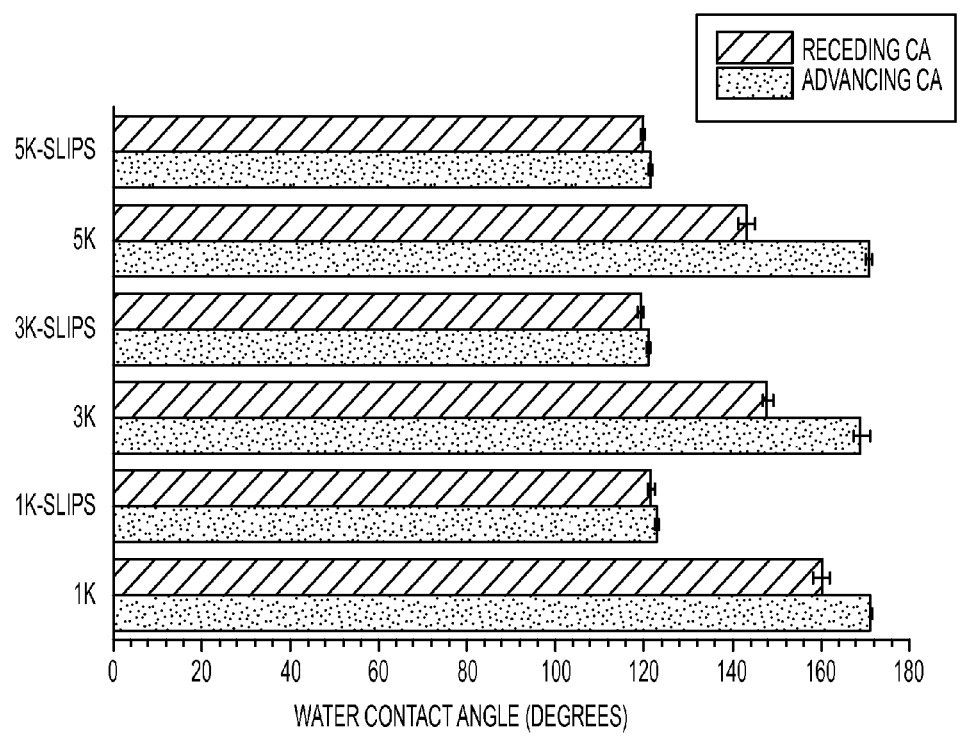
FIG. 16 illustrates the water contact angles and contact angle hysteresis of SLIPS (with Krytox-100 lubricant or BF-K100) created on a sgB coating over glass, prepared at 1 k, 3 k, and 5 k spin rate.

The boehmitized surfaces created by the sol-gel process can possess properties similar to those created by direct boehmitization on aluminum. FIG. 16 illustrated the receding and advancing water contact angles and corresponding contact angle hysteresis of SLIPS (with Krytox-100 PFPE lubricant) created on a sol-gel alumina-derived boehmite coating over glass at varying thicknesses, created by spin coating an aluminum sol-gel onto a glass at 1 k, 3 k, and 5 k spin rate. The dried alumina thickness is 150 nm, 110 nm, and 100 nm for 1 k, 3 k, and 5 k spin rate, respectively. As illustrated in FIG. 16, all substrates show good SLIPS performance, e.g., very low CAH. The thickest alumina film from 1 k spin rate that was subsequently converted to the deepest boehmite layer features the best SUPS performance (e.g., superhydrophobicity) of this sample set.

The capability of treating an object of arbitrary shape and consisting of different materials (metals, plastics, etc.) as a whole can allow the SLIPS manufacturing to be integrated with existing manufacturing processes. The process can be rapid (approximately 6 hours), is environmentally friendly, and can be performed without any specialized equipment, e.g., without cleanroom equipment.

EXAMPLE 6

Transparent SUPS Based on Sol-Gel Processes

In some embodiments, the sol-gel process can be used to create optically transparent superhydrophilic or superhydrophobic or slippery surfaces on various substrates (e.g., glass, stainless steel and plastics). The sol-gel alumina-derived boehmite coating can also have anti-reflective function from the subwavelength structural coating with or without the presence of applied lubricant.

Figure 17A:
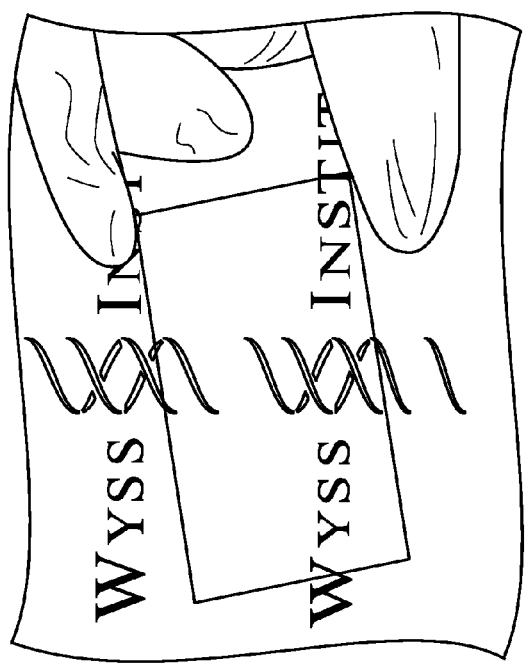
FIG. 17 shows a photograph (a) illustrating the optical clarity sgB coating on a glass slide; and a normal incidence optical transmission spectra (b) measured using a UV-VIS-NIR spectrometer for uncoated PMMA, polysulfone, quartz, glass slide and their respective SLIPS-coated slides with sgB coating followed by infusing with Krytox 100 PFPE (perfluoropolyether) lubricant.
Figure 17B:
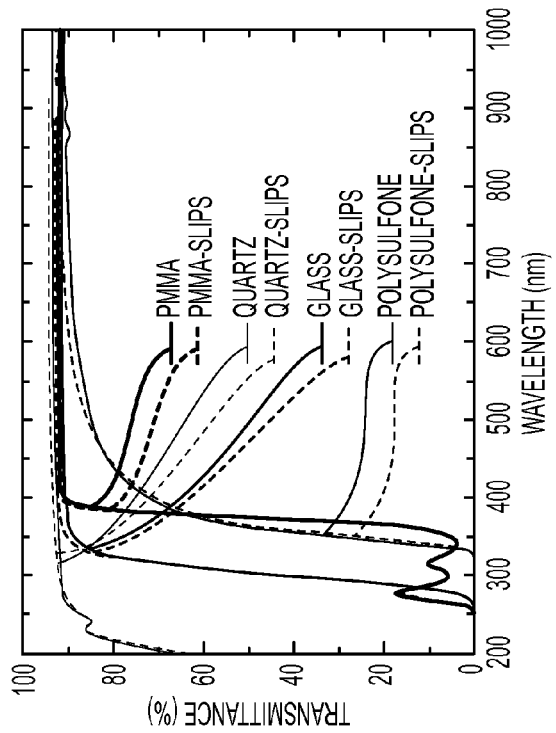

FIG. 17 shows a photograph (a) illustrating the optical clarity of sol-gel alumina-derived boehmite coating on a glass slide; and a normal incidence optical transmission spectra (b) measured using a UV-VIS-NIR spectrometer for uncoated PMMA, polysulfone, quartz, and glass slides and their respective SLIPS coated slides with alumina-derived boehmite and K100 lubricant. As illustrated in FIG. 17(b), the sol-gel alumina-derived boehmite coating can have an anti-reflective effect (so called "moth-eye effect") and increase the transmittance in sol-gel alumina-derived boehmite-coated samples.

EXAMPLE 7

Photo-Patternable SLIPS Based on Sol-Gel Processes

In some embodiments, sol-gel alumina derived coatings on various materials can be patterned into nanostructured SLIPS and unstructured regions by using photo-curable sol-gel alumina precursors. The photo-patternable boehmite method can generate topographical contrast by controlling the deposition of nanostructured materials. For example, the methacrylate group in 2-(methacryloyloxy) ethyl acetoacetate can be polymerized and crosslinked with an added crosslinker by photo-initiated radical generator, while the acetoacetate group can provide strong coordination to aluminum metal by replacing the alkoxy groups of the aluminum metal precursor:

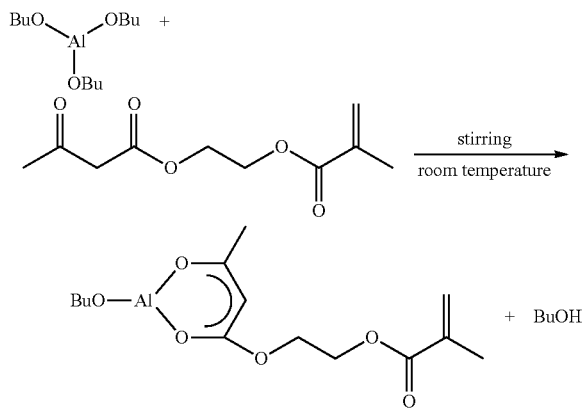

Figure 18:
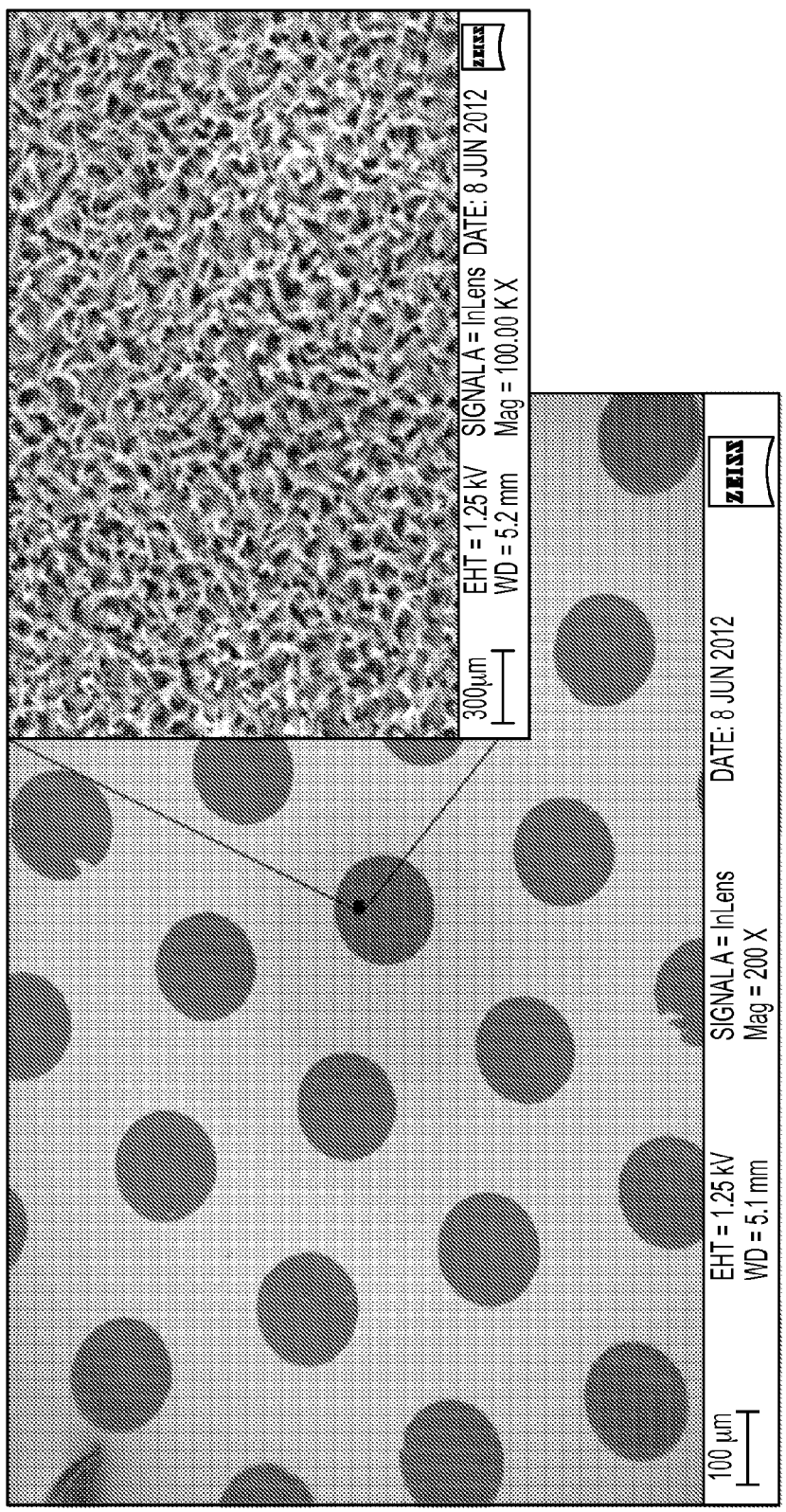
FIG. 18 contains an SEM image showing the photo-patterned sgB coating on a glass substrate and the boehmite morphology.

One exemplary sol-gel solution is a mixture of aluminum-tri-tert-butoxide+ethylacetoacetate+2-propanol+water, from which ethyl acetoacetate can be replaced by 2-(methacryloyloxy) ethyl acetoacetate and a photoinitiator (e.g. DAROCUR 1173) to give photopolymerizable functions in order to created only certain regions of gel to be formed. An additional crosslinker, such as ethylene glycol dimethacrylate, may be added to improve mechanical properties of the coating layer. This can allow for micro patterning of the boehmite-SLIPS surface that allows for the fabrication of SLIPS-coated microfluidic channels and 3D-SLIPS among other applications. FIG. 18 contains SEM images of photopatterned sol-gel alumina-derived SLIPS on a glass slide. The dark circular areas correspond to SLIPS where the boehmite nanostructures are shown at higher magnification on the right. Scale bars are 500 μm and 500 nm, respectively. The patterned coating was prepared by spin coating a photo curable sol-gel alumina precursor solution layer on a glass substrate. After spin coating the photocurable sol-gel alumina precursor solution, the pattern was generated by UV exposure to 100 W i-line for 120 s through a photomask and subsequent development in 2-propanol for 60 s. The photopatterned sol-gel alumina was then converted to boehmite by reacting with deionized water at 100° C. for 10 minutes.

Figure 19:
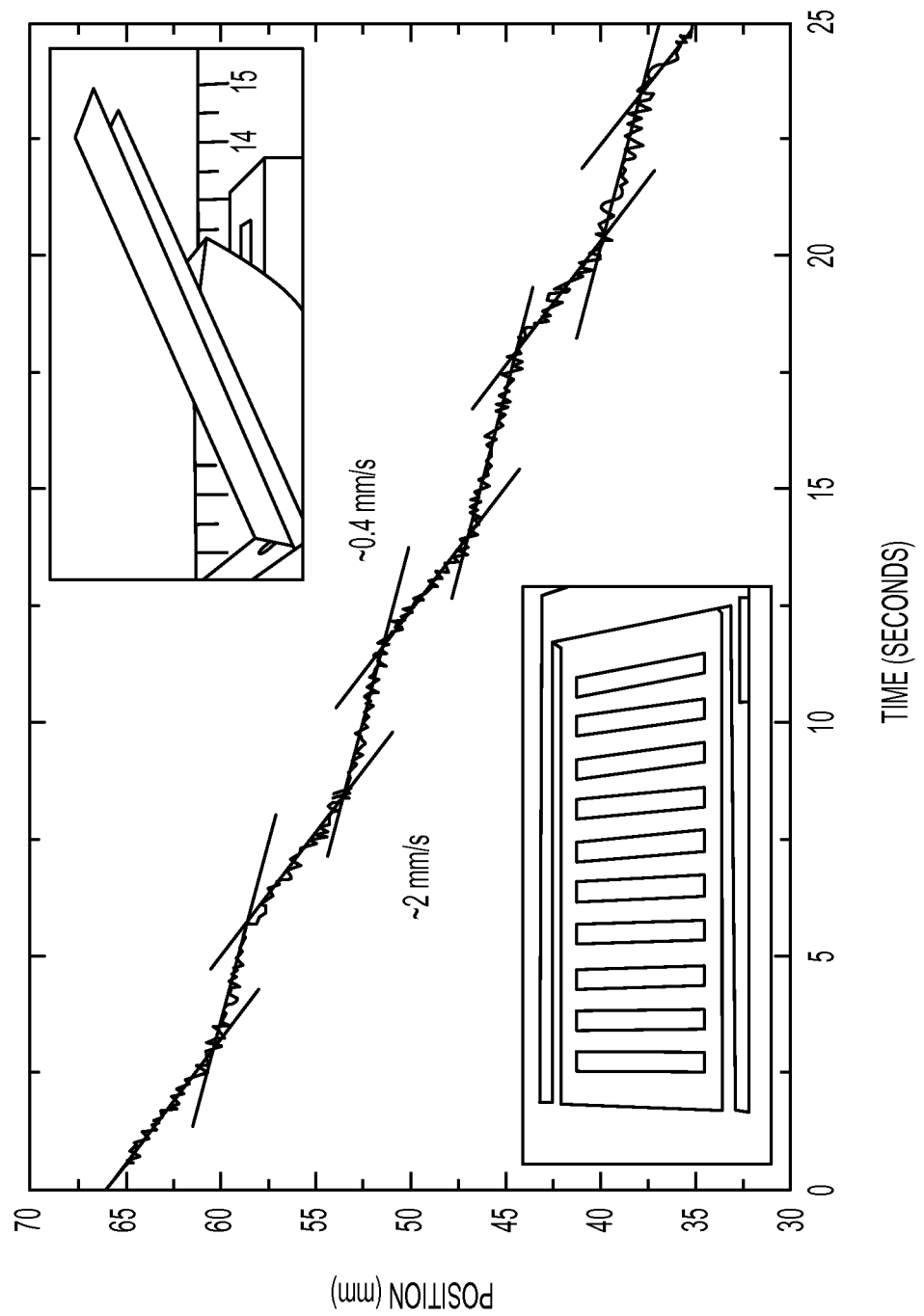
FIG. 19 illustrates velocity of droplets moving on patterned slippery surfaces.

FIG. 19 shows position profile of a 10 μL water droplet sliding on a substrate with alternating regions of photopatterned SLIPS and lubricated, fluorinated flat glass as shown in the bottom inset picture. The substrate is tilted at 30° as shown in the top inset picture. The droplet sliding speed repeatedly switches between ~2 mm/s (on SLIPS) and ~0.4 mm/s (on lubricated glass). Scale bars are 150 mm. The glass substrate only exhibits exceptional liquid-repellent behavior on certain patterned areas. In particular, photopatternable SLIPS coating method can be used to create alternating rectangular areas (38 mm×3 mm) of SLIPS and flat surface on a glass slide as shown in FIG. 19. When a water droplet is placed on this patterned substrate tilted at 30°, the droplet can slide about five times faster on SLIPS surface than on just lubricated fluorinated flat surface, indicating a much higher potential of the roughened SLIPS surface in repelling various foreign liquids. In one experiment, a dyed droplet of water is applied to an inclined substrate with patterned alternating slippery and hydrophobic surfaces. The water droplet slides faster on the slippery regions than on the hydrophobic regions. This approach can therefore allow fabrication of SLIPS-coated fluidic devices and substrates with patterns of defined wetting properties that may be useful for control of an anisotropic liquid flow and droplet motion.

Figure 20B:
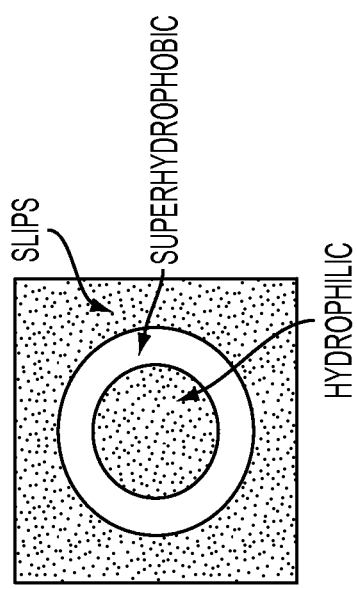
FIG. 20 A-B demonstrates one exemplary application of photo-definable sgB-coated SLIPS.
Figure 20A:
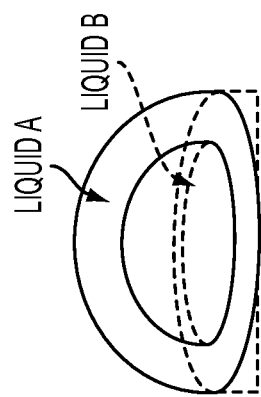

FIG. 20 demonstrates one exemplary application of photo-definable photo-curable sol-gel alumina precursor solution-coated SLIPS to provide a lens using only liquids. A superhydrophobic ring region can be first formed surrounding a hydrophilic region and surrounded by another SLIPS region. Next, two different liquids (A and B) can be deposited onto the ring pattern to form a liquid-based optics. Liquids A and B can be chosen based on their affinities to different regions of the ring pattern. The curvature of the liquid lens can be controlled by changes in temperature, pressure, pH, ion concentration, electric or magnetic field.

EXAMPLE 8

SLIPS Based on Solution Mixtures with Porogen

In some embodiments, a roughened surface can be formed using sol-gel solutions mixed with porogen. Porogen is a sacrificial inclusion compound that can be selectively removed to reveal stable pores in the matrix material. Porogen can be either inorganic or organic particles with a specified shape and size used to create uniform pores of varying sizes. An exemplary procedure of creating SLIPS from sol-gel derived nanoporous alumina with a porogen is as follow.

Figure 21A:
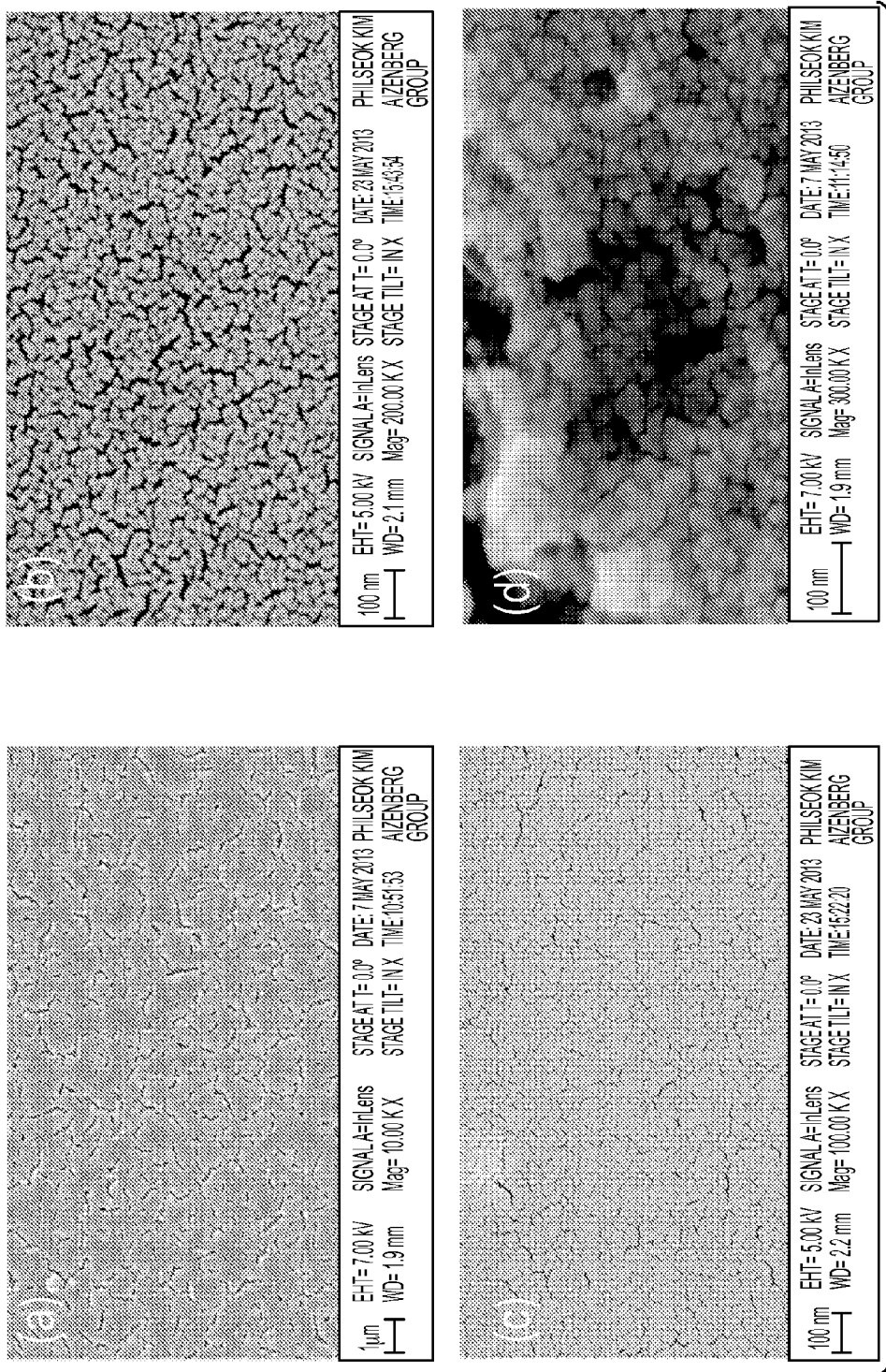
FIG. 21A contains SEM images of nanoporous alumina layer directly formed from sol-gel alumina containing a porogen, polypropylene glycol, without undergoing boehmitization step.

Polypropyleneglycol (PPG), with varying molecular weights and fractions, are incorporated into alumina sol-gel and applied to $O_2$ plasma treated glass substrates. Due to the high viscosity of PPG the alumina sol-gel is diluted using isopropyl alcohol in a 2:1 v/v ratio. The removal of the PPG is facilitated by annealing samples at elevated temperatures (70° C.-400° C.), leaving behind a mesoporous to microporous structure. The substrates are then fluoro-functionalized FS100 solution for 1 h at 70° C. and rinsed with ethanol. Both hydrophobic and superhydrophobic surfaces are observed. However, substrates calcined at higher temperatures (300° C.-400° C.) showed More promising results, compared to samples annealed at 70° C. The hypothesis behind this observation is that the PPG micelles encapsulate the alumina particles when dispersed into the alumina sol-gel. As a result of calcination at elevated temperatures, the PPG is removed and individual (or aggregated) particles fuse together within each micelle to form spherical structures; whereas, at lower temperatures PPG is not completely removed and thus its presence hinders uniform hydrophobicity. The micelle-like structures are shown in FIG. 21A. A representation of hypothesized mechanism that leads to micelle formation is illustrated in FIG. 21B (the alumina particles are shown in gray.

Water contact angle (CA) measurements were used to quantify hydrophobicity. Generally, hydrophobic surfaces are defined to have a CA>120° whereas superhydrophobic surfaces have a CA>150°. From preliminary CA measurements, addition of PPG to alumina sol-gel was found to effectively produce hydrophobic surfaces which are comparable to substrates coated using the conventional alumina sol-gel-boehmitization route. The use of porogen such as PPG has not only shown promising results but is advantageous, due to its versatility to produce a wide range of tunable porosity and its optical transparency.

Figure 22A:
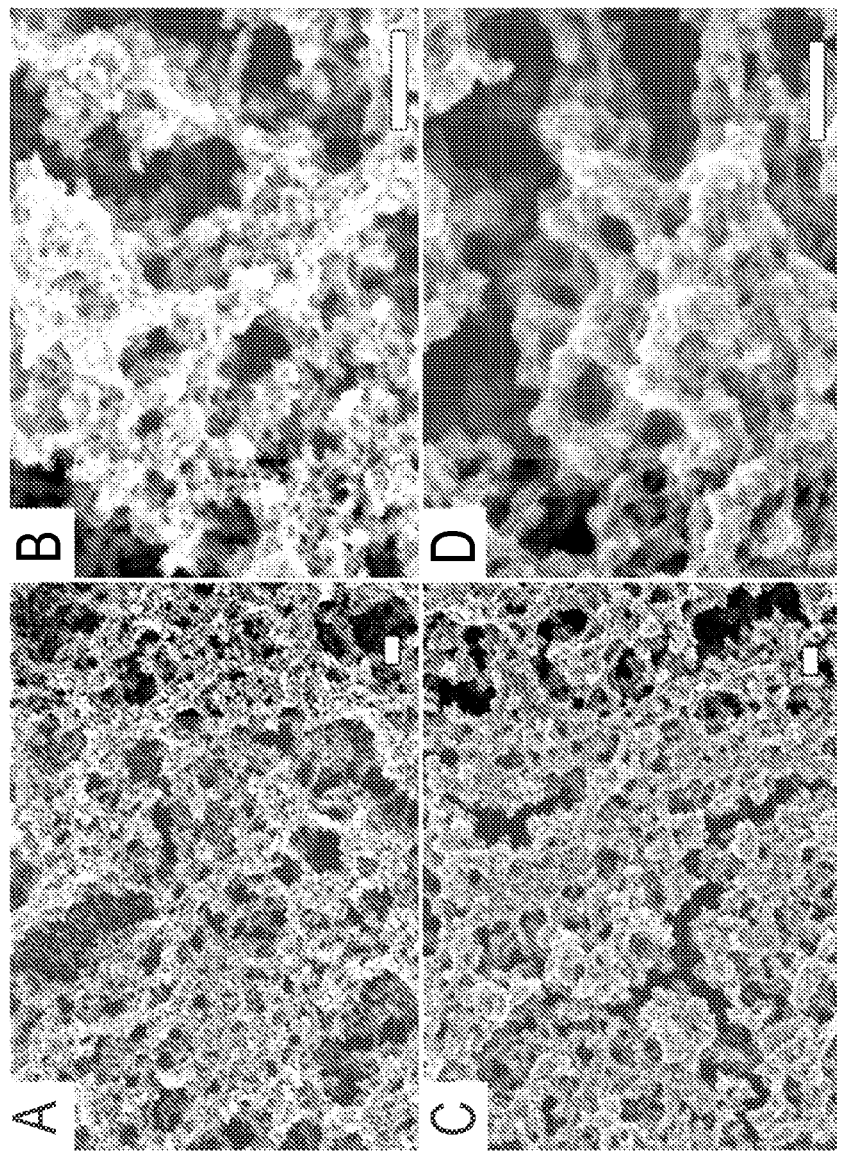
FIG. 22A further demonstrates nanoporous tungsten oxide films formed on a glass substrate.

One exemplary procedure of creating SLIPS from sol-gel derived nanoporous tungsten oxide with a porogen is as follow. $WO_3$ films were prepared via the sol-gel method and dip/spin/spray coating techniques. The coating solution was composed of 4.6 g $WCl_6$ dissolved in 10 ml of absolute ethanol and 1 g of the tri-block copolymer (Plutonic P123) during vigorous stirring in ambient atmosphere, leading to an exothermic alcoholysis reaction. Immediately color was changed to yellow. After 20 min the solutions became green-blue as small fractions of $W^{+6}$ were reduced to $W^{+5}$. The reaction is slow; hence, in order to accelerate the reaction, the sol was heated at 40° C. under reflux until solution that was dark blue became almost transparent. Films were deposited on glass substrates 1 mm thickness (cleaned in acetone and ethanol prior to coating) at room temperature (spin/dip coating) or sprayed on preheated to 300° C. plate. The as spin/dip deposited films were left in air for 12 h to allow solvent evaporation, and then calcined under ambient conditions at 300° C. for 2-5 h, at a heating rate of 1° C. min$^{-1}$. Calcination results in removal of the P123 copolymer leaving porous $WO_3$ films. FIG. 22A shows HR-SEM images of tungsten oxide films deposited by (A, B) spray coating and (C, D) dip coating on glass substrate. B and D images are higher magnification of images in A and C. Scale bars are 200 nm.

$WCl_6$, was purchased from Sigma-Aldrich, stored under nitrogen environment and used as received, tri-block copolymer Pluronic P123, PEG 300, poly met BRIJ 58 and anhydrous ethanol were purchased from Sigma-Aldrich.

Figure 22B:
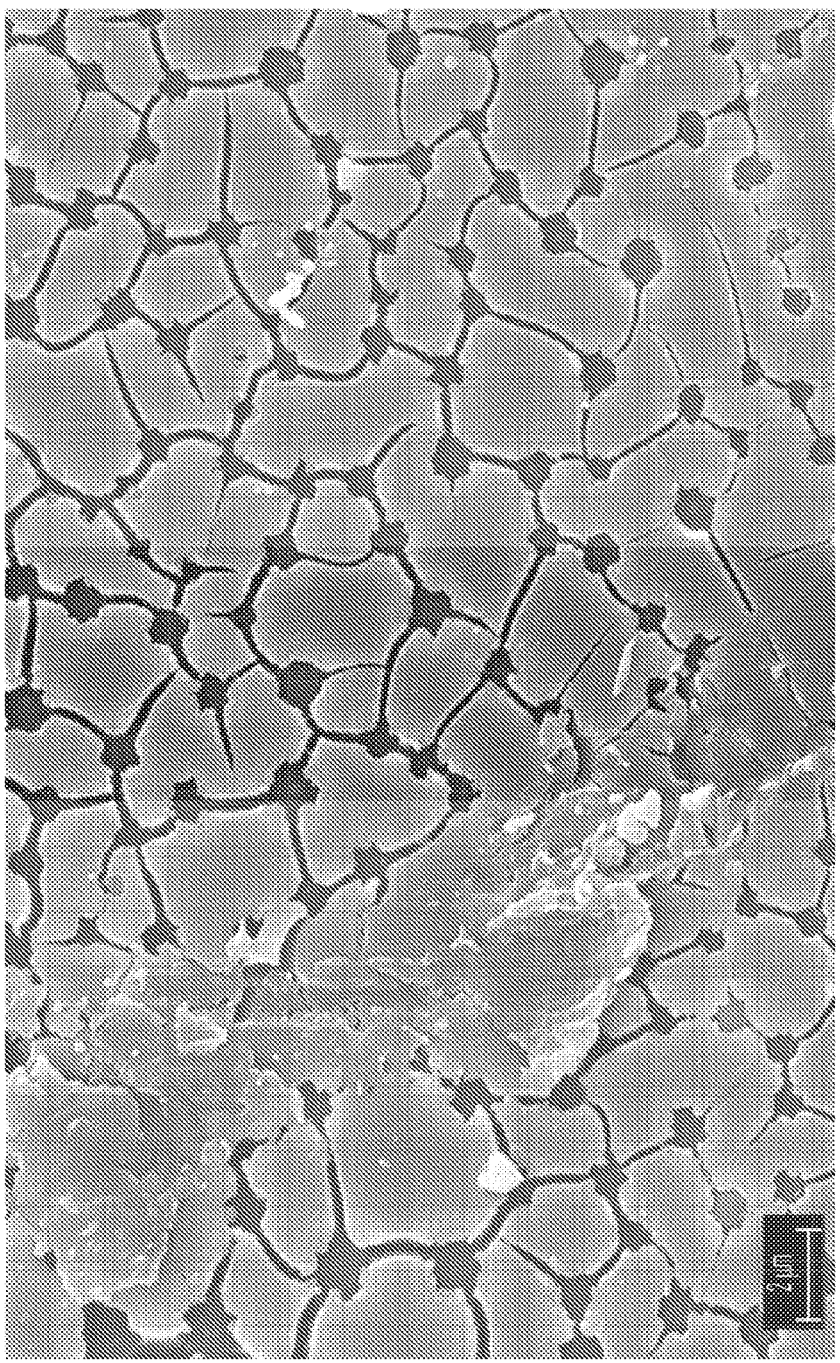
FIG. 22B contains an SEM image of sugar sol-gel coated substrate after dissolution and surface functionalization.
Figure 22C:
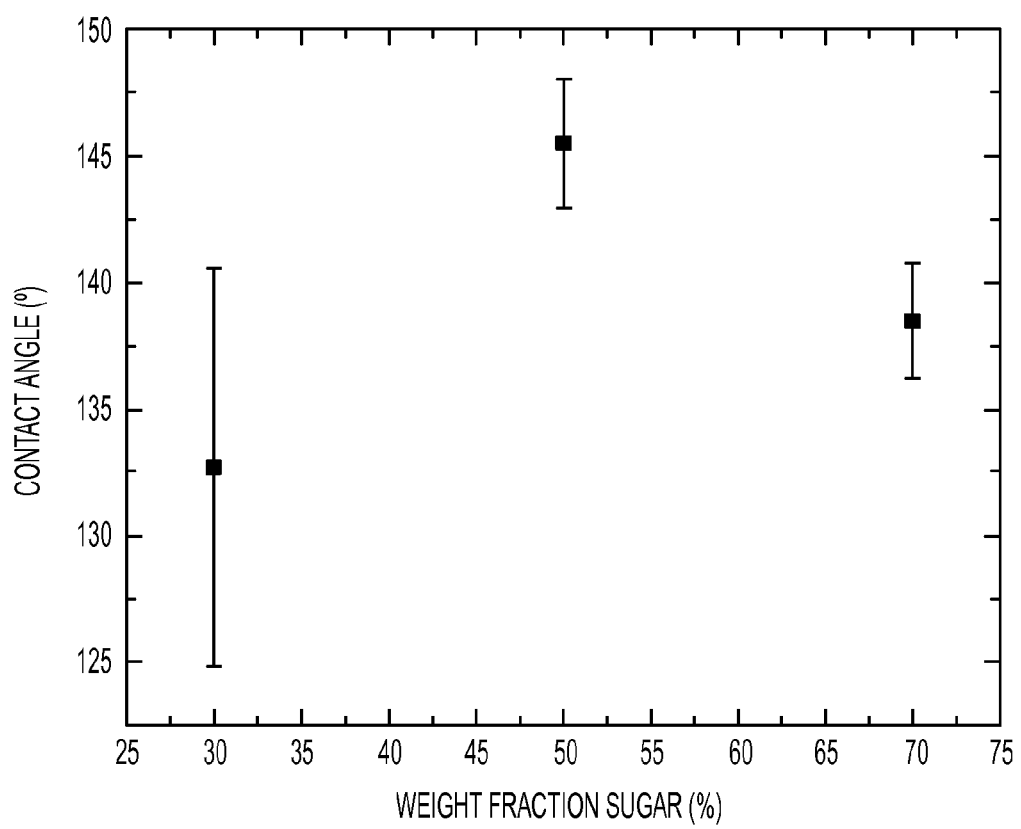
FIG. 22C shows preliminary contact angle measurements on sugar sol-gel coated substrates.

While PPG has proven to be an effective porogen, maximum removal generally requires high temperature annealing, which may not be desirable in certain industrial applications. Alternatively, other organic porogen such as glucose and fructose (sugars) can be used to create micro-porous surfaces, by dissolution in water. Though sugar is only partially soluble in isopropyl alcohol, it can be well dispersed into sugar sot-gel by sonication and applied onto $O_2$ plasma treated glass substrates. Once fully cured the sugar exposed on the surface is dissolved away using water, leaving behind micro to nano scale size pores. After surface functionalization in the FS100 solution for 1 h at 70° C. the surfaces are qualitatively observed to be superhydrophobic. The sugar sol gel can be applied via different methods including spin, dip and spray coating. Furthermore, due to the robustness of the particles, they can be applied as a sediment layer on top of a substrate coated in alumina sol-gel and again removed by dissolution using water. Similarly, sodium chloride (salt) is an inorganic porogen that is used to create uniform porosity following the same procedure for sugar sol-gel stated above. The use of soluble porogen of different shape and size allows for versatile formation of pore features and control of surface morphology tailored for different applications. Initial contact angle measurements suggest that superhydrophobic surfaces can be created using soluble molecules, which can support SLIPS by infusing with lubricant. Using soluble porogen as an alternative for creating porosity can overcome the limitations of using bohemitization as the source of nanoscale structures. FIG. 22B contains an SEM image of sugar sol-gel coated substrate after dissolution and surface functionalization. FIG. 22C shows preliminary contact angle measurements on sugar sol-gel coated substrates.

EXAMPLE 9

SLIPS Formed by Flow Coating

One aspect of the disclosed subject matter includes a method of coating difficult-to-coat geometries (e.g., interior of tubes, pipes, micro-channels, etc.) and low-adhesion materials (e.g., silicone, PVC, etc.) with SLIPS. The substrate can be modified off-the-shelf, as produced from commercial sources. SLIPS based on sol-gel alumina derived boehmite may sometimes require good adhesion of the sol-gel alumina onto the substrate material. This can sometimes be achieved by activating the surface via oxygen plasma treatment to create oxygenated functional groups (e.g. hydroxyl groups), which can form covalent oxygen atom-containing linkages with the sol-gel alumina. However, this method can be difficult for the surfaces that are highly hidden and for large volume samples (e.g. long plastic tubing) due to the limited diffusion of plasma to treat the internal areas and the limitations of vacuum equipment size needed for plasma treatment. In one example, a liquid phase adhesion promoter can be deposited in flow conditions, in high aspect ratio geometries, where plasma activation may not be practical. In another example, a one-pot mixture of adhesion promoter (e.g. dopamine or dihydroxyphenylalanine (DOPA)) and one or more additives that allow for strong adhesion of subsequent layers (e.g. phosphonic or phosphate acid and/or esters for sol-gel coating) can be co-deposited. In yet another example, a significant thickness of adhesion promoter itself can be formed to serve as a porous overcooling to support SLIPS with appropriate chemical functionalization that can be done by stepwise functionalization, one-pot functionalization, or gradient functionalization methods. This SLIPS coating method can involve flowing a series of different solutions (e.g. simple flow coating of a set of solutions, layer-by-layer deposition, orthogonal solution-based deposition) thus can be automated in a continuous process for a large volume of articles without requiring expensive vacuum equipment.

Figure 23:
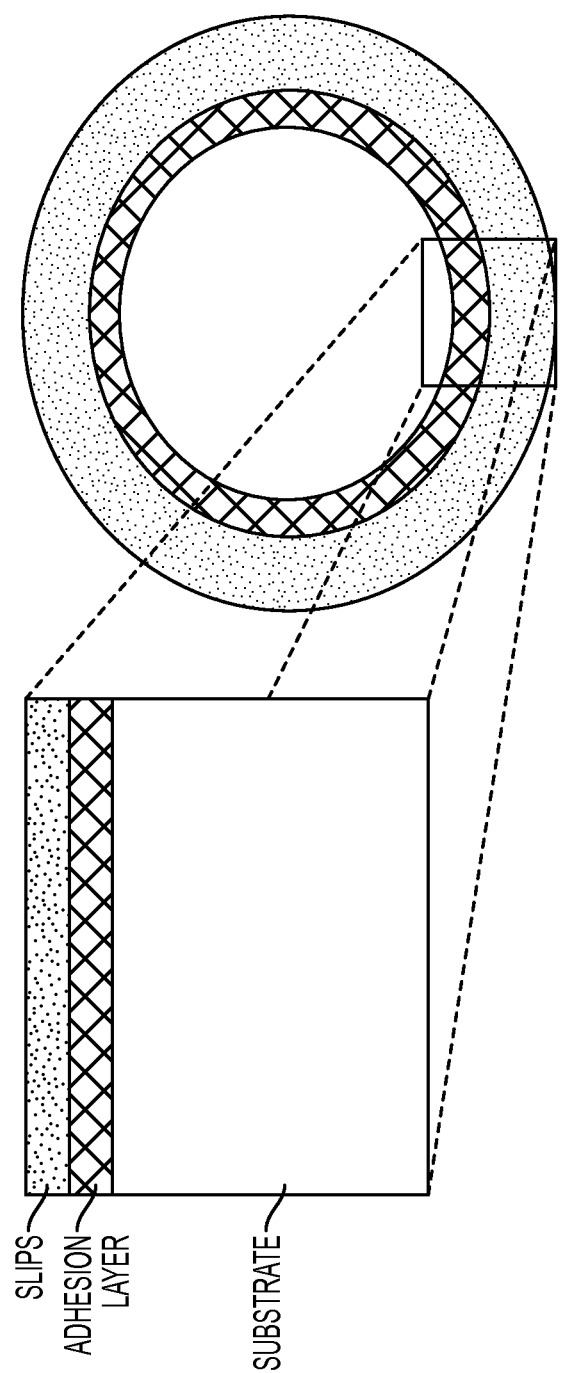
FIG. 23 illustrates a schematic cross section of a pipe, tube or other flow channel comprised of three layers (substrate, adhesion promotion layer, and SLIPS)
Figure 24:
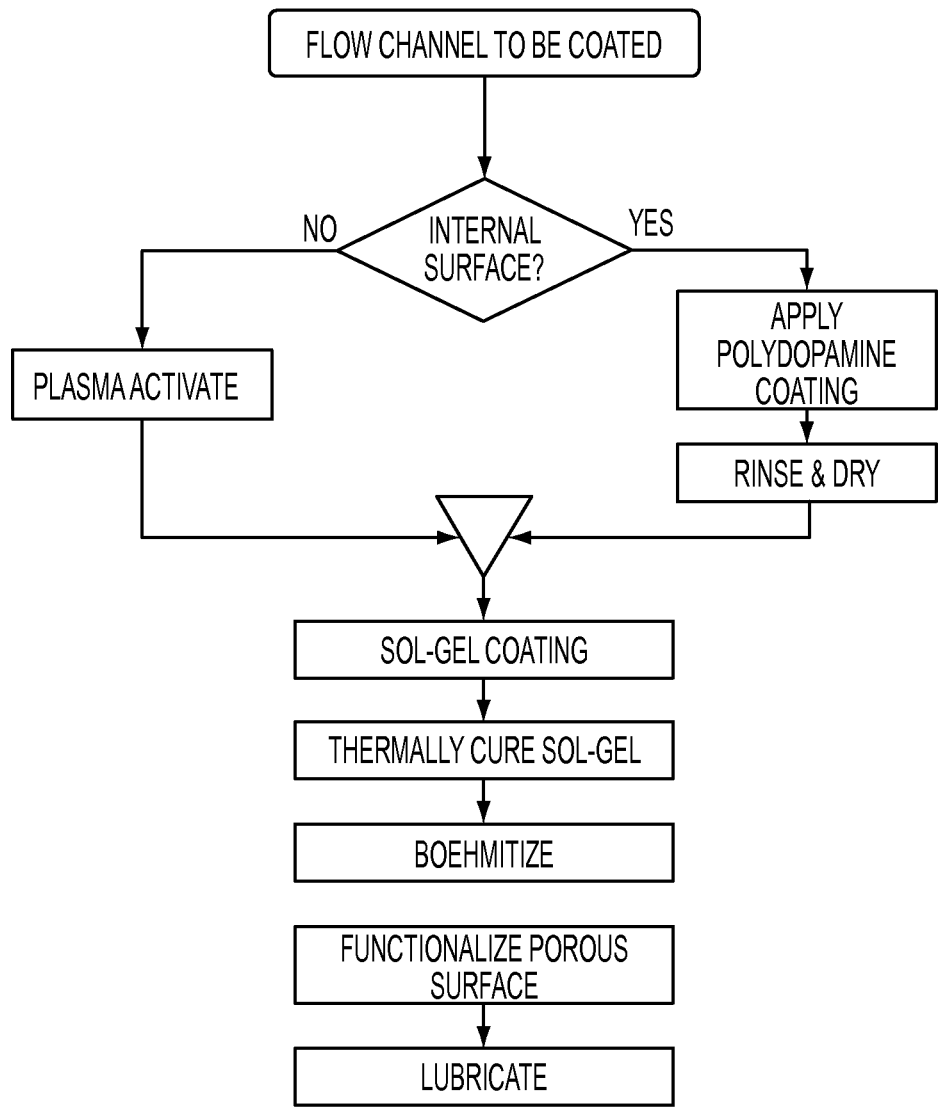
FIG. 24 illustrates a process diagram for SLIPS flow coating of internal and external surfaces of flow channels.

FIG. 23 illustrates a schematic cross section of a pipe, tube or other flow channel comprised of three layers (substrate, adhesion promotion layer, and SLIPS). FIG. 24 illustrates a process diagram for SLIPS flow coating of internal and external surfaces of flow channels.

Figure 25:
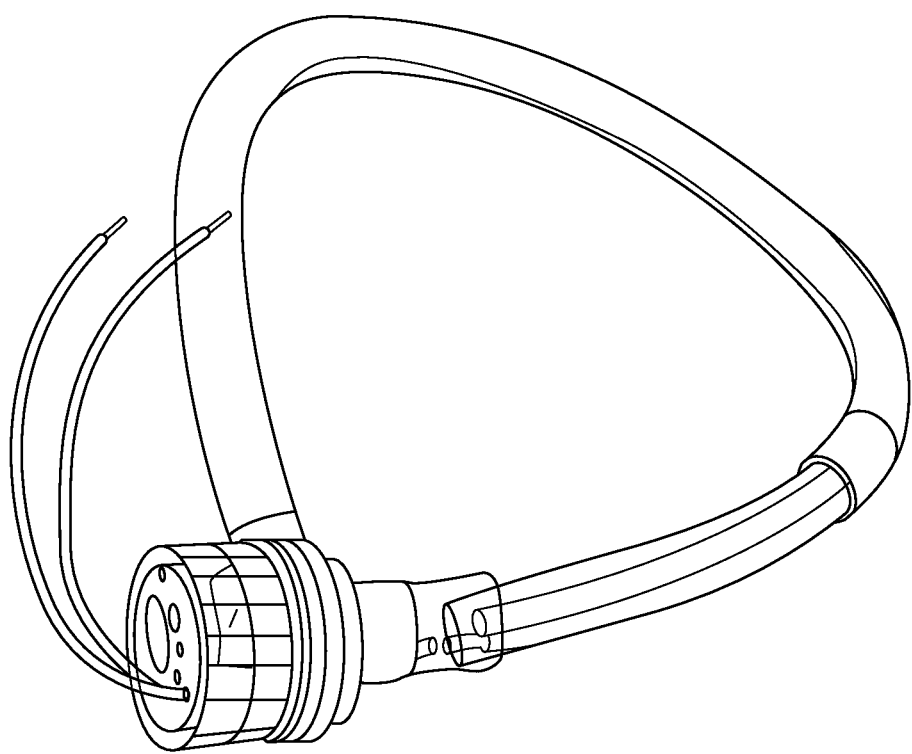
FIG. 25 illustrates a closed loop flow coating set up for ¼" medical grade PVC tubing.
Figure 26:
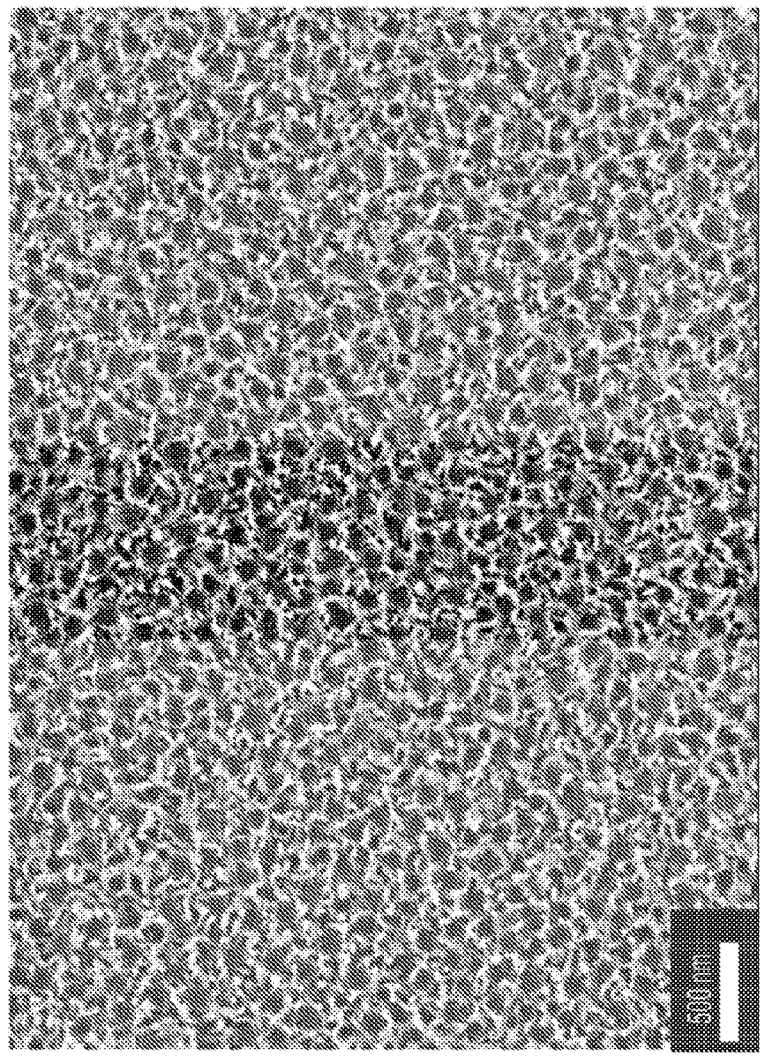
FIG. 26 shows a scanning electron micrograph of interior wall of a coated medical grade PVC tubing before lubrication.
Figure 27:
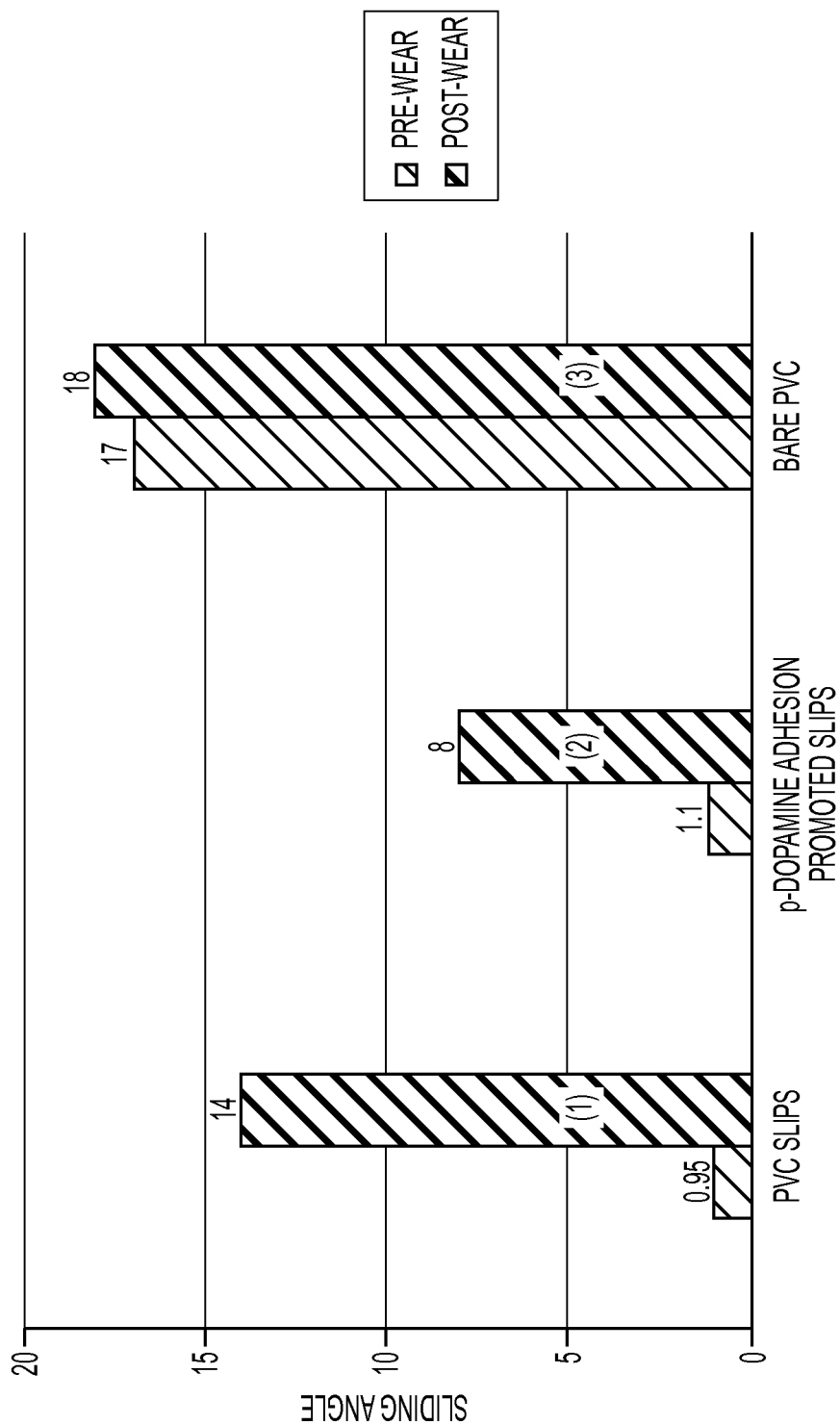
FIG. 27 illustrates slippery characteristics of 75 µL, water droplets on various surfaces before and after subjecting to peristaltic pump wear test.

One exemplary SLIPS flow coating process on the interior of a medical-grade PVC tubing includes application of adhesion promotion layer on 0.25" ID substrate, followed by flowing of SLIPS precursors. The detailed procedure is as follow:

First, a medical grade polymer tubing (PVC, Tygon R-3603 #AAC00017,ID ¼", OD=⅜") was coated by flowing 2 mg/mL dopamine-HCl solution in 50 mM TRIS buffer (pH=7.5-8.5, higher pH speeds up the polymerization process) for 3 h at room temperature using a centrifugal pump at a flow rate of 1 L/min in a closed loop to form a thin coating of polydopamine. (FIG. 25 illustrates a closed loop flow coating set up for ¼" medical grade PVC tubing. A DC-powered centrifugal pump is attached to form a closed loop and to continuously pump coating solutions.) The adhesive-coated substrate was then dried at 70° C. for 1 h prior to being subjected to flow coating of an isopropyl alcohol (IPA)-based sol-gel alumina precursor solution, synthesized as described by P. Kim et al., *Nano Letters* 13 (4), 1793-1799, 2013 DOI: 10.1021/nl4003969, at 1 L/min at room temperature for 1 min. The excess solution was drained and the coated substrate was allowed to thermally cure in a 70° C. forced convection oven for 7 h to allow for full drying of the entire interior of the tubing. This prevents formation of clumps and non-uniformity in the following boehmitization step Next, samples were filled with warm DI water, boehmitized in flow conditions in a 70° C. oven for 20 min. Flow boehmitization is necessary to improve the uniformity of boehmite nanostructure by mobilizing evolved hydrogen bubbles from the surface reaction. Boehmitization at 70° C. requires about 15 minutes to completely convert the sol-gel alumina surface into uniform boehmite nanostructure. FIG. 26 shows a scanning electron micrograph of interior wall of a coated medical grade PVC tubing before lubrication, revealing the uniformity of underlying boehmite nanostructures formed on polydopamine adhesion promotion layer. The additional 5 min is added to account for thermally insulating effect of the PVC tubing and to account for the relatively low boehmitization temperature. Boehmitized substrates were removed from the oven and drained of warm water Then, treated tubes were filled with an aqueous solution of 1 wt. % of FS-100, a perfluoroalkyl phosphate surfactant, and 1 wt. % of Pluronic F-68, a PEO-PPO-PEO triblock co-polymer-based surfactant (to increase aqueous solubility of FS100 in water and reduce foaming), placed in a 70° C. oven for 1 h. Post fluorination, the samples were drained, rinsed with DI water and dried by blowing dry air (or nitrogen) and inspected for superhydrophobicity by introduction of a stream of water, or more quantitatively, by measuring the sliding angle of water droplet. FIG. 27 illustrates slippery characteristics of 75 uL water droplets on: 1) SLIPS treated PVC tubing with no adhesion layer, 2) SLIPS treated PVC tubing with utilizes polydopamine as an adhesion promoter, 3) bare, untreated PVC tubing. Pre-wear samples were freshly treated or cleaned, post-wear samples were tested after pumping water at 50 mL/min, for 1 h, in an open loop configuration with a peristaltic pump, simulating both shear damage by the flow and mechanical damage due to peristaltic pumping action. Sliding angles were tested in the tubing section that was repeatedly compressed by pump rollers during flow. Post confirmation of superhydrophobicity, the samples were again dried with air (or nitrogen) and lubricated with a perfluoro-lubricant (e.g. DuPont Krytox PFPE GPL 100). Sometimes, vacuum drying (e.g., 50° C. at −30 mmHg) steps between these steps can help improve uniformity.

Figure 28:
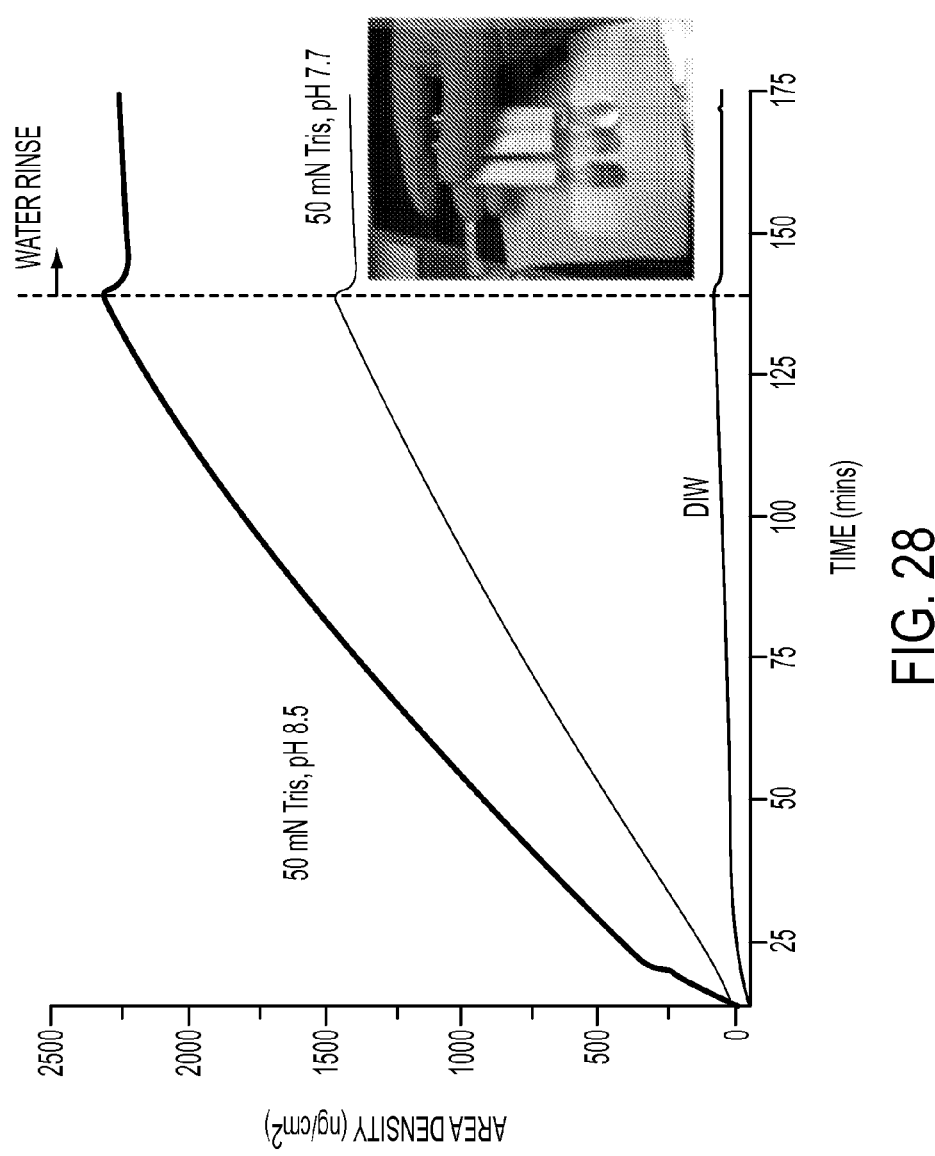
FIG. 28 illustrates an exemplary adhesion promotion layer (polydopamine) deposition monitoring data obtained using a quartz crystal microbalance (QCM)

The formation of the adhesion promoter and the thickness can be monitored and optimized using quartz crystal microbalance (QCM) with the target substrate material coated on the sensor. An exemplary materials deposition monitoring data obtained using a quartz crystal microbalance (QCM) is showed in FIG. 28. Three different pH conditions (neutral, 7.7, 8.5) were tested to monitor the rate of polydopamine layer formation on a gold-QCM sensor as a function of coating time. The data shows linear increase of the coating thickness as a function of time. After the coating, all samples were rinsed with deionized water to check and to demonstrate the excellent stability of the adhesion promotion layer. Inset picture shows the three test solutions at the end of the coating experiment. Darker color qualitatively corresponds to a thicker layer of polydopamine. The polydopamine coating layer was also found to be stable against rinsing with isopropyl alcohol.

Figure 29:
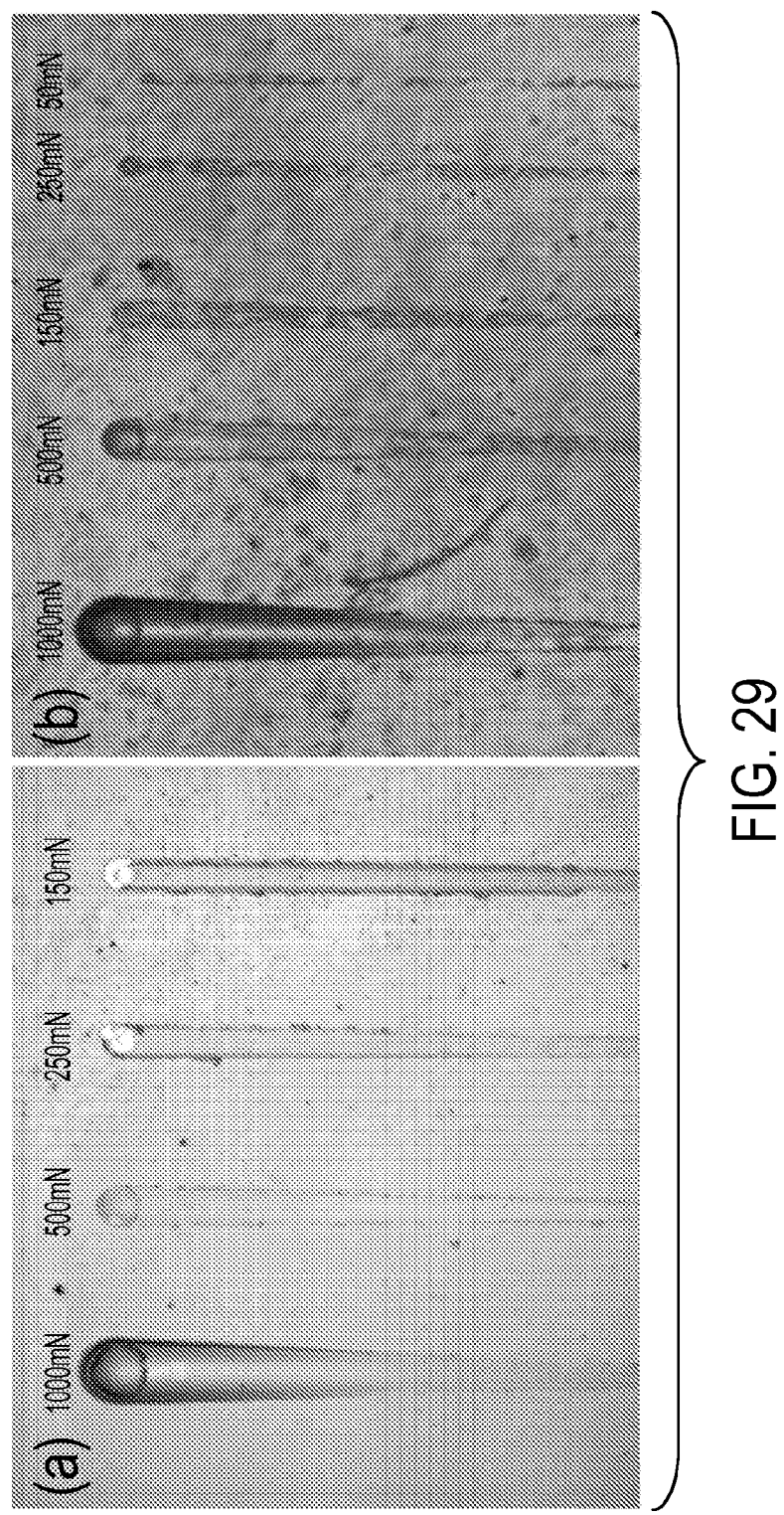
FIG. 29 A-B illustrates scratch test marks of sol-gel alumina-derived boehmitized SLIPS base coating on PVC without or with polydopamine coating as adhesion promotion layer.

As illustrated in FIG. 27, the usage of an adhesion promotion layer can result in increased retention of slippery behavior, including resistance to mechanical wear. FIG. 29 further demonstrates the increased retention of slippery behavior. FIG. 29 illustrates scratch test marks of sol-gel alumina-derived boehmite-based SLIPS base coating on PVC without polydopamine coating (a), and with 13.5 h polydopamine coating (b). Much stronger adhesion of the sol-gel layer can be seen on sample (b). The vertical loading applied to a 84 μm radius diamond scratching tip are labeled on top of each scratch mark. Each scratching mark is 1 mm long and was scratched over a 30 sec period.

Figure 30:
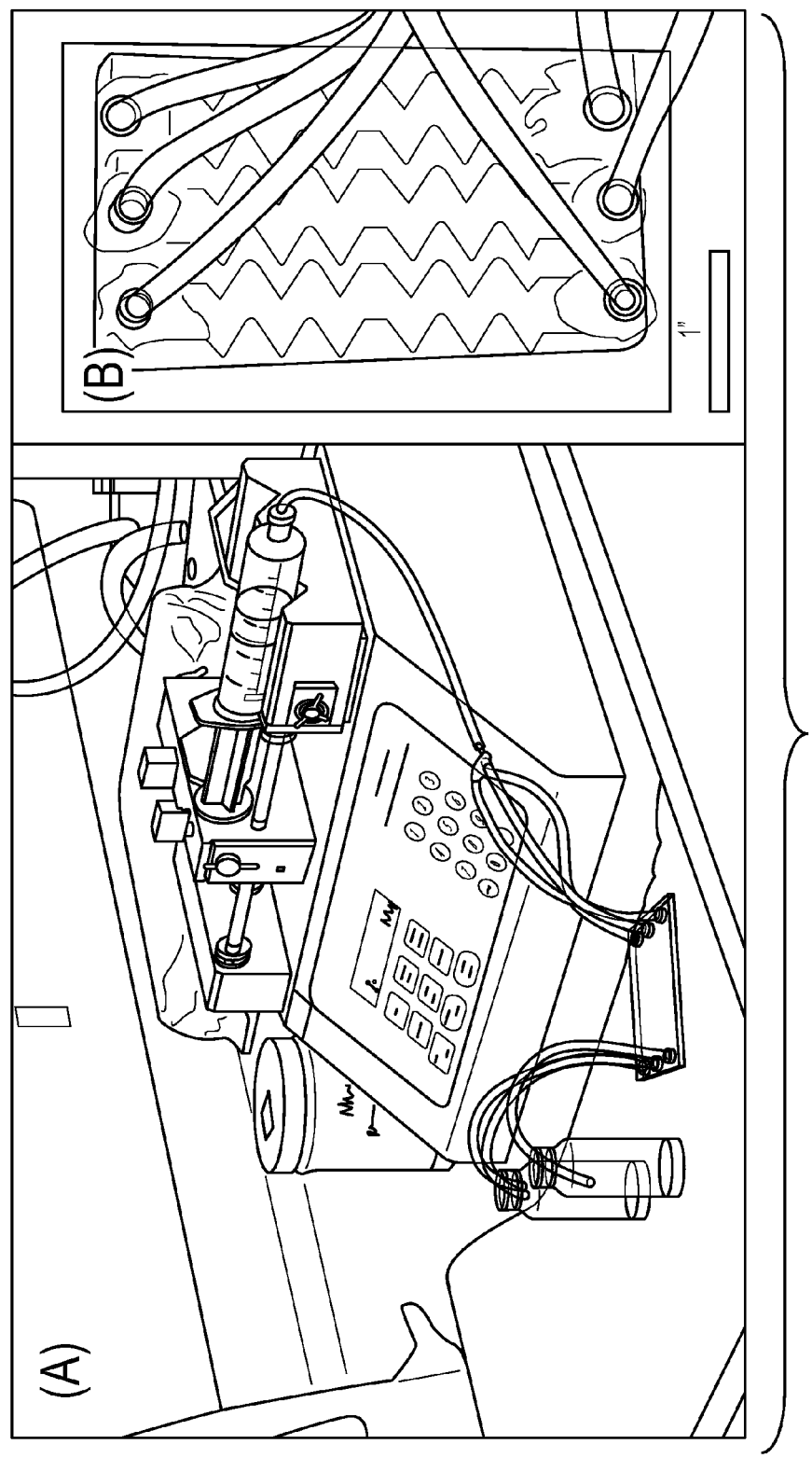
FIG. 30 A-B illustrates an exemplary flow coating setup for SLIPS treatment of a microfluidic device.

Another exemplary SLIPS flow coating process on the interior of a medical grade PVC tubing includes application of adhesion promotion layer into microchannels, followed by flow coating of SLIPS layers. The detailed procedure is as follow:

First, three serpentine PDMS microdevices, as well as inline tubing and pressure transducer, were coated by flowing 2 mg/mL dopamine-HCl (Sigma-Aldrich) solution in 50 mM TRIS buffer (pH=8.5) for 30 min at room temperature using a syringe pump at a flow rate of 500 μL/min to form a thin coating of polydopamine. (FIG. 30 illustrates an exemplary flow coating setup for SLIPS treatment of a microfluidic device: A) syringe pump being used to deposit polydopamine on connected medical grade PVC tubing and three microdevices in parallel; B) SLIPS coated microfluidic devices connected to SLIPS coated medical grade PVC tubing.) The adhesive-coated substrate was then rinsed with water and dried at 50° C. and 30 mmHg vacuum for 30 min prior to flow coating of an IPA-based sol-gel alumina precursor solution, synthesized as described by P. Kim et al., *Nano Letters* 13 (4), 1793-1799, 2013

DOI: 10.1021/nl4003969, at 500 µL/min at room temperature for 1 min. The excess solution was drained and the coated substrate was allowed to thermally cure in a 70° C. oven for 1 h then allowed to fully dry at 50° C. and −30 mmHg vacuum for 30 minutes. This prevents formation of clumps and non-uniformity in the following boehmitization step Next, samples were filled with warm DI water, boehmitized in flow conditions in a 70° C. oven for 20 min Then, treated tubes were filled with an aqueous solution of 1 wt. % of FS-100 and 1 wt. % of Pluronic F-68, placed in a 70° C. oven for 1 h. The channels were drained, rinsed with DI water and dried at 50° C. and −30 mmHg vacuum for 30 min then lubricated with a perfluoro-lubricant (e.g. DuPont Krytox PFPE GPL 100). Vacuum drying (e.g., 50° C. at −30 mmHg) steps between these steps can help improve uniformity.

The SLIPS flow coating method (e.g., a layer-by-layer process) can be used to coat arbitrary lengths or geometries of flow channels and can allow for integration with industrial coating systems employing large scale and automated flow-based coating techniques. Processing methods such as vacuum drying can allow for increased throughput and improved homogeneity. The SLIPS flow coating method can be used to coat a fluidic channel. Some examples of fluidic channels include medical tubing (e.g., catheters, etc medical devices (especially metallic, such as stents and implants, etc.), and medical optical windows (e.g., endoscopes).

Potential applications of this SLIPS flow coating method include
  Anti-fouling, anti-adsorbent, anti-blood coagulating coating for medical tubing, catheters, connectors, internal surface of pumps, as well as whole systems such as dialysis devices, continuous veno-venous hemofiltration (CVVH) devices, reducing the use of anti-coagulants
  Anti-scaling, anti-foiling coating for pipelines, heat exchangers, micro-heat exchangers, district heating systems
  Anti-fouling coating for tubular bioreactors En biofuel or biopharmaceutical industries.

In some embodiments, nitro blue tetrazolium (NBT) staining method can be used to detect cracks on the "dopamite" (dopamine+boehmite) SLIPS surfaces generated by SLIP flow coating. Quinones are cofactors in many enzymes where they selectively oxidize glycine to glycinate and in the NBT-redox cycling this is utilized in the staining of quinones and related quinonoid substances. As the quinonoid substance is reduced, a free radical is produced, which reacts with oxygen and subsequently a very reactive superoxide is created (in this process the quinone is recycled; hence, the name NBT-redox cycling). The superoxide reduces the tetrazolium-moiety in the yellow nitroblue tetrazolium (NBT) dye and consequently a purple formazan group is produced, which is a clear indication of quinonoid substances. Some exemplary staining procedures can be found in M. A. Paz, R. Flückiger, A. Boak, H. M. Kagan og P. M. Gallop, Specific detection of quinoproteins by redox-cycling staining, *The Journal of Biological Chemistry* 689-692, 266(2), 1990; and J. H. Waite, Specific Colorimetric Detection of o-Diphenols and 3,4-Dihydroxyphenylalanine-Containing Peptides, *Analytical Biochemistry* 131-136, 111 (1), 1981.

Figure 31:
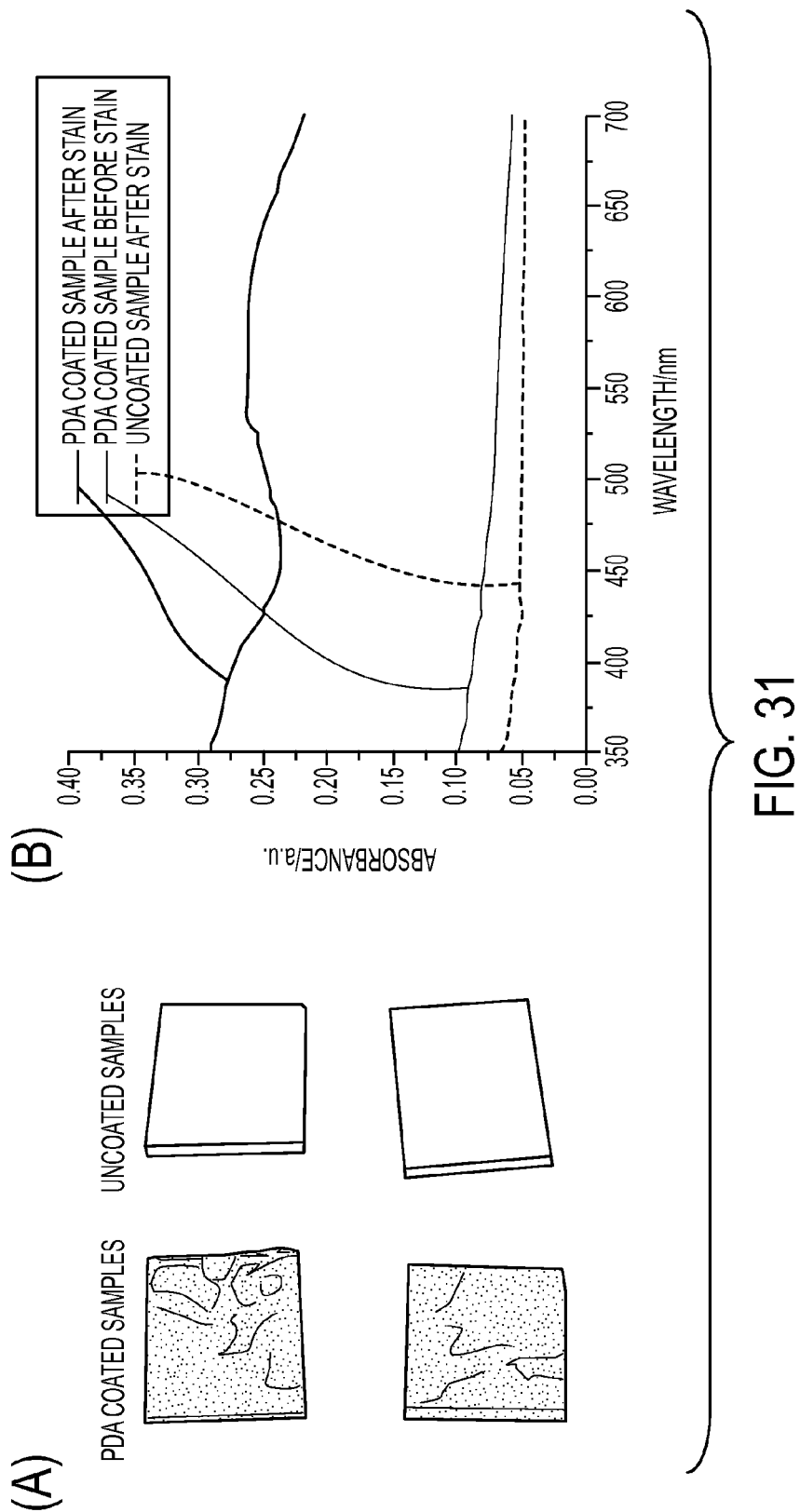
FIG. 31 A-B illustrates NBT (nitrogen blue tetrazolium)-redox staining of polydopamine (PDA) coated PVC on glass and uncoated PVC on glass.
Figure 32:
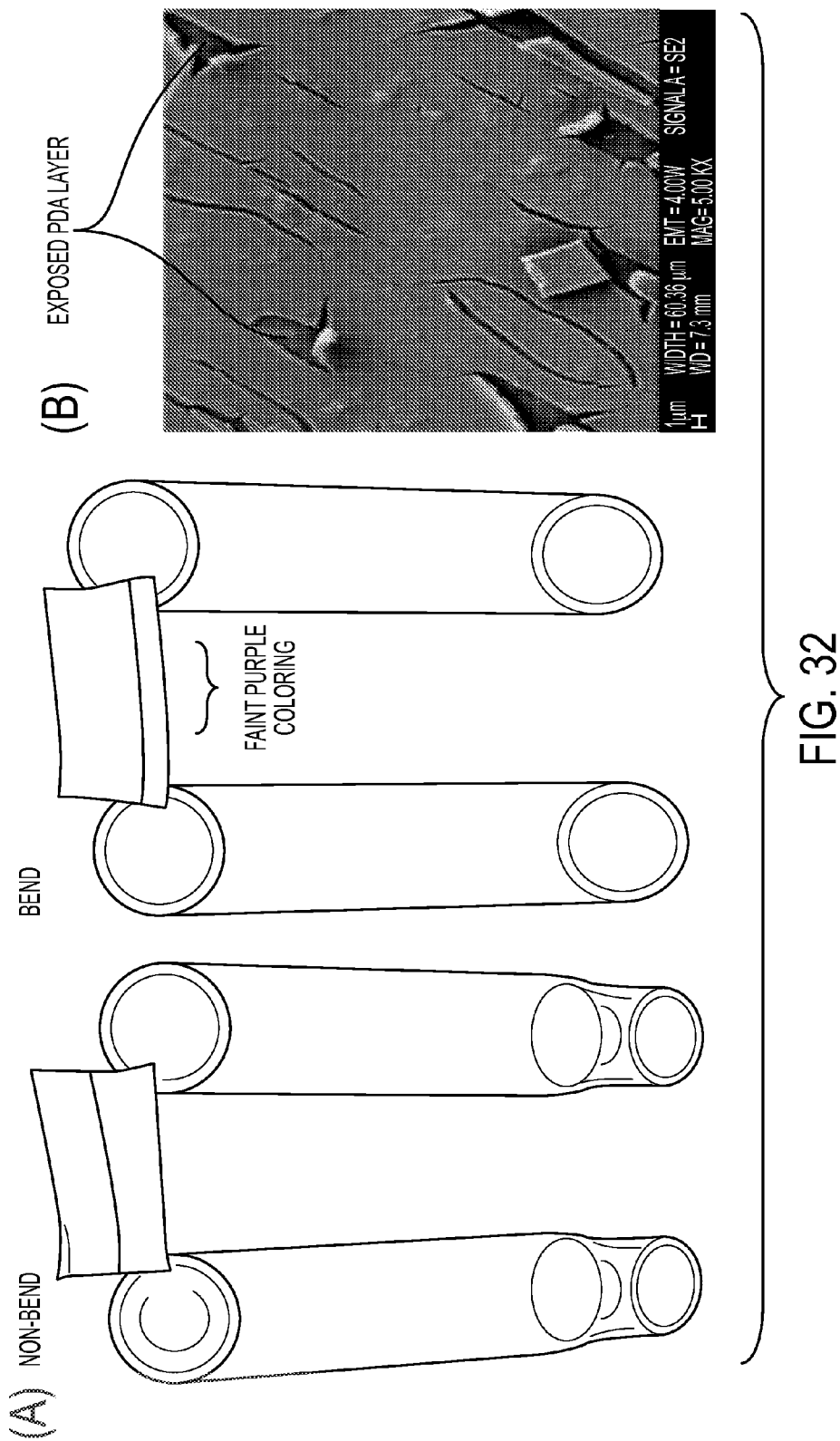
FIG. 32 A-B demonstrates NBT staining results of checking the uniformity of dopamite SLIPS coating.

FIG. 31 illustrates NBT-redox staining of polydopamine (PDA) coated PVC on glass (A, left) and uncoated PVC on glass (A, right). The image in FIG. 31 (A) is captured 45 minutes after the samples were left to incubate in the NBT/glycinate buffer solution (This solution is yellow and does not change color during the experiment). The two PDA coated samples develop a purple color whereas the uncoated samples remain transparent. The purple color is a clear indicator for the PDA layer as quinonoid substances are known to specifically convert the yellow NBT dye into purple formazan groups. The diagram in FIG. 31 (B) shows the absorbance measurements for the different samples and the peak around 575 nm, which is present on the PDA coated sample after the stain, confirms a successful NBT slain. FIG. 32 demonstrates NBT staining results of checking the uniformity of dopamite SLIPS coating. Images in FIG. 32 (A) show half-cut open medical grade PVC tubings without bending (left) and after bending (right) to induce crack formation. SEM image in FIG. 32 (B) shows a bent and cracked dopamite SLIPS coating exposing PDA layer underneath.

Applications of Metal-Containing SLIPS

One application of SLIPS is to provide anticoagulant or anti-microbial surfaces to biomedical devices. A SLIPS layer can be also applied to the inner and outer surfaces of components of various medical devices, such as shunts, tubing, connectors and microfluidic separators, to help prevent formation and adhesion of blood clotting without requiring soluble anticoagulants. The SLIPS technique can be used to modify the surfaces of the commercial continuous veno-venous hemofiltration (CVVH) catheters and connectors, as well as dialysis like therapeutic (DLT) device and disposable Blood Cleansing Cartridge composed of PMMA, hence obviating the need for anticoagulation in DLT blood cleansing device. The SLIPS coating can be directly applied on the metalized surface of surgical balloons to reduce friction and blood coagulation.

Figure 33:
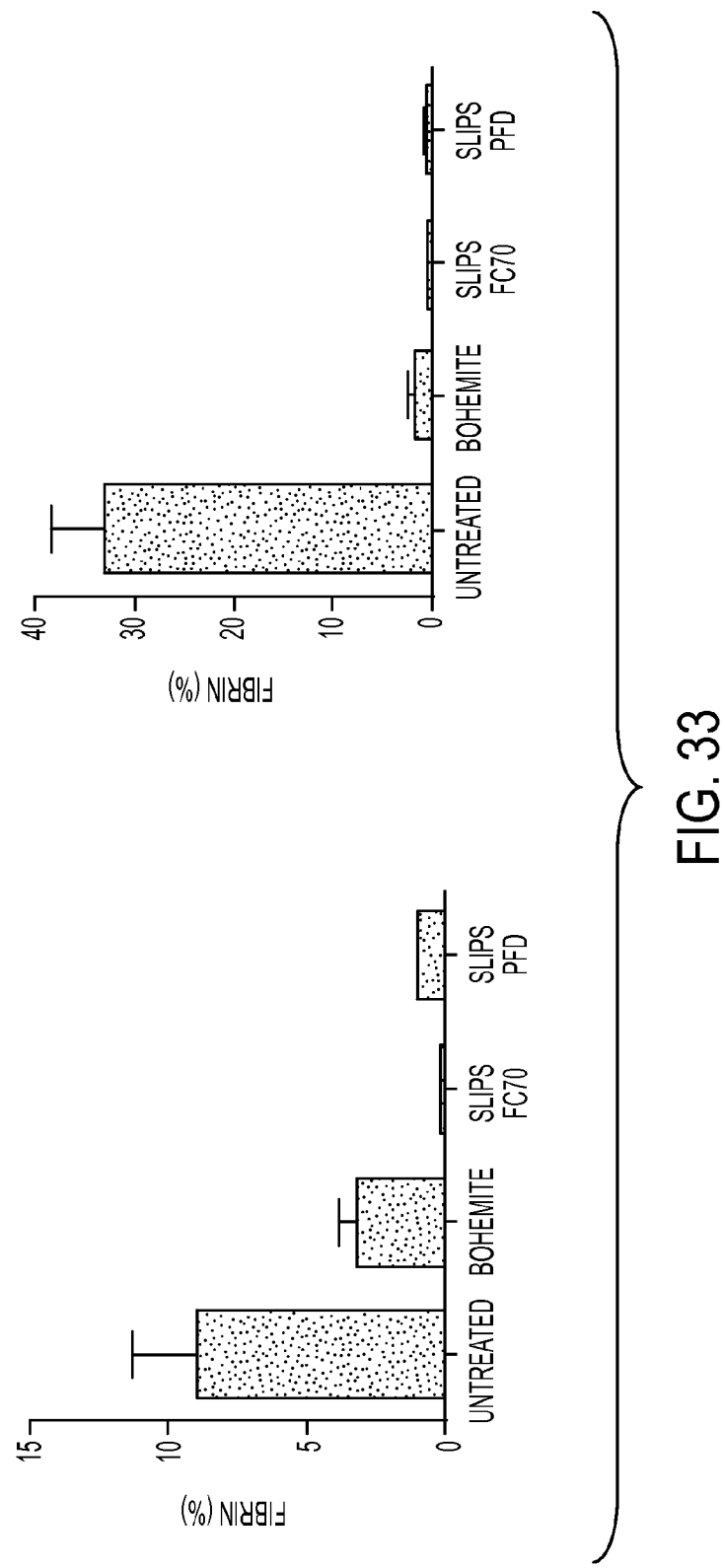
FIG. 33 illustrates the quantification of the levels of fluorescent fibrin bound to alumina/boehmite treated polysulfone (PSF) after 15 min and stainless steel after 20 min.

FIG. 33 illustrates the test result of the anticoagulation feature of alumina/boehmite stainless steel and PSF SLIPS in exemplary human blood clotting experiments. The left chart shows the levels of fluorescent fibrin bound to alumina/boehmite PSF SLIPS after 15 min. The right chart shows the levels of fluorescent fibrin bound to alumina/boehmite stainless steel SLIPS after 20 min. In both illustrations, blood clotting can be significantly reduced on FC70 SLIPS surfaces.

Figure 34:
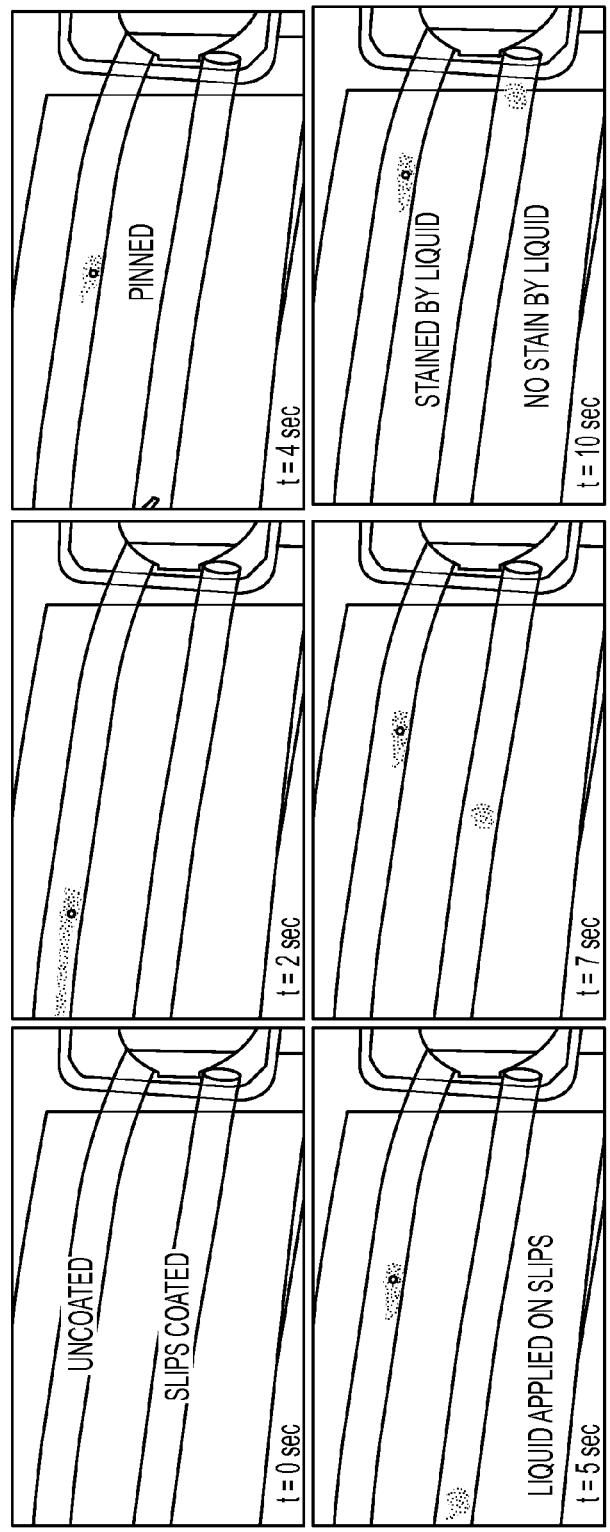
FIG. 34 shows a picture demonstrating sol-gel based SLIPS coating inside a silicone tubing.

FIG. 34 demonstrates sol-gel based SLIPS coating inside a silicone tubing. A drop of dyed hexadecane is applied initially on uncoated tubing. After 5 seconds, a drop of dyed hexadecane is applied on SLIPS-coated silicone tubing. The droplet is pinned on uncoated silicone tubing with a tail of liquid staining the tubing, while it does not leave any staining on SLIPS-coated silicone tubing.

In addition, SLIPS-coated substrates manufactured using the generalized methods discussed herein can show extremely low ice adhesion strength (~10 kPa) that can be two orders of magnitude lower than that of bare stainless steel (~700 kPa) and Teflon (~240 kPa), and four-fold lower than the silicone-based low-ice-adhesion material (~40 kPa). Moreover, these materials can also exhibit anti-corrosive barrier layer property, and can be even bent when coated on a flexible substrate without significant deterioration of SLIPS performance.

Figure 35B:
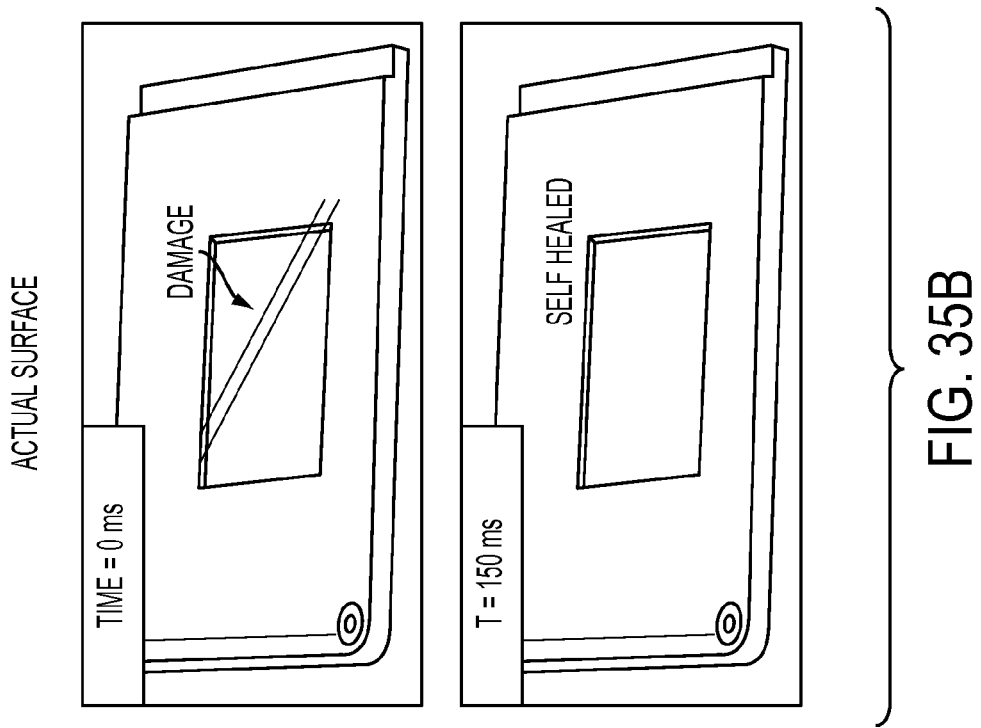
FIGS. 35A and 35B demonstrates self-healing properties of an exemplary SLIPS.
Figure 35A:
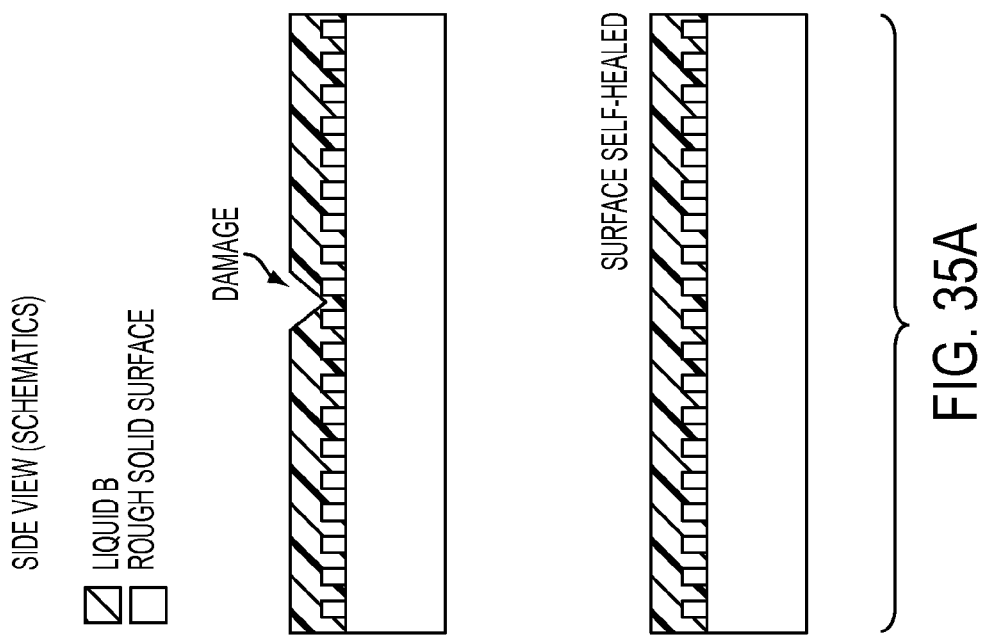

In some embodiments, a SLIPS surface can be capable of self-repair, so that the lifetime of the SLIPS surface can be further extended. By way of example, a surface can be damaged, for example by scratching or denting. The damage can disrupt the molecularly smooth surface and can expose the underlying substrate. However, Liquid B can quickly flow to fill and repair the damage. FIG. 35A is an exemplary schematic illustration of self-repair self-healing. The upper schematic shows that damage displaces Liquid B and exposes the underlying surface. The lower schematic shows that Liquid B flows rapidly into the gap created by the damage to regenerate the SLIPS surface. Photographs of a SLIPS surface's self-repair/self-healing process are shown in FIG. 35B. In this example, the self-healing time scale was on the order of 100 ms.

Additional experiments show that the robust, shear-tolerant, and optically transparent nanostructured SLIPS coatings can provide many substrates with liquid-repellent non-fouling, anti-icing, and easy-to-clean properties against a wide range of complex fluids and highly contaminating media, including hot water (>55° C.), hexadecane, ethanol, motor oil, motor oil with metallic shavings, liquid asphalt, uncured and cured cements, for many of which the current state-of-the-art antifouling coatings, including superhydrophobic surfaces based on the lotus effect, do not provide a reliable solution. Some of these experiments include:

- Complex geometrical objects (e.g., using glass flowers as an example) are submerged in a container of liquid asphalt. The initially-transparent, untreated glass flower is completely coated with a thick layer of dark brown liquid asphalt after dipping, while the transparent, SLIPS-coated glass flower remains transparent due to the gravity-driven removal of liquid asphalt from the slippery surface
- A mixture of uncured cement is applied to an untreated 3"×2" glass slide and transparent SLIPS-coated glass slide. With slight sample tilting, the uncured cement can easily slide off the SLIPS-coated glass while it remains on the untreated glass slide. The cement can remain stationary and be fully cured if it is applied on a flat, level surface. The cured cement is very difficult to remove from the untreated glass, requiring substantial time and applied force, but is effortlessly removed from the SLIPS surface by applying a gentle stream of water
- The optical transparency of a 3" diameter uncoated polycarbonate lens is compared to a SLIPS coated polycarbonate lens. Motor oil with metallic shavings is applied drop by drop on the two lenses, which contaminates the surface of uncoated polycarbonate lens obstructing the image behind it, while the contaminant is passively removed from the SLIPS-coated lens surfaces due to its slight curvature
- A dyed water droplet is applied to unmodified and SLIPS-coated polyurethane elastomer sheets. The droplet spreads and easily wets the unmodified polyurethane sheet. The droplet applied to the SLIPS-coated polyurethane sheet freely slides across the surface, even while and after bending, leaving no wet trail or residue
- A square piece (5"×5") of aluminum alloy is mounted on a thermoelectric cooler. The right half of the sheet is SLIPS-modified by direct boehmitization/fluorination/lubrication method. After cooling the sheet to −15° C., water is sprayed on the aluminum sheet. Ice forms immediately on the left half (unmodified), while ice does not form on the right half because the water can quickly slide and leave the cold surface before freezing.

Some additional exemplary applications of metal-containing SLIPS include:

- Transparent lens protector. Ex: sgB-SLIPS coating can be formed on a lens protector, allowing for an easily cleaned, transparent, and anti-reflective surface;
- Transparent coating on other types of optical devices, e.g. SLIPS-coated windows camera lenses for smart cars, endoscopes, solar panels, etc.;
- Anti-corrosive coating on metals;
- Slippery glide coating on razor blades;
- Drag reducing coatings inside a pipeline;
- Anti-scaling coatings inside tubings used for heat exchangers, boilers, and district heating systems;
- Low friction coating inside a nozzle of print heads to allow printing of high viscosity inks;
- Anti-stick containers (protected from the sticking of notorious contaminating materials, such as ketchup, honey, motor oil, liquid asphalt, cosmetic products, etc.);
- Interior surface coating of reaction vessels in chemical eaors (via direct modification of aluminum or indirectly on stainless steel;
- Anti-fouling coating for marine applications directly applied on aluminum alloy or stainless steel or other painted existing surfaces;
- Anti-fouling coating for marine applications directly applied on polymer-based structures, painted surfaces, wires, hydrophones (e.g. thermoplastic polyurethane), and underwater sensors and cables;
- Transparent anti-graffiti overcoat on signs;
- Transparent coating on sensors used in oil fields;
- Anti-fogging coating inside and anti-fouling and self healing coating outside on goggles;
- Anti-snow and an ice coating on boots and shoes;
- Anti-frost and anti-ice coatings on cooling coils (refrigerators, HVAC, heat pumps);
- Anti-stick coatings for food packaging and food processing equipment;
- Low friction coatings for sports gear and recreational equipment;
- Anti-ice on wind turbine blades (direct aluminum modification or sgB coating on polyurethane coating); and
- Anti-staining and self-cleaning coating on fabrics, wires, papers.
- Anti-coagulant and low friction surface for biomedical devices such as catheters, stents, implants, surgical devices, endoscopes;
- Microbial-resistant surface on catheters, shunts, tubing, connectors and microfluidic separators and implants;
- Antifouling coating for biomedical containers, exposed to highly contaminating media, such as ostomy bags, etc.
- Transparent, self-cleaning coatings for medical optical devices, such as endoscopes, etc.

Additional Experimental Methods

Sample experimental materials and methods corresponding to the exemplary disclosed subject matter are summarized below:

Materials

The DuPont Krytox PFPE GPL 100 lubricant was purchased from Miller-Stephenson. All other chemicals were purchased from Sigma-Aldrich and used without further purification unless specified otherwise. All substrate materials and fouling fluid samples were purchased from McMaster-Carr unless specified otherwise Sandblasting Micron scale roughness was formed on aluminum alloys (1100, 5052, 6061) by sandblasting at 50 psi using 120 grit aluminum oxide media (McMaster Carr) to produce a roughness of 3.2 μm±0.2 μm, measured by stylus profilometry (average of three independent measurements with 5 mm scan length and 5 mg load). The sandblasted samples were cleaned by rinsing vigorously with water then ultrasonically cleaned in an acetone bath for 15 min Direct formation of boehmite nanostructures on aluminum alloys
  We formed nanostructured boehmite on aluminum alloys by reacting with water. Either sandblasted or as-received aluminum samples were pre-cleaned by ultrasonically cleaning in an acetone bath for 15 min. In a typical boehmitization procedure, a bath of deionized water was brought to boiling (100° C.) then a pre-cleaned aluminum sample was fully submerged in the boiling water for 10 min. We also used an autoclave to form boehmite nanostructures on aluminum alloys in a 20 min wet cycle at 120° C. After boehmitization, the samples were rinsed with deionized water and dried by blowing dry air or nitrogen Solution-Phase Fluorination
  In order to create a monolayer of fluoroalkyl chains on the boehmite surface, we submerged samples in a 1 wt. % solution of 1H,1H,2H,2H-perfluorooctyl phosphoric acid (F13PA, synthesized according to a previously published method, S. A. Paniagua et al, J. Phys. Chem. C 112 7809-7817, 2008) or FS100 (fluoroaliphatic phosphate ester fluorosurfactant, Mason Chemical Co.) in 95:5 ethanol:water for 1 h at 70° C. Temperature-sensitive substrates were fluorinated in the same bath at lower temperature for a longer period of time (e.g. 3-4 h at 40° C. or overnight at room temperature). For substrates that can be damaged by alcohols (e.g. PMMA), fluorination was performed in an aqueous solution of FS100 prepared in the presence of 1 wt. % Pluronic F-68 ($EO_{78}PO_{30}EO_{78}$, FW=8400 Affymetrix) to dissolve FS100

Vapor-Phase Fluorination
  Some sensitive samples (e.g. PDMS) were fluorinated using $C_4F_8$ plasma in an inductively coupled plasma reactive ion etching system (STS MPX/LPX RIE) with $C_4F_8$ flow rate of 120 sccm (standard cubic centimeter per minute) for 8 s under 1 mTorr pressure and 600 W/0 W coil/platen power Application of Sol-Gel Alumina Coatings to Various Materials
  3 g of aluminum tri-sec-butoxide (97%, Sigma-Aldrich) was mixed with 30 mL of isopropyl alcohol (99.5%, BDH) while stirring. 2 mL of ethylacetoacetate (99%, Sigma-Aldrich) was then added after 10 min of stirring. After an additional 1 h of stirring, 6 mL of 5:1 IPA:DIW was slowly added and the mixture was stirred for 1 h. This solution could be applied to a wide range of substrates, including glass, stainless steel, polysulfone, various polyurethanes, and many other materials, through spin-coating, spray-coating dip-coating, etc.
  To apply sol-gel alumina coating to glass, the glass slides were pre-cleaned by rinsing in acetone and then treating with oxygen plasma for 60 s. Alumina sol-gel solution was spin-coated at various rates from 1000-5000 rpm on 2"×3" glass slides. The slides were thermally annealed at 400° C. for 1 h in order to achieve maximum adhesion and cohesion of the alumina film. The process was similar for all other substrate materials tested, but due to the decreased temperature tolerance of some of polymeric materials, the temperature for drying was adjusted to 70° C.—room temperature
  For substrates that show poor adhesion to the sol-gel alumina coating, an adhesion promotion layer was necessary. For example, we applied a thin layer of Ti or Cr by vapor deposition to improve the adhesion of alumina to polycarbonate substrates that would have otherwise been removed during; the solution-phase fluorination step in an ethanol bath Boehmite Nanostructure Formation from Sol-Gel Alumina Coating (sgB)
  Samples coated with sol-gel alumina were submerged in de-ionized water that ranged in temperature from 60 to 100° C. for 10 min. Temperature-resistant substrates (i.e. pure aluminum, glass, polysulfone, stainless steel) were treated at 100° C. in boiling water, while more temperature-sensitive substrates polystyrene, polypropylene) were treated at lower temperatures SLIPS Formation from Boehmite-Based Nanostructures
  All the fluorinated, boehmitized surfaces were lubricated by application of perfluoropolyether (PFPE) lubricant (DuPont Krytox GPL 100, "K100"). To spread out the lubricant, the substrates were either tilted or spun on a spin coater. Excess lubricant was typically removed either (i) by gravity (by placing substrates vertically for 10 min), (ii) by spinning the substrates at higher spin rate (1,000-2,000 rpm for 1 min), or (iii) by pressure-washing the substrate in a stream of high-pressure water
  In addition, we have also successfully applied robust SLIPS coating on some of the challenging shapes including curved surfaces, sharp tips, and inner walls of tubings and pipes that are difficult to coat by other methods Scanning Electron Microscopy (SEM)
  All SEM images were taken using a Zeiss FESEM Ultra Plus Analysis of Surface Functionalization
  FT-IR (Broker Vertex 70 spectrometer with Hyperion 3000 microscope attachment and MCT detector) was used to identify sample surface functionalization. Spectra were collected in ATR mode using a Ge crystal (resolution=4 $cm^{-1}$, 32 scans). Baseline correction was performed using two iterations of straight lines with concave rubberband correction Shear Test
  In order to measure lubricant retention for different surfaces, 3"×"3" samples of each type were prepared. Initially, excess amount of Krytox GPL 100 lubricant was dispensed to cover the entire sample surface, then the sample was spun at 100 rpm. At this spin rate, the acceleration at 2.54 cm from the center of spinning corresponds to only 0.284 g. Therefore, this condition effectively simulated the condition for having excess lubricant. The samples were then subjected to increasing spin rates from 100 rpm to 10,000 rpm, spun for 1 min at each speed. After each spinning cycle, the mass of K100 remaining on the sample was weighed. The contact angle hysteresis was measured at the points that are 1" away from the center of the spinning Ice Adhesion Test
  Ice adhesion strengths were measured using a previously described method (Kim et al., ACS Nano 6 (8) 6569-6577, 2012). Briefly, cylindrical ice columns were formed on each substrate in contact with a liquid nitrogen-cooled stage in a humidity-controlled chamber. The shear adhesion strength was measured at −10° C., by pushing the ice column using a force gauge at a constant velocity (0.1 mm/s)

Optical Characterization

Optical transmission of sample substrates and their SLIPS-coated counterparts were measured at room temperature using an Agilent 8453 UV-Vis spectrometer with air as the background Contact Angle and Hysteresis Measurements Advancing and receding contact angles were measured for macroscopic droplets (~5 μL) using a goniometer (CAM 101, KSV instruments) at ambient condition by slowly increasing and decreasing the volume of the droplet to induce sliding, then analyzing the images to find the best fining contact angles. A tapered glass capillary (World Precision instruments) was used in measuring CAH to minimize the impact of the tip diameter on droplet shape. The accuracy of contact angle and hysteresis measurements is ~0.1°

Photo-Patternable SLIPS 3 g of aluminum tri-sec-butoxide (97%, Sigma-Aldrich) was mixed with 30 mL of isopropyl alcohol (99.5%, BDH) while stirring. 2 mL of 2-acetoacetoxyethyl methacrylate (95%, Acros Organics) was then added after 10 min of stirring followed by the addition of 0.02 ml of ethyleneglycoldimethacrylate (98%, Sigma-Aldrich). After an additional 1 h of stirring, 6 mL of 5:1 IPA:DIW was slowly added and the mixture was kept stirring for 1 h. Finally, 50 μL it of Darocur 1173 was added to the mixture and stirred for 10 min. This solution could be used in the same way as regular sol-gel alumina solution to coat various substrates and can be photo-cured. In a typical procedure, an oxygen plasma treated 5 cm×7.5 cm glass slide was spin-coated with a photo-patternable sol-gel alumina solution. Afterwards, the substrate was soft-baked at 50° C. for 1 Mill, masked by a laser-cut PET sheet with alternating exposed areas spaced 3 mm apart, cross-linked by UV exposure (50 mW/cm$^2$UVA) for 5 min. After cooling the substrate for 2 min, the patterns Were developed by rinsing in isopropyl alcohol for 1 min to remove the films from the unexposed areas. The sample was then boehmitized in boiling deionized water for 10 min and fluorinated in an ethanol-based FS-100 bath for 1 h at 70° C. A small volume (0.5 mL) of lubricant (DuPont Krytox 100) was applied to the sample surface and then spun at 5000 rpm for 1 min. A 10 μL water droplet (dyed red for improved visualization) was placed on the top of the photo-patterned SLIPS substrate tilted at 30° and recorded using a Canon 60D camera. The resulting video was analyzed using Tracker Video Analysis and Modeling Tool Droplet Velocity Characterizations We measured the droplet velocity after the apply; shear forces to both BF-K100 and SBF-K100 SLIPS surfaces. Excess K100 was applied to 3"×3" BF and SBF samples that were spun at progressively faster speeds for 60 s intervals as described for the shear test above. After each stage, the samples were placed on a 15° incline on top of a surface marked with 1 cm intervals. A video was recorded of 10 μL droplets sliding down the surface from the upper edge of the substrate, and frame-by-frame analysis was used to measure the elapsed time whenever the droplets passed a 1 cm gradation, giving position and time information for the droplet accurate to ~1/30 of a second. Each velocity value is provided as the linear regression of the position time data, statistically averaged over ten droplets.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A method of preparing an article having a slippery surface, comprising:
    providing a metal-containing surface;
    chemically modifying the metal-containing surface to roughen the metal-containing surface;
    functionalizing the roughened metal-containing surface to enhance affinity of the roughened metal-containing surface to the lubricating layer; and
    disposing a lubricating layer on the functionalized, roughened metal-containing surface, wherein the lubricating layer is substantially stabilized on the roughened metal-containing surface,
    wherein the functionalizing step comprises exposing the roughened metal-containing surface to at least one organic derivative in the form of $(T)_n\text{-A-}(R)_a(OR)_b(O)_c(H)_d(OH)_e$, where
    T is a terminal functional group to be exposed on the surface;
    A is a center atom selected from B, C, N, Si, P, S; R is an alkyl group;
    OR is an alkoxy group;
    O is an oxygen or sulfur double bonded to the center atom A;
    H is a hydrogen;
    OH is a hydroxyl group or thiol group or a secondary amine group that is double bonded to the center atom;
    the subscripts n, a, b, c, d, e are integers equal to or greater than zero; and
    the sum of the subscripts n, a, b, c, d, e matches with the oxidation number of the center atom.

2. The method of claim 1, wherein the metal is selected from the group of Li, Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Ru, Rh, Pd, Ag, Cd, In, Sn, Sb, Cs, Ba, Hf, Ta, W, Re, Os, Ir, Pt, Au, Tl, Pb, Bi, La, Ce, Pr, Nd, Sm, Eu, Gd, Tb, Dy, Ho, Er, Tm, Yb, Lu, or a combination thereof.

3. The method of claim 1, wherein the metal-containing surface contains aluminum and the roughened metal-containing surface contains boehmite.

4. The method of claim 1, wherein the providing step comprises providing a substantially pure metal or metal alloy substrate.

5. The method of claim 1, wherein the providing step comprises depositing a metal-containing thin film on an arbitrary substrate to form the metal-containing surface.

6. The method of claim 1, wherein the providing step comprises depositing a metal-containing sol-gel precursor on a substrate to form the metal-containing surface.

7. The method of claim 6, wherein the metal-containing sol-gel precursor contains a porogen.

8. The method of claim 7, further comprising removing the porogen from the metal-containing surface after the metal-containing sol-gel precursor is deposited on the substrate.

9. The method of claim 6, further comprising pre-treating the substrate to improve adhesion of the substrate to the metal-containing sol-gel layer.

10. The method of claim 9, wherein the pre-treating step comprises plasma treating the substrate.

11. The method of claim 9, wherein the pre-treating step comprises treating the substrate with strong oxidizer.

12. The method of claim 9, wherein the pre-treating step comprises applying an adhesion promoter to the substrate.

13. The method of claim 12, wherein the adhesion promoter comprises dopamine or polydopamine.

14. The method of claim 12, wherein the adhesion promoter comprises Ti or Cr.

15. The method of claim 6, wherein the metal-containing sol-gel precursor is photo-curable.

16. The method of claim 6, wherein the metal-containing sol-gel precursor is a sol-gel alumina precursor and the roughened metal-containing surface comprises boehmite.

17. The method of claim 1, wherein the chemically modifying step comprises reacting the metal-containing surface with an environment to form a porous metal-containing compound layer.

18. The method of claim 17, wherein the porous metal-containing compound layer has a thickness in the range of 10 nm-1000 μm.

19. The method of claim 17, wherein the porous metal-containing compound layer is optically transparent.

20. The method of claim 19, wherein the porous metal-containing compound layer is optically transparent in 200 nm-400 nm wavelength.

21. The method of claim 19, wherein the porous metal-containing compound layer is optically transparent in 400 nm-700 m wavelength.

22. The method of claim 19, wherein the porous metal-containing compound layer is optically transparent in 700 nm-1000 nm wavelength.

23. The method of claim 17, wherein the porous metal-containing compound layer contains compound selected from the group of metal oxides, metal hydroxides, metal oxy-hydroxides, metal salts, organic and inorganic acids, metal sulfides, metal selenides, metal tellurides, metal nitrides, metal phosphides, metal antimonides, metal arsenides, organometallic or coordination compounds, and a mixture thereof.

24. The method of claim 17, wherein the porous metal-containing compound layer contains metal oxide nanorods, nanotubes, nanofibers, or nanowires.

25. The method of claim 17, wherein the porous metal-containing compound layer contains pure or mixed metal fatty acid salts, metal-carboxylates, or metal-organophosphonates.

26. The method of claim 17, wherein the porous metal-containing compound layer contains tungsten oxide.

27. The method of claim 1, wherein the chemically modifying step comprises at least one of solvolysis and heat treatment to generate the roughened metal-containing surface.

28. The method of claim 27, wherein the solvolysis includes hydrolysis, alcoholysis, acid-based reaction, alkaline-based reaction, oxidation reaction, hydrothermal reaction, or solvothermal reaction.

29. The method of claim 28, wherein the acid-based reaction uses at least one of an organic acid or a inorganic acid.

30. The method of claim 1, wherein the at least one organic derivative is thiols, silanes, sulfonic acids, carboxylic acids, phosphonic acids, phosphinic acids, phosphoric acids, or esters thereof.

* * * * *